US007678860B2

(12) United States Patent
Muramoto et al.

(10) Patent No.: US 7,678,860 B2
(45) Date of Patent: Mar. 16, 2010

(54) COMPOSITION FOR POLYMER SOLID ELECTROLYTE, POLYMER SOLID ELECTROLYTE, POLYMER, POLYMER SOLID ELECTROLYTE BATTERY, IONCONDUCTIVE MEMBRANE, COPOLYMER AND PROCESS FOR PRODUCING THE COPOLYMER

(75) Inventors: Hiroo Muramoto, Chiba (JP); Takeshi Niitani, Ichihara (JP); Koichiro Aoyagi, Chiba (JP)

(73) Assignee: Nippon Soda Co., Ltd., Tokyo (JP)

( * ) Notice: Subject to any disclaimer, the term of this patent is extended or adjusted under 35 U.S.C. 154(b) by 286 days.

(21) Appl. No.: 10/571,998

(22) PCT Filed: Jan. 23, 2004

(86) PCT No.: PCT/JP2004/000576

§ 371 (c)(1),
(2), (4) Date: Mar. 9, 2006

(87) PCT Pub. No.: WO2005/027144

PCT Pub. Date: Mar. 24, 2005

(65) Prior Publication Data

US 2007/0040145 A1    Feb. 22, 2007

(30) Foreign Application Priority Data

Sep. 12, 2003    (JP) .............................. 2003-321155

(51) Int. Cl.
*C08F 118/02*    (2006.01)
*H01G 9/02*    (2006.01)

(52) U.S. Cl. ........................ 524/556; 525/314; 525/319; 252/62.2; 521/27

(58) Field of Classification Search ................. 524/556; 525/314, 319; 252/62.2; 521/27
See application file for complete search history.

(56) References Cited

U.S. PATENT DOCUMENTS

| 5,196,484 | A | * | 3/1993 | Giles et al. ................... 525/314 |
| 6,096,234 | A | * | 8/2000 | Nakanishi et al. .......... 252/62.2 |
| 6,596,440 | B2 | | 7/2003 | Gavelin et al. |
| 2005/0256256 | A1 | | 11/2005 | Muramoto et al. |
| 2006/0204854 | A1 | | 9/2006 | Fujimoto et al. |

FOREIGN PATENT DOCUMENTS

| EP | 1553117 | | 7/2005 |
| JP | 03196407 | | 8/1991 |
| JP | 05-120912 | | 5/1993 |
| JP | 07-109321 | | 4/1995 |
| JP | 07-230810 | | 8/1995 |
| JP | 10-045994 | | 2/1998 |
| JP | 10237143 | | 9/1998 |
| JP | 11043523 | | 2/1999 |
| JP | 11-240998 A | | 9/1999 |
| JP | 11240998 A | * | 9/1999 |
| JP | 2001-181352 A | | 7/2001 |
| JP | 2002-216845 A | | 8/2002 |
| JP | 2002-260441 | | 9/2002 |
| JP | 2002260441 A | * | 9/2002 |
| JP | 2003-045226 | | 2/2003 |
| JP | 2003045226 A | * | 2/2003 |
| JP | 2003-518172 | | 6/2003 |
| JP | 2003-217594 | | 7/2003 |
| JP | 2004-107641 | | 4/2004 |
| WO | WO-0146280 | | 6/2001 |
| WO | WO-0233765 | | 4/2002 |

OTHER PUBLICATIONS

Khan et al. al. "ABA triblock comb copolymers with oligo(oxyethylene)side chains as matrix for ion transport", Makromoleculare Chemie, 190, 1069-1078 (1988).*

(Continued)

*Primary Examiner*—David Wu
*Assistant Examiner*—Michael M Bernshteyn
(74) *Attorney, Agent, or Firm*—Darby & Darby PC

(57) ABSTRACT

The present invention provides a polymer solid electrolyte excellent in thermal properties, physical properties and ion conductivity and being close to practical level; especially, a totally solid electrolyte and a composition for producing the same. A composition for polymer solid electrolyte includes a copolymer having repeating units represented by Formula (I):

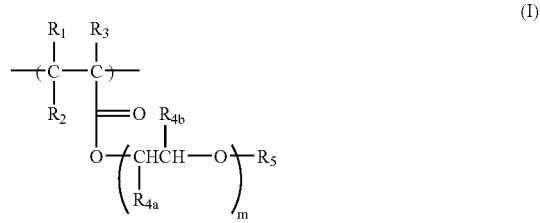

(wherein each of $R_1$ to $R_3$ independently represents a hydrogen atom or a C1-C10 hydrocarbon group; $R_{4a}$ and $R_{4b}$ independently represents a hydrogen atom or a methyl group; $R_5$ represents a hydrogen atom, a hydrocarbon group, an acyl group or a silyl group; and m is an integer of 1 to 100), and repeating units represented by Formula (II):

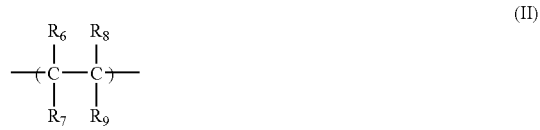

(wherein each of $R_6$ and $R_8$ independently represents a hydrogen atom or a C1-C10 hydrocarbon group; $R_9$ represents an organic group having at lease one functional group selected from the group consisting of hydroxyl group, carboxyl group, epoxy group, acid anhydride group and amino group); and an electrolyte salt.

11 Claims, 3 Drawing Sheets

OTHER PUBLICATIONS

Takeshi Shintani et al, "Characteristics of New-type solid electrolyte controled nano-structure (1)," 2002 Nen Denki Kagaku Shuki Taikai Koen Yoshishu, Sep. 4, 2003, The Electrochemical Society of Japan, p. 52, 2B31.

Mikiya Shimada et al, "Characteristics of New-type solid electrolyte controled nano-structure (2)," 2002 Nen Denki Kagaku Shuki Taikai Koen Yoshishu, Sep. 4, 2003, The Electrochemical Society of Japan, p. 53, 2B32.

Kiyoshi Kanemura et al, "Evaluation of All Solid-State Rechargeable Lithium Battery with MES Polymer Electrolyte Using Electrochemical impedance Spectroscopy," 2002 Nen Denki Kagaku Shuki Taikai Koen Yoshishu, Sep. 4, 2003, The Electrochemical Society of Japan, p. 53, 2B33.

G. Feuillade, et al., "Ion-conductive macromolecular gels and membranes for solid lithium cells", Journal of Applied Electrochemistry, Feb. 1975, vol. 5, pp. 63-69.

Wang, et al, 2000. "Atom Transfer Radical Polymerization of Hydrophilic Monomers in Aqueous Media at Ambient Temperature". Polymer Preprints 41(1): 484 - 485.

* cited by examiner

COMPOSITION FOR POLYMER SOLID ELECTROLYTE, POLYMER SOLID ELECTROLYTE, POLYMER, POLYMER SOLID ELECTROLYTE BATTERY, IONCONDUCTIVE MEMBRANE, COPOLYMER AND PROCESS FOR PRODUCING THE COPOLYMER

RELATED APPLICATIONS

This application is a 35 U.S.C. 371 national stage filing of International Application No. PCT/JP2004/000576, filed 23 Jan. 2004, which claims priority to Japanese Patent Application No. 2003-321155 filed on 12 Sep. 2003 in Japan. The contents of the aforementioned applications are hereby incorporated by reference.

TECHNICAL FIELD

The present invention relates to a polymer solid electrolyte suitable as a material for electrochemical devices such as batteries, capacitors, sensors, condensers, electrochromic elements, photoelectric conversion elements, etc.

BACKGROUND ART

As an example of a copolymer having repeating units of acrylate derivatives in which a polyalkylene oxide chain is present at the site of ester moiety, or an example of a polymer solid electrolyte using these, a polymer solid electrolyte including a cross-linked polymer matrix component (A) and electrolytic salt (B), characterized in that, in the polymer solid electrolyte produced by a polymerization reaction of the matrix component (A), the matrix component (A) contains at least a urethane (meth)acrylate compound (A1) and a polymerizing monomer (A2) represented by the general Formula (1) below is known (refer to Japanese Laid-Open Patent Application No. 2002-216845).

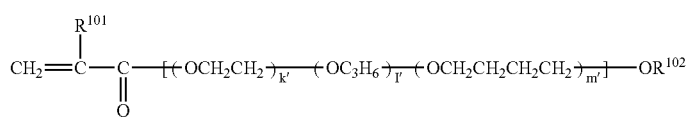

(1)

Also, a multi-branched polymer obtained by copolymerizing a mixture of monomers which includes at least a monomer (A) represented by the Formula (2):

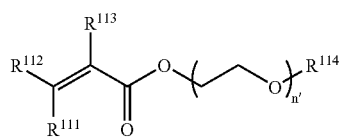

(2)

(wherein each of $R^{111}$ to $R^{113}$ independently represents a hydrogen atom or an alkyl group having 1-4 carbon atoms, $R^{114}$ represents a hydrogen atom, an alkyl group having 1-4 carbon atoms or an acyl group having 1-4 carbon atoms; and n represents an integer of 1 to 20), and a monomer (B) represented by the Formula (3):

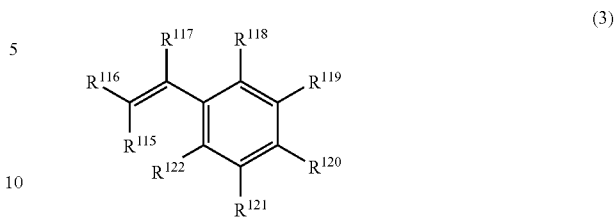

(3)

(wherein each of $R^{115}$ to $R^{117}$ independently represents a hydrogen atom or an alkyl group having 1-4 carbon atoms; each of $R^{118}$ to $R^{122}$ independently represents a hydrogen atom, a halogen atom, an alkyl group having 1-4 carbon atoms or a haloalkyl group having 1-4 carbon atoms; and at least one of $R^8$ to $R^{12}$ is a α-haloalkyl group having 1-4 carbon atoms), and a solid electrolyte produced by using thereof are known (refer to Japanese Laid-Open Patent Application No. 2001-181352.)

Moreover, a block copolymer composition characterized by including: (1) a block copolymer including a segment A having 10-100 mol % of at least one polar monomer selected from the group of the following polar monomers 1, 2 and 3, and a segment B having less than 10 mol % of the polar monomers; and (2) an ester compound, and a solid electrolyte produced by using thereof are known.

Polar monomer 1: a polar monomer which contains at least one polymerizable unsaturated bond and at least one functional group selected from the group consisting of hydroxyl, nitrile, carboxyl, amino, and amide group.

Polar monomer 2: a polar monomer which is represented by the

following general Formula (4):

(wherein each of $R^{201}$ and $R^{202}$ represents a hydrogen atom or an alkyl group having 1-5 carbon atoms; $R^{203}$ represents an alkyl group having 1-5 carbon atoms or a phenyl group; and t represents a repeating number and an integer of 1 to 25).

Polar monomer 3: a polar monomer which is represented by the following general Formula (5):

(wherein $R^{204}$ represents an alkyl group having 1-5 carbon atoms; $R^{205}$ represents an alkyl group having 1-10 carbon atoms or a phenyl group; and each f and g represents a repeating number and integers of 1 to 20) (refer to Japanese Patent Laid-Open Application No. H11-240998.)

DISCLOSURE OF THE INVENTION

However, none of the solid electrolytes described in the above patent publications has satisfied demands in terms of thermal properties, physical properties, and ionic conductivity.

Accordingly, an object of the present invention is to provide a practical level of polymer solid electrolyte, in particular, a totally solid electrolyte, excellent in thermal properties, physical properties, and ionic conductivity, and to provide a composition for producing the same.

The inventors of the present invention have diligently studied to solve the problems described above. Consequently, it has been found that, by incorporating repeating units formed by units of compounds having specific functional groups into a multi-branched polymer having a graft chain made of alkoxypolyalkylene glycol units, and making it a polymer matrix using a composition including a cross-linking agent having a conductivity with the functional groups, all of the thermal properties, physical properties, and ionic conductivity can be obtained at a satisfactory level, and completed the present invention.

That is, the present invention relates to:

(1) A composition for a polymer solid electrolyte including a copolymer having repeating units represented by Formula (I):

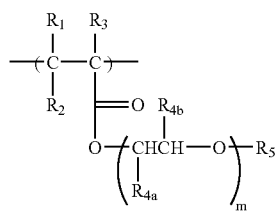

(wherein each of $R_1$-$R_3$ independently represents a hydrogen atom or a C1-C10 hydrocarbon group; $R_1$ and $R_3$ may bond to one another to form a ring; each of $R_{4a}$ and $R_{4b}$ independently represents a hydrogen atom or a methyl group; $R_5$ represents a hydrogen atom, a hydrocarbon group, an acyl group or a silyl group; m is an integer of 1 to 100, and each of $R_{4a}$ and each of $R_{4b}$ may be the same or different when m is 2 or more) and repeating units represented by Formula (II):

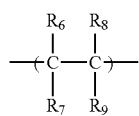

(wherein each of $R_6$ and $R_8$ independently represents a hydrogen atom or a C1-C10 hydrocarbon group; $R_6$ and $R_8$ may bond to one another to form a ring; and $R_7$ represents a hydrogen atom, a C1-C10 hydrocarbon group, a hydroxyl group, a hydrocarbonoxy group, a carboxyl group, an acid anhydride group, an amino group, an ester group, or an organic group having at least one functional group selected from the group consisting of hydroxyl group, carboxyl group, epoxy group, acid anhydride group and amino group; $R_9$ represents an organic group having at lease one functional group selected from the group consisting of hydroxyl group, carboxyl group, epoxy group, acid anhydride group and amino group); and an electrolyte salt;

(2) A composition for a polymer solid electrolyte according to (1), further including a cross-linking agent;

(3) A composition for a polymer solid electrolyte according to (1) or (2), wherein the amount of the cross-linking agent is 0.01 to 2 mol with respect to one mole of the repeating unit represented by the Formula (II);

(4) A composition for a polymer solid electrolyte according to (1) or (2), wherein the amount of the cross-linking agent is 0.1 to 1 mole with respect to one mole of the repeating unit represented by the Formula (II);

(5) A composition for a polymer solid electrolyte according to any one of (1) to (4), wherein 5 moles or more of the repeating unit represented the Formula (I) is included in the copolymer having the repeating units represented by the Formula (I) and the Formula (II);

(6) A composition for a polymer solid electrolyte according to any one of (1) to (5), wherein 5 moles or more of the repeating unit represented by the Formula (II) is included in the copolymer having the repeating units represented by the Formula (I) and the Formula (II);

(7) A composition for a polymer solid electrolyte according to any one of (1) to (6), wherein a number of moles of the repeating unit represented by the Formula (I) is within a range of 5 to 99% with respect to a number of moles of the total repeating units in the copolymer, and a number of moles of the repeating unit represented by the Formula (II) is within a range of 1 to 95% with respect to a number of moles of a total repeating units in the copolymer;

(8) A composition for a polymer solid electrolyte according to any one of (1) to (7), wherein the repeating units represented by the Formula (I) and the repeating units represented by the Formula (II) are block bonded;

(9) A composition for a polymer solid electrolyte according to any one of (1) to (8), wherein the copolymer having the repeating units represented by the Formula (I) and the Formula (II) further includes a repeating unit derived from a polymerizable unsaturated monomer, which is different from the repeating units represented by the Formula (I) and the Formula (II);

(10) A composition for a polymer solid electrolyte according to (9), wherein the repeating unit derived from polymerizable unsaturated monomers, different from those represented by the Formulae (I) and (II), is at least one repeating unit selected from those represented by Formula (III)

(wherein each of $R_{10}$ to $R_{12}$ independently represents a hydrogen atom or a C1-C10 hydrocarbon group, and $R_{13}$ represents an aryl group or a heteroaryl group); and Formula (IV)

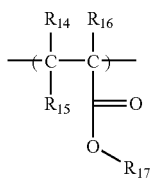

(wherein each of $R_{14}$ to $R_{16}$ independently represents a hydrogen atom or a C1-C10 hydrocarbon group; $R_{14}$ and $R_{16}$ may bond to one another to form a ring; and $R_{17}$ represents a C1-C12 alkyl group, an aryl group, an alicyclic hydrocarbon group, or a heterocyclic group);

(11) A composition for a polymer solid electrolyte according to (9) or (10), wherein 5 moles or more of the repeating unit derived from polymerizable unsaturated monomer, which is different from those represented by the Formulae (I) and (II) is included;

(12) A composition for a polymer solid electrolyte according to any one of (9) to (11), wherein the repeating unit represented by the Formula (I), the repeating unit represented by the Formula (II), and the repeating unit derived from polymerizable unsaturated monomer different from those represented by the Formula (I) and the Formula (II) are block bonded;

(13) A composition for a polymer solid electrolyte according to any one of (9) to (12), wherein a total number of moles of the repeating unit represented by the Formula (I) and the repeating unit derived from polymerizable unsaturated monomer, different from those represented by the Formula (I) and the Formula (II), is within the range of 5-99% with respect to a total number of repeating units in the copolymer, and a number of moles of the repeating unit represented by the Formula (II) is within the range of 1-95% with respect to the total number of repeating units in the copolymer;

(14) A composition for a polymer solid electrolyte according to any one of (9) to (13), wherein, with respect to a total number of moles of the repeating units in the copolymer, a number of moles of the repeating unit represented by the Formula (I) is within a range of 9.9-80%, a number of moles of the repeating unit represented by the Formula (II) is within a range of 0.1-50%, and a number of moles of the repeating unit derived from polymerizable unsaturated monomer, different from those represented by the Formula (I) and the Formula (II), is within a range of 19.9-90%;

(15) A composition for a polymer solid electrolyte according to any one of (1) to (14), wherein the copolymer having the repeating units represented by the Formula (I) and the Formula (II) is a copolymer having an arrangement of block chains in an order of B1, C1, A, C2, and B2, wherein the block chain A has the repeating unit represented by the Formula (I); the block chain B1 has the repeating unit represented by the Formula (II), the block chain B2 has the repeating unit represented by the Formula (II) which may be the same or different from B1; the block chain C1 has a repeating unit represented by the Formula (III):

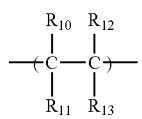

(wherein each of $R_{10}$ to $R_{12}$ independently represents a hydrogen atom or a C1-C10 hydrocarbon group, and $R_{13}$ represents an aryl group or a heteroaryl group); and the block chain C2 has a repeating unit represented by the Formula (III) which may be the same or different from C1;

(16) A composition for a polymer solid electrolyte according to (15), wherein the arrangement of B1, C1, A, C2, and B2 is an arrangement in which units of B1-C1-A-C2-B2 are bonded;

(17) A composition for a polymer solid electrolyte according to any one of (1) to (16), wherein a number average molecular weight of the copolymer having repeating units represented by the Formula (I) and the Formula (II) is within the range of 5,000 to 1,000,000;

(18) A composition for a polymer solid electrolyte according to any one of (I) to (17), wherein the repeating unit represented by the Formula (II) is a repeating unit represented by Formula (IV):

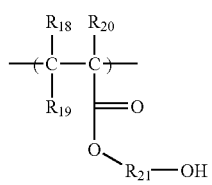

(wherein each of $R_{18}$ to $R_{20}$ independently represents a hydrogen atom or a C1-C10 hydrocarbon group; $R_{18}$ and $R_{20}$ may bond to one another to form a ring; and $R_{21}$ represents a C1-C6 alkylene group, a C6-C10 bivalent aromatic hydrocarbon group, a C3-C10 bivalent alicyclic hydrocarbon group, or a bivalent organic group of a complex thereof), or a repeating unit represented by Formula (V):

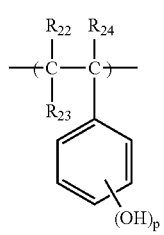

(wherein each of $R_{22}$ to $R_{24}$ independently represents a hydrogen atom or a C1-C10 hydrocarbon group; and p represents an integer of 1 to 3), or a repeating unit represented by Formula (VI):

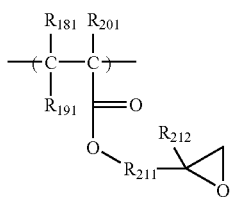
(VI)

(wherein each of $R_{181}$, $R_{191}$, and $R_{201}$ independently represents a hydrogen atom or a C1-C10 hydrocarbon group; $R_{181}$ and $R_{201}$ may bond to one another to form a ring; $R_{211}$ represents a C1-C6 alkylene group, a C6-C10 bivalent aromatic hydrocarbon group, a C3-C10 bivalent alicyclic hydrocarbon group or a bivalent organic group of a complex thereof; and $R_{212}$ represents a hydrogen atom or a C1-C4 alkyl group), or a repeating unit represented by Formula (VII)

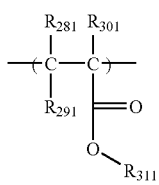
(VII)

(wherein each of $R_{281}$, $R_{291}$ and $R_{301}$ independently represents a hydrogen atom or a C1-C10 hydrocarbon group; $R_{281}$ and $R_{301}$ may bond to one another to form a ring; and $R_{311}$ represents a hydrogen atom or a functional group represented by Formula (VIII):

—$R_{411}$—$CO_2H$ (VIII)

(wherein $R_{411}$ represents a C1-C6 alkylene group, a C6-C10 bivalent aromatic hydrocarbon group, a C3-C10 bivalent alicyclic hydrocarbon group or a bivalent organic group of a complex thereof));

(19) A composition for a polymer solid electrolyte according to any one of (1) to (18), wherein the copolymer has a microphase-separated structure;

(20) A composition for a polymer solid electrolyte according to any one of (2) to (19), wherein the cross-linking agent is a polyisocyanate compound including two or more isocyanate groups within its molecule, or an epoxy compound including two or more epoxy groups within its molecule;

(21) A composition for a polymer solid electrolyte according to any one of (2) to (19), wherein the repeating unit represented by the Formula (II) is a repeating unit derived from a (meth)acrylate derivative having an epoxy group; and the cross-linking agent is an epoxy hardener;

(22) A composition for a polymer solid electrolyte according to any one of (2) to (19), wherein $R_9$ in the repeating unit represented by the Formula (II) is an organic group having a carboxyl group, and the cross-linking agent is an epoxy compound including two or more epoxy groups within its molecule;

(23) A composition for a polymer solid electrolyte according to any one of (1) to (22), wherein the electrolyte salt is at least one selected from the group consisting of alkali metal salts, quaternary ammonium salts, quaternary phosphonium salts, transition metal salts, and protonic acids;

(24) A composition for a polymer solid electrolyte according to any one of (1) to (23), wherein the electrolyte salt is a lithium salt;

(25) A polymer solid electrolyte, including: a copolymer having repeating units represented by Formula (I):

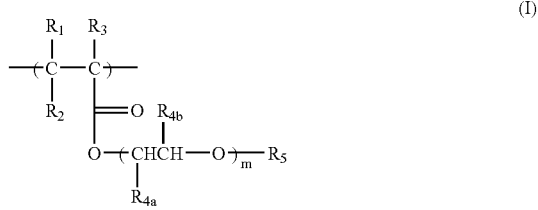
(I)

(wherein each of $R_1$-$R_3$ independently represents a hydrogen atom or a C1-C10 hydrocarbon group; $R_1$ and $R_3$ may bond to one another to form a ring; each of $R_{4a}$ and $R_{4b}$ independently represents a hydrogen atom or a methyl group; $R_5$ represents a hydrogen atom, a hydrocarbon group, an acyl group or a silyl group; m is an integer of 1 to 100, and each of $R_{4a}$ and $R_{4b}$ may be the same or different when m is 2 or more) and repeating units represented by Formula (II):

(II)

(wherein each of $R_6$ and $R_8$ independently represents a hydrogen atom or a C1-C10 hydrocarbon group; $R_6$ and $R_8$ may bond to one another to form a ring; and $R_7$ represents a hydrogen atom, a C1-C10 hydrocarbon group, a hydroxyl group, a hydrocarbonoxy group, a carboxyl group, an acid anhydride group, an amino group, an ester group, or an organic group having at least one functional group selected from the group consisting of hydroxyl group, carboxyl group, epoxy group, acid anhydride group and amino group; $R_9$ represents an organic group having at lease one functional group selected from the group consisting of hydroxyl group, carboxyl group, epoxy group, acid anhydride group and amino group); and an electrolyte salt;

(26) A polymer solid electrolyte, including:
a cross-linked polymer obtained by a reaction of a cross-linking agent with a copolymer having repeating units represented by Formula (I):

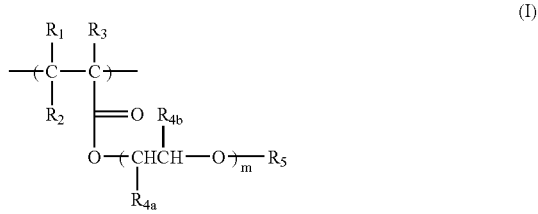
(I)

(wherein each of $R_1$-$R_3$ independently represents a hydrogen atom or a C1-C10 hydrocarbon group; $R_1$ and $R_3$ may bond to one another to form a ring; each of $R_{4a}$ and $R_{4b}$ independently represents a hydrogen atom or a methyl group; $R_5$ represents a hydrogen atom, a hydrocarbon group, an acyl group or a silyl group; m is an integer of 1 to 100, and each of $R_{4a}$ and $R_{4b}$ may be the same or different when m is 2 or more) and repeating units represented by Formula (II):

$$\begin{array}{c} R_6 \quad R_8 \\ | \quad | \\ -(C-C)- \\ | \quad | \\ R_7 \quad R_9 \end{array} \quad (II)$$

(wherein each of $R_6$ and $R_8$ independently represents a hydrogen atom or a C1-C10 hydrocarbon group; $R_6$ and $R_8$ may bond to one another to form a ring; and $R_7$ represents a hydrogen atom, a C1-C10 hydrocarbon group, a hydroxyl group, a hydrocarbonoxy group, a carboxyl group, an acid anhydride group, an amino group, an ester group, or an organic group having at least one functional group selected from the group consisting of hydroxyl group, carboxyl group, epoxy group, acid anhydride group and amino group; $R_9$ represents an organic group having at least one functional group selected from the group consisting of hydroxyl group, carboxyl group, epoxy group, acid anhydride group and amino group); and an electrolyte salt;

(27) A polymer solid electrolyte according to (26), wherein the cross-linking agent is used in the range of 0.01 to 2 mole with respect to one mole of the repeating unit represented by the Formula (II);

(28) A polymer solid electrolyte according to (26), wherein the cross-linking agent is used in the range of 0.1 to 1 mole with respect to one mole of the repeating units represented by the Formula (II);

(29) A polymer solid electrolyte according to any one of (25) to (28), wherein an amount of the repeating unit represented by the Formula (I) is 5 moles or more in the copolymer having repeating units represented by the Formula (I) and the Formula (II);

(30) A polymer solid electrolyte according to any one of (25) to (29), wherein an amount of the repeating unit represented by the Formula (II) is 5 moles or more in the copolymer having repeating units represented by the Formula (I) and the Formula (II);

(31) A polymer solid electrolyte according to any one of (25) to (30), wherein a number of moles of the repeating unit represented by the Formula (I) is within a range of 5 to 99% with respect to a number of moles of a total repeating units in the copolymer, and a number of moles of the repeating unit represented by the Formula (II) is within a range of 1 to 95% with respect to a number of moles of a total repeating units in the copolymer;

(32) A polymer solid electrolyte according to any one of (25) to (31), wherein the repeating unit represented by the Formula (I) and the repeating unit represented by the Formula (II) are block bonded;

(33) A polymer solid electrolyte according to any one of (25) to (32), wherein the copolymer having the repeating units represented by the Formula (I) and the Formula (II) further includes a repeating unit derived from a polymerizable unsaturated monomer, which is different from the repeating units represented by the Formula (I) and the Formula (II);

(34) A polymer solid electrolyte according to (33), wherein the repeating unit derived from polymerizable unsaturated monomers, different from those represented by the Formulae (I) and (II), is at least one selected from those represented by Formula (III):

$$\begin{array}{c} R_{10} \quad R_{12} \\ | \quad | \\ -(C-C)- \\ | \quad | \\ R_{11} \quad R_{13} \end{array} \quad (III)$$

(wherein each of $R_{10}$ to $R_{12}$ independently represents a hydrogen atom or a C1-C10 hydrocarbon group, and $R_{13}$ represents an aryl group or a heteroaryl group); and Formula (IV):

$$\begin{array}{c} R_{14} \quad R_{16} \\ | \quad | \\ -(C-C)- \\ | \quad \\ R_{15} \quad \overset{\displaystyle}{\underset{\displaystyle O}{C}}=O \\ \phantom{R_{15} \quad } \diagdown R_{17} \end{array} \quad (IV)$$

(wherein each of $R_{14}$ to $R_{16}$ independently represents a hydrogen atom or a C1-C10 hydrocarbon group; $R_{14}$ and $R_{16}$ may bond to one another to form a ring; and $R_{17}$ represents a C1-C12 alkyl group, an aryl group, an alicyclic hydrocarbon group, or a heterocyclic group);

(35) A polymer solid electrolyte according to (33) or (34), wherein 5 moles or more of the repeating unit derived from polymerizable unsaturated monomer, which is different from those represented by the Formulae (I) and (II) is included;

(36) A polymer solid electrolyte according to any one of (33) to (35), wherein the repeating unit represented by the Formula (I), the repeating unit represented by the Formula (II), and the repeating unit derived from polymerizable unsaturated monomer different from those represented by the Formula (I) and the Formula (II) are block bonded;

(37) A polymer solid electrolyte according to any one of (33) to (36), wherein a total number of moles of the repeating unit represented by the Formula (I) and the repeating unit derived from polymerizable unsaturated monomer, different from those represented by the Formula (I) and the Formula (II), is within a range of 5-99% with respect to a total number of repeating units in the copolymer, and a number of moles of the repeating unit represented by the Formula (II) is within a range of 1-95% with respect to the total number of repeating units in the copolymer;

(38) A polymer solid electrolyte according to any one of (33) to (37), wherein, with respect to a total number of moles of the repeating units in the copolymer, a number of moles of the repeating unit represented by the Formula (I) is within a range of 9.9-80%, a number of moles of the repeating unit represented by the Formula (II) is within a range of 0.1-50%, and a number of moles of the repeating unit derived from polymerizable unsaturated monomer, different from those represented by the Formula (I) and the Formula (II), is within a range of 19.9-90%;

(39) A polymer solid electrolyte according to any one of (25) to (38), wherein the copolymer having the repeating units represented by the Formula (I) and the Formula (II) is a copolymer having an arrangement of block chains in an order of B1, C1, A, C2, and B2, wherein the block chain A has the repeating unit represented by the Formula (I); the block chain B1 has the repeating unit represented by the Formula (II), the block chain B2 has the repeating unit represented by the Formula (II) which may be the same or different from B1; the block chain C1 has a repeating unit represented by the Formula (III):

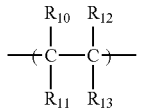

(III)

(wherein each of $R_{10}$ to $R_{12}$ independently represents a hydrogen atom or a C1-C10 hydrocarbon group, and $R_{13}$ represents an aryl group or a heteroaryl group); and the block chain C2 has a repeating unit represented by the Formula (III) which may be the same or different from C1;

(40) A polymer solid electrolyte according to (39), wherein the arrangement of B1, C1, A, C2, and B2 is an arrangement in which units of B1-C1-A-C2-B2 are bonded;

(41) A polymer solid electrolyte according to any one of (25) to (40), wherein a number average molecular weight of the copolymer having repeating units represented by the Formula (I) and the Formula (II) is within the range of 5,000 to 1,000,000;

(42) A polymer solid electrolyte according to any one of (25) to (41), wherein the repeating unit represented by the Formula (II) is a repeating unit represented by Formula (IV):

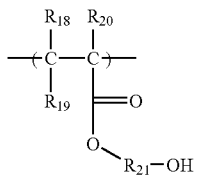

(IV)

(wherein each of $R_{18}$ to $R_{20}$ independently represents a hydrogen atom or a C1-C10 hydrocarbon group; $R_{18}$ and $R_{20}$ may bond to one another to form a ring; and $R_{21}$ represents a C1-C6 alkylene group, a C6-C10 bivalent aromatic hydrocarbon group, a C3-C10 bivalent alicyclic hydrocarbon group, or a bivalent organic group of a complex thereof), or a repeating unit represented by Formula (V):

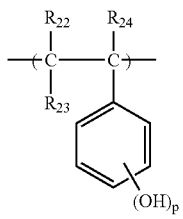

(V)

(wherein each of $R_{22}$ to $R_{24}$ independently represents a hydrogen atom or a C1-C10 hydrocarbon group; and p represents an integer of 1 to 3), or a repeating unit represented by Formula (VI):

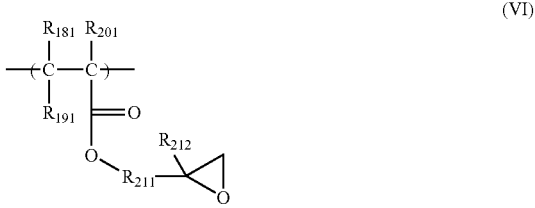

(VI)

(wherein each of $R_{181}$, $R_{191}$, and $R_{201}$ independently represents a hydrogen atom or a C1-C10 hydrocarbon group; $R_{181}$ and $R_{201}$ may bond to one another to form a ring; $R_{211}$ represents a C1-C6 alkylene group, a C6-C10 bivalent aromatic hydrocarbon group, a C3-C10 bivalent alicyclic hydrocarbon group or a bivalent organic group of a complex thereof; and $R_{212}$ represents a hydrogen atom or a C1-C4 alkyl group), or a repeating unit represented by Formula (VII):

(VII)

(wherein each of $R_{281}$, $R_{291}$ and $R_{301}$ independently represents a hydrogen atom or a C1-C10 hydrocarbon group; $R_{281}$ and $R_{301}$ may bond to one another to form a ring; and $R_{311}$ represents a hydrogen atom or a functional group represented by Formula (VIII)

—$R_{411}$—$CO_2H$ (VIII)

(wherein $R_{411}$ represents a C1-C6 alkylene group, a C6-C10 bivalent aromatic hydrocarbon group, a C3-C10 bivalent alicyclic hydrocarbon group or a bivalent organic group of a complex thereof));

(43) A polymer solid electrolyte according to any one of (25) to (42), wherein the cross-linked polymer is a copolymer having a microphase-separated structure;

(44) A polymer solid electrolyte according to any one of (25) to (43), characterized by having a network type microphase-separated structure;

(45) A polymer solid electrolyte according to any one of (26) to (44), wherein the cross-linked polymer has urethane bonding derived from the cross-linking agent;

(46) A polymer solid electrolyte according to any one of (26) to (45), wherein the cross-linking agent is a polyisocyanate compound including two or more isocyanate groups within its molecule, or an epoxy compound including two or more epoxy groups within its molecule;

(47) A polymer solid electrolyte according to any one of (26) to (46), wherein the repeating unit represented by the Formula (II) is a repeating unit derived from a (meth)acrylate derivative having an epoxy group; and the cross-linking agent is an epoxy hardener;

(48) A polymer solid electrolyte according to any one of (26) to (47), wherein $R_9$ in the repeating unit represented by the Formula (II) is an organic group having a carboxyl group, and the cross-linking agent is an epoxy compound including two or more epoxy groups within its molecule;

(49) A polymer solid electrolyte according to any one of (25) to (48), wherein the electrolyte salt is at least one selected from the group consisting of alkali metal salts, quaternary ammonium salts, quaternary phosphonium salts, transition metal salts, and protonic acids;

(50) A polymer solid electrolyte according to any one of (25) to (49), wherein the electrolyte salt is a lithium salt;

(51) A polymer, including: a polymer segment (P1) having an ion-conductivity, a polymer segment (P2) not having an ion-conductivity, and a polymer segment (P3) having a cross-linking point disposed in an order of P3, P2, P1, P2, and P3;

(52) A composition for a polymer solid electrolyte, including: a polymer segment (P1) having an ion-conductivity, a polymer segment (P2) not having an ion-conductivity, and a polymer segment (P3) having a cross-linking point disposed in an order of P3, P2, P1, P2, and P3; a cross-linking agent; and an electrolytic salt;

(53) A polymer solid electrolyte, including a cross-linked polymer obtained by a reaction of a polymer with a cross-linking agent, and an electrolytic salt, wherein the polymer includes a polymer segment (P1) having an ion-conductivity, a polymer segment (P2) not having an ion-conductivity, and a polymer segment (P3) having a cross-linking point, the polymer being disposed in an order of P3, P2, P1, P2, and P3;

(54) A polymer solid electrolyte battery, including: a solid electrolyte made into a film using the composition for a polymer solid electrolyte according to any one of (1) to (24) or the composition for a polymer solid electrolyte according to (52); and an electrode;

(55) A polymer solid electrolyte battery, including: the polymer solid electrolyte according to any one of (25) to (50) or the polymer solid electrolyte according to (53); and an electrode;

(56) A polymer solid electrolyte battery according to (54) or (55), wherein the electrode includes an electrode-activating compound and a copolymer including a disposition of block chains arranged in an order of B11, A11 and C11, wherein the block chain A11 includes a repeating unit represented by Formula (XX):

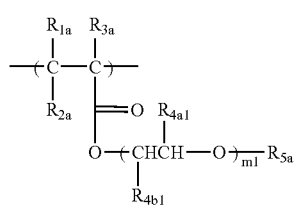

(wherein each of $R_{1a}$ and $R_{3a}$ independently represents a hydrogen atom or a C1-C10 hydrocarbon group; $R_{1a}$ and $R_{3a}$ may bond to one another to form a ring; each of $R_{4a1}$ and $R_{4b1}$ independently represents a hydrogen atom or a methyl group; $R_{5a}$ represents a hydrogen atom, a hydrocarbon group, an acyl group or a silyl group; m1 represents an integer of 2 to 100; and $R_{4a1}$ and $R_{4b1}$ may be the same or different from each other), and the block chain B11 includes a repeating unit represented by Formula (XXI):

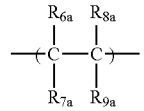

(wherein each of $R_{6a}$ to $R_{8a}$ independently represents a hydrogen atom or a C1-C10 hydrocarbon group; and $R_{9a}$ represents an aryl group);

(57) A polymer solid electrolyte battery according to (56), wherein the block chain C11 is a repeating unit represented by Formula (XXII):

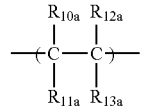

(wherein each of $R_{10a}$ to $R_{12a}$ independently represents a hydrogen atom or a C1-C10 hydrocarbon group; and $R_{13a}$ represents an aryl group or a heteroaryl group);

(58) A polymer solid electrolyte battery according to (56) or (57) wherein the position of the block chains of B11, A11 and C11 is B11-A11-C11;

(59) A polymer solid electrolyte battery according to any one of (56) to (58), wherein the copolymer includes 10 moles or more of the repeating unit represented by the Formula (XX);

(60) A polymer solid electrolyte battery according to any one of (56) to (59), wherein the copolymer includes 5 moles or more of the repeating unit represented by the Formula (XXI);

(61) A polymer solid electrolyte battery according to any one of (57) to (60), wherein the copolymer includes 5 moles or more of the repeating unit represented by Formula (XXII);

(62) A polymer solid electrolyte battery according to any one of (56) to (61), wherein m1 in the Formula (XX) is an integer of 5 to 100;

(63) A polymer solid electrolyte battery according to any one of (56) to (61), wherein m1 in the Formula (XX) is an integer of 10 to 100;

(64) A polymer solid electrolyte battery according to any one of (57) to (63), wherein $R13_a$ in the Formula (XXII) is an aryl group, and the copolymer includes 5 or more of the repeating units represented by the Formula (XXII);

(65) A polymer solid electrolyte battery according to any one of (56) to (64), wherein a molar ratio ((XX)/((XXI)+C11)) of the repeating unit represented by the Formula (XX) to a total of the repeating unit represented by the Formula (XXI) and the repeating unit included in the block chain C11 is in a range of 1/30 to 30/1;

(66) A polymer solid electrolyte battery according to any one of (57) to (65), wherein a molar ratio of the repeating units represented by Formula (XX) to the total repeating units of those represented by Formula (XXI) and (XXII), i.e., ((XX)/((XXI)+(XXII))) is in the range of 1/30 to 30/1;

(67) A polymer solid electrolyte battery according to any one of (56) to (66), wherein a number average molecular weight of the copolymer is in the range of 5,000 to 1,000,000;

(68) A polymer solid electrolyte battery according to any one of (56) to (67), wherein the cross-linked polymer is a copolymer having a microphase-separated structure;

(69) A polymer solid electrolyte battery according to any one of (56) to (68), wherein the electrode includes 0.5 to 15% by weight of the copolymer and the electrolytic salt;

(70) A polymer solid electrolyte battery according to any one of (56) to (69), wherein the electrode is an anode and includes an electroconductive material;

(71) A polymer solid electrolyte battery according to (56) to (68), wherein an anode is the electrode according to (69), and a cathode is the electrode according to any one of (56) to (69) or an alkali metal;

(72) A polymer solid electrolyte battery according to any one of (56) to (68), wherein an anode is the electrode according to (70), and a cathode is the electrode according to any one of (56) to (69) or an alkali metal;

(73) A polymer solid electrolyte battery according to any one of (56) to (72), wherein the electrode further includes an electrolytic salt;

(74) An ion-conductive membrane, including: a membrane which includes a polymer segment (P1) having an ion-conductivity, a polymer segment (P2) not having an ion-conductivity, and a cross-linked polymer segment (P4), wherein a network type microphase-separated structure is included in the membrane;

(75) An ion-conductive membrane, including: a membrane containing a cross-linked polymer which is obtained by a reaction of a polymer with a cross-linking agent, wherein the polymer includes a polymer segment (P1) having an ion-conductivity, a polymer segment (P2) not having an ion-conductivity, and a polymer segment (P3) having a cross-linking point, wherein a network type microphase-separated structure is included in the membrane;

(76) An ion-conductive membrane according to (75), wherein the polymer including the polymer segment (P1) having an ion-conductivity, the polymer segment (P2) not having an ion-conductivity, and the polymer segment (P3) having a cross-linking point, forms a microphase-separated structure;

(77) A copolymer having an arrangement of block chains in an order of B1, C1, A, C2, and B2, wherein the block chain A has a repeating unit represented by Formula (I):

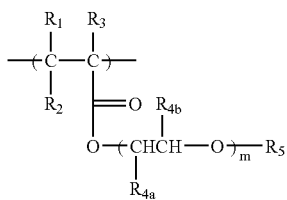

(wherein each of $R_1$ to $R_3$ independently represents a hydrogen atom or a C1-C10 hydrocarbon group; $R_1$ and $R_3$ may bond to one another to form a ring; each of $R_{4a}$ and $R_{4b}$ independently represents a hydrogen atom or a methyl group; $R_5$ represents a hydrogen atom, a hydrocarbon group, an acyl group or a silyl group; m is an integer of 1 to 100, and each of $R_{4a}$ and $R_{4b}$ may be the same or different when m is 2 or more);

the block chain B1 has a repeating unit represented by Formula (II):

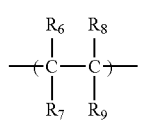

(wherein each of $R_6$ and $R_8$ independently represents a hydrogen atom or a C1-C10 hydrocarbon group; $R_6$ and $R_8$ may bond to one another to form a ring; and $R_7$ represents a hydrogen atom, a C1-C10 hydrocarbon group, a hydroxyl group, a hydrocarbonoxy group, a carboxyl group, an acid anhydride group, an amino group, an ester group, or an organic group having at least one functional group selected from the group consisting of hydroxyl group, carboxyl group, epoxy group, acid anhydride group and amino group; $R_9$ represents an organic group having at lease one functional group selected from the group consisting of hydroxyl group, carboxyl group, epoxy group, acid anhydride group and amino group);

the block chain B2 having a repeating unit represented by the Formula (II) which may be the same or different from B1;

the block chain C1 has a repeating unit represented by Formula (III):

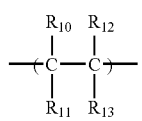

(wherein each of $R_{10}$ to $R_{12}$ independently represents a hydrogen atom or a C1-C10 hydrocarbon group, and $R_{13}$ represents an aryl group or a heteroaryl group); and the block chain C2 has a repeating unit represented by the Formula (III) which may be the same or different from C1;

(78) A polymer solid electrolyte according to (77), wherein the arrangement in order of B1, C1, A, C2, and B2 is an arrangement in which units of B1-C1-A-C2-B2 are bonded;

(79) A copolymer according to (77) or (78), wherein a degree of polymerization of the repeating units represented by the Formula (I) is 5 or more;

(80) A copolymer according to any one of (77) to (79), wherein the copolymer includes 5 moles or more of the repeating unit represented by the Formula (II);

(81) A copolymer according to any one of (77) to (80), wherein the copolymer includes 5 moles or more of the repeating unit represented by the Formula (III);

(82) A polymer solid electrolyte according to any one of (77) to (81), wherein, with respect to a total number of moles of the repeating units in the copolymer, a number of moles of the repeating unit represented by the Formula (I) is within a range of 9.9-80%, a number of moles of the repeating unit represented by the Formula (II) is within a range of 0.1-50%, and a number of moles of the repeating unit represented by the Formula (III) is within a range of 19.9-90%;

(83) A copolymer according to any one of (77) to (82), wherein a number average molecular weight of the copolymer is within the range of 5,000 to 1,000,000;

(84) A copolymer according to any one of (77) to (83), wherein the repeating unit represented by Formula (II) is a repeating unit represented by Formula (IV):

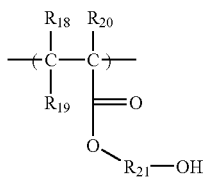

(IV)

(wherein each of $R_{18}$ to $R_{20}$ independently represents a hydrogen atom or a C1-C10 hydrocarbon group; $R_{18}$ and $R_{20}$ may bond to one another to form a ring; $R_{21}$ represents a C1-C6 alkylene group, a C6-C10 bivalent aromatic hydrocarbon group, a C3-C10 bivalent alicyclic hydrocarbon group or a bivalent organic group of a complex thereof), a repeating unit represented by Formula (V):

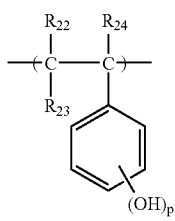

(V)

(wherein each of $R_{22}$ to $R_{24}$ independently represents a hydrogen atom or a C1-C10 hydrocarbon group; and p represents an integer of 1 to 3), a repeating unit represented by Formula (VI):

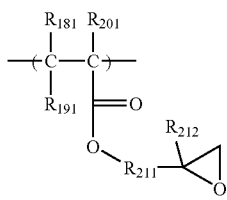

(VI)

(wherein each of $R_{181}$, $R_{191}$ and $R_{201}$ independently represents a hydrogen atom or a C1-C10 hydrocarbon group; $R_{181}$ and $R_{201}$ may bond to one another to form a ring; $R_{211}$ represents a C1-C6 alkylene group, a C6-C10 bivalent aromatic hydrocarbon group, a C3-C10 bivalent alicyclic hydrocarbon group or a bivalent organic group of a complex thereof; and R212 represents a hydrogen atom or an alkyl group), or a repeating unit represented by Formula (VII):

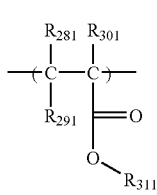

(VII)

(wherein each of $R_{281}$, $R_{291}$ and $R_{301}$ independently represents a hydrogen atom or a C1-C10 hydrocarbon group; $R_{281}$ and $R_{301}$ may bond to one another to form a ring; and $R_{311}$ represents a hydrogen atom or a functional group represented by Formula (VIII)

(VIII)

(wherein $R_{411}$ represents a C1-C6 alkylene group, a C6-C10 bivalent aromatic hydrocarbon group, a C3-C10 bivalent alicyclic hydrocarbon group or a bivalent organic group of a complex thereof));

(85) A copolymer according to any one of (77) to (84), wherein the copolymer has a microphase-separated structure;

(86) A method for producing the copolymer of any one of (77) to (85), characterized by using a living radical polymerization method, wherein a transition metal complex is used as a catalyst and an organic halogen compound having one or more halogen atoms is used as a polymerization initiator;

(87) A copolymer, including: a repeating unit represented by Formula (XXX):

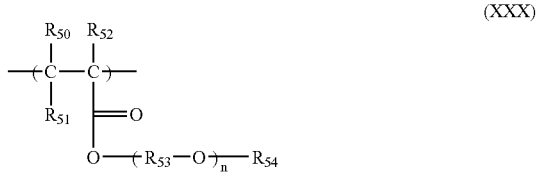

(XXX)

(wherein each of $R_{50}$ to $R_{52}$ independently represents a hydrogen atom or a C1-C10 hydrocarbon group; $R_{53}$ represents a C1-C6 alkylene group having a linear or branched chain, or a C3-C10 bivalent alicyclic hydrocarbon group; $R_{54}$ represents a hydrogen atom, a hydrocarbon group, an acyl group, or a silyl group; n is an integer of 1 to 100; and $R_{53}$ may be the same or different when n is 2 or more);

at least one repeating unit selected from a repeating unit represented by Formula (XXXI):

(XXXI)

(wherein each of $R_{55}$ to $R_{57}$ independently represents a hydrogen atom or a C1-C10 hydrocarbon group; and $R_{58}$ represents an aryl group or a heteroaryl group), and a repeating units represented by Formula (XXXII)

(XXXII)

(wherein each of $R_{59}$ to $R_{61}$ independently represents a hydrogen atom or a C1-C10 hydrocarbon group; $R_{59}$ and $R_{61}$ may bond to one another to form a ring; and $R_{62}$ represents a C1-C12 alkyl group, an aryl group, an alicyclic hydrocarbon group or a heterocyclic group); and a repeating unit represented by Formula (XXXIII):

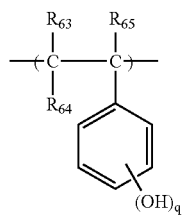

(XXXIII)

(wherein each of $R_{63}$ to $R_{65}$ independently represents a hydrogen atom or a C1-C10 hydrocarbon group; and q represents an integer of 1 to 3) which is different from the repeating unit represented by the Formula (XXXI);

(88) A copolymer according to (87) including 5 moles or more of the repeating units represented by Formula (XXX);

(89) A copolymer according to (87) or (88), characterized by having 5 moles or more of at least one of the repeating unit selected from those represented by the Formula (XXXI) and (XXXII);

(90) A copolymer according to any one of (87) to (89), wherein the repeating unit represented by the Formula (XXX), at least one of the repeating units selected from those expressed by the Formula (XXXI) and (XXXII), and the repeating unit represented by the Formula (XXXIII) are block bonded;

(91) A copolymer according to any one of (87) to (90), wherein a number average molecular weight is in a range of 5,000 to 1,000,000;

(92) A copolymer according to any one of (87) to (91), wherein a mole number of the repeating unit represented by the Formula (XXX) with respect to a total number of moles of the repeating units in the copolymer is within a range of 5 to 99 mol %, and a mole number of the repeating unit represented by the Formula (XXXIII) with respect to a total number of moles of the repeating units in the copolymer is within a range of 1 to 95%;

(93) A copolymer according to any one of (87) to (92), wherein a total of a number of moles of the repeating units represented by the Formula (XXX) and at least one of the repeating units selected from those represented by the Formula (XXXI) and (XXXII) is within a range of 5 to 99% with respect to a total number of moles of the repeating units in the copolymer, and a mole number of the repeating unit represented by the Formula (XXXIII) is in a range of 1 to 95% with respect to a total number of moles of the repeating units in the copolymer.

A composition for a polymer solid electrolyte or a polymer solid electrolyte according to the present invention may be characterized by including a copolymer in which the repeating units represented by Formula (I) and (II) are essential components, and an electrolytic salt.

In the repeating units represented by Formula (I), each of R1 to R3 independently represents a hydrogen atom or a C1-C10 hydrocarbon group such as methyl, ethyl, n-propyl, isopropyl, n-butyl, sec-butyl, isobutyl, t-butyl, phenyl, naphthyl, benzyl, and $R_1$ and $R_3$ may bond to one another to form a ring. Each of $R_{4a}$ and $R_{4b}$ independently represents a hydrogen atom or a methyl group. $R_5$ represents a hydrocarbon group such as methyl, ethyl, n-propyl, isopropyl, n-butyl, sec-butyl, isobutyl, t-butyl, n-hexyl, phenyl, substituted phenyl, naphthyl, an acyl group such as formyl, acetyl, propyonyl, and butyryl, a silyl group such as trimethylsilyl, t-butyldimethylsilyl, and dimethylphenylsilyl.

Each of $R_1$ to $R_5$ may include substituent groups at suitable carbon atoms. Typical examples of such substituent groups include a halogen atom such as fluorine, chlorine, bromine; a hydrocarbon group such as methyl, ethyl, n-propyl, phenyl, naphthyl, benzyl; an acyl group such as acetyl, and benzoyl; a hydrocarbonoxyl group such as nitryl, nitro, methoxy, phenoxy; a metylthio, methylsulfinyl, methylsulfonyl, amino, dimethylamino, anilino group, and so forth.

m represents an integer of 1 to 100, preferably an integer of 2 to 50, and the value of m in each repeating unit may be identical or different. $R_{4a}$ and $R_{4b}$ may be identical or different when m is 2 or more. The number of moles of repeating units represented by Formula (I) is preferably 5, and more preferably 10 or more, although it depends on the value of m.

Examples of repeating units represented by Formula (I) may include those derived from the following compounds. Also, these repeating units may be used alone or in a mixture of two or more.

2-metoxy (meth)acrylate, 2-ethoxyethyl (meth)acrylate, 2-methoxypropyl (meth)acrylate, 2-ethoxypropyl (meth)acrylate, methoxypolyethylene glycol (the number of ethylene glycol units is in the range of 2 to 100) (meth)acrylate, ethoxypolyethylene glycol (meth)acrylate, phenoxypolypropylene glycol (meth)acrylate, methoxypolypropylene glycol (the number of ethylene glycol units is in the range of 2 to 100) (meth)acrylate, ethoxypolypropylene glycol (meth)acrylate, phenoxypolypropylene glycol (meth)acrylate, polyethylene glycol mono (meth)acrylate, 2-hydroxypropyl (meth)acrylate, polypropylene glycol mono (meth)acrylate, polyethylene glycol-polypropylene glycol mono (meth)acrylate, octoxypolyethylene glycol-polypropylene glycol mono (meth)acrylate, lauroxypolyethylene glycol mono (meth)acrylate, stearoxypolyethylene glycol mono (meth)acrylate, "Blenmer PME series" (in Formula (I), $R_1=R_2=$a hydrogen atom; $R_3=$a methyl group; and a monomer corresponding to m=2 to 90, a product of NOF corporation), acetyloxypolyethylene glycol (meth)acrylate, benzoyloxypolyethylene glycol (meth)acrylate, trimethylsilyloxypolyethylene glycol (meth)acrylate, t-butyldimethylsilyloxypolyethylene glycol (meth)acrylate, methoxypolyethylene glycol cyclohexene-1-carboxylate, and methoxypolyethylene glycol-cinnamate.

Moreover, in the repeating units represented by Formula (II), each of $R_6$ and $R_8$ independently represents a hydrogen atom or a hydrocarbon group having 1 to 10 carbon atoms such as methyl, ethyl, n-propyl, isopropyl, n-butyl, sec-butyl, isobutyl, t-butyl, phenyl, naphthyl, and benzyl. and, $R_6$ and $R_8$ may bond to one another to form a ring. $R_7$ represents a hydrogen atom, a hydrocarbon group having 1 to 10 carbon atoms, a hydrocarbonoxyl group such as hydroxyl, methoxy, ethoxy, and phenoxy; a carboxyl group, an acid anhydride group, an amino group, an ester group, or an organic group having at least one functional group selected from the group consisting of hydroxyl, carboxyl, epoxy, acid anhydride, and amino group; $R_9$ represents an organic group having at least one functional group selected from the group consisting of hydroxyl, carboxyl, epoxy, acid anhydride, and amino group, and examples of such an organic group may include organic groups represented by the following formulae wherein p1 represents an integer of 1 to 3.

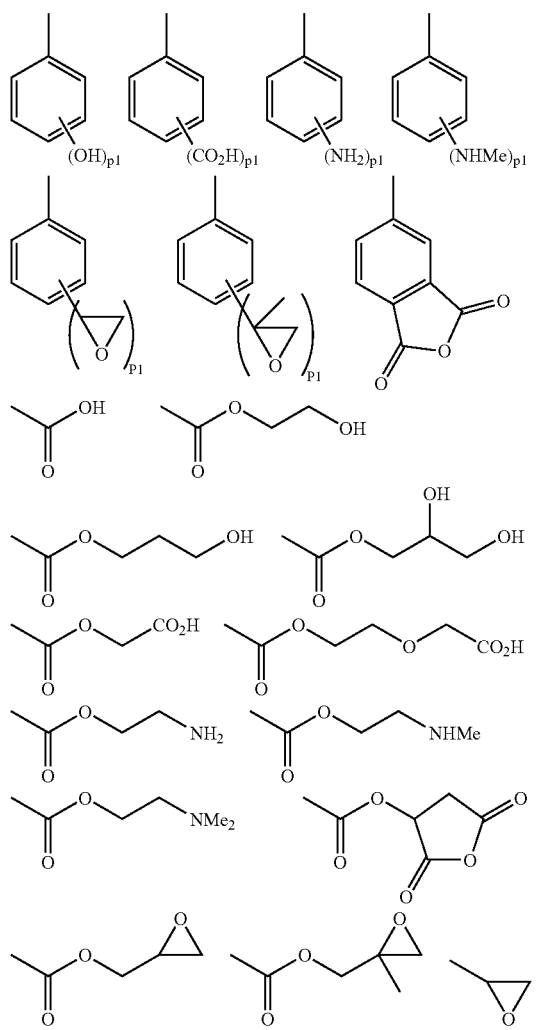

bivalent aromatic hydrocarbon groups and the bivalent alicyclic hydrocarbon groups described above. Each of $R_{18}$ and $R_{21}$ may include substituent groups at suitable carbon atoms. Typical examples of such substituent groups include halogen atoms such as fluorine, chlorine, and bromine; hydrocarbon groups such as methyl, ethyl, n-propyl, phenyl, naphthyl, and benzyl; acyl groups such as acetyl and benzoyl; hydrocarbonoxy groups such as nitryl, nitro, methoxy, and phenoxy; metylthio, methylsulfinyl, methylsulfonyl, amino, dimethylamino, anilino group, and so forth.

Examples of the repeating units represented by Formula (IV) may include those derived from compounds of the following formulae. Also, those repeating units may be used alone or in a mixture of two or more.

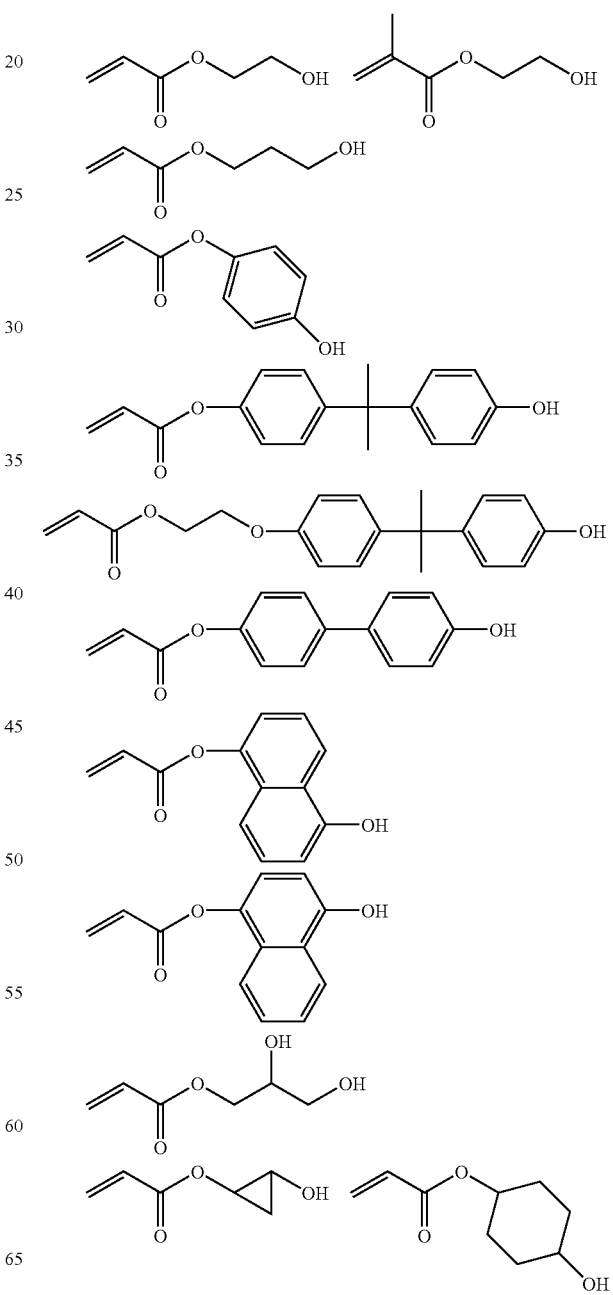

Also, each of $R_6$ to $R_9$ may include substituent groups at suitable carbon atoms. Typical examples of such substituent groups include a halogen atom such as fluorine, chlorine, and bromine; a hydrocarbon group such as methyl, ethyl, n-propyl, phenyl, naphthyl, and benzyl; an acyl group such as acetyl, and benzoyl; a hydrocarbonoxy group such as nitryl, nitro, methoxy, and phenoxy; a methylthio, methylsulfinyl, methylsulfonyl, amino, dimethylamino, anilino group, and so forth.

Of the repeating units represented by Formula (II) shown above, those represented by Formula (IV), (V), (VI) and (VII) are particularly preferable.

In Formula (IV), each of $R_{18}$ to $R_{20}$ independently represents a hydrogen atom or a hydrocarbon group having 1 to 10 carbon atoms such as methyl, ethyl, n-propyl, isopropyl, n-butyl, sec-butyl, isobutyl, t-butyl, phenyl, naphthyl, and benzyl; and $R_{18}$ and $R_{20}$ may bond to one another to form a ring. $R_{21}$ represents a C1-C6 alkylene group such as methylene, ethylene, 1-methylethylene, and propylene; a C6-C10 bivalent aromatic hydrocarbon group such as phenylene and naphthylene; or a C3-C10 bivalent alicyclic hydrocarbon group such as cyclopropylene, cyclobutylene, cyclohexylene, and adamantandiyl. Also, $R_{21}$ represents a bivalent organic group of a complex formed by combining two or more selected from the group consisting of the alkylene groups, the

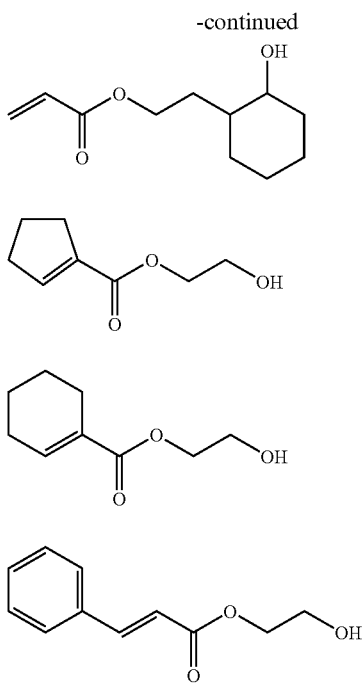

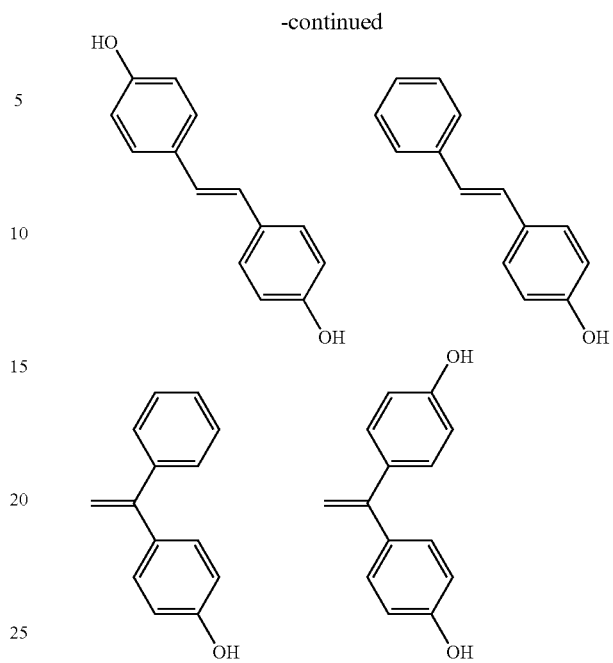

In Formula (V), each of $R_{22}$ to $R_{24}$ independently represents a hydrogen atom or a hydrogen group having 1 to 10 carbon atoms such as methyl, ethyl, n-propyl, isopropyl, n-butyl, sec-butyl, isobutyl, t-butyl, phenyl, naphthyl, and benzyl; p represents an integer of 1 to 3; and the substitution position of a hydroxyl group is not limited. Also, a suitable substituent group may be present at an appropriate carbon atom of $R_{22}$ to $R_{24}$ and the phenyl group. Typical examples of such substituent groups are halogen atoms such as fluorine, chlorine, and bromine; hydrocarbon groups such as methyl, ethyl, n-propyl, phenyl, naphthyl, and benzyl; acyl groups such as acetyl and benzoyl; hydrocarbonoxy groups such as nitryl, nitro, methoxy, and phenoxy; metylthio, methylsulfinyl, methylsulfonyl, amino, dimethylamino, anilino group, and so forth.

Examples of the repeating units represented by Formula (V) may include those derived from compounds of the following formulae. Also, those repeating units may be used alone or in a mixture of two or more.

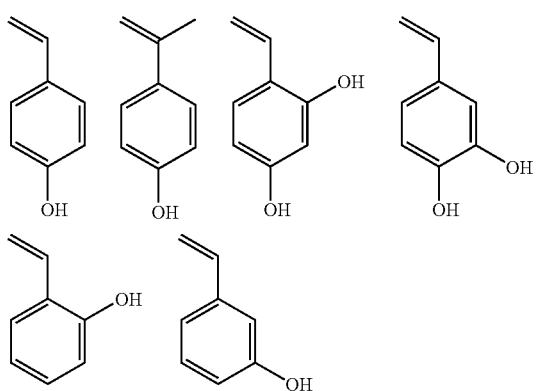

In Formula (VI), each of $R_{181}$, $R_{191}$ and $R_{201}$ independently represents a hydrogen atom or a hydrocarbon group having 1 to 10 carbon atoms such as methyl, ethyl, n-propyl, isopropyl, n-butyl, sec-butyl, isobutyl, t-butyl, phenyl, naphthyl, and benzyl, and $R_{181}$ and $R_{201}$ may bond to one another to form a ring. $R_{211}$ represents a C1-C6 alkylene group such as methylene, ethylene, 1-methylethylene, and propylene; a C6-C10 bivalent aromatic hydrocarbon group such as phenylene and naphthylene; or a C3-C10 bivalent alicyclic hydrocarbon group such as cyclopropylene, cyclobutylene, cyclohexylene, and adamantandiyl. Also, $R_{211}$ represents a bivalent organic group of a complex formed by combining two or more selected from the group consisting of the alkylene groups, the bivalent aromatic hydrocarbon groups and the bivalent alicyclic hydrocarbon groups described above. $R_{212}$ represents a hydrogen atom or a C1-C4 alkyl group such as methyl, ethyl, n-propyl, isopropyl, n-butyl, sec-butyl, isobutyl, and t-butyl. $R_{181}$, $R_{191}$, $R_{201}$ and $R_{212}$ may include substituent groups at suitable carbon atoms. Typical examples of such substituent groups include halogen atoms such as fluorine, chlorine, and bromine; hydrocarbon groups such as methyl, ethyl, n-propyl, phenyl, naphthyl, and benzyl; acyl groups such as acetyl and benzoyl; hydrocarbonoxy groups such as nitryl, nitro, methoxy, and phenoxy; metylthio, methylsulfinyl, methylsulfonyl, amino, dimethylamino, anilino group, and so forth.

Examples of repeating units represented by Formula (VI) may include those derived from compounds of the following formulae. Also, these repeating units may be used alone or in a mixture of two or more.

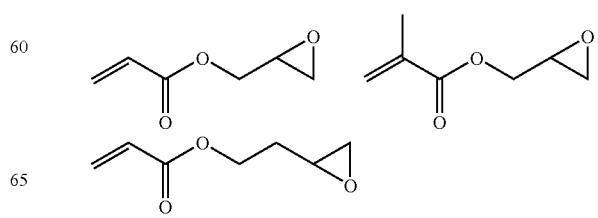

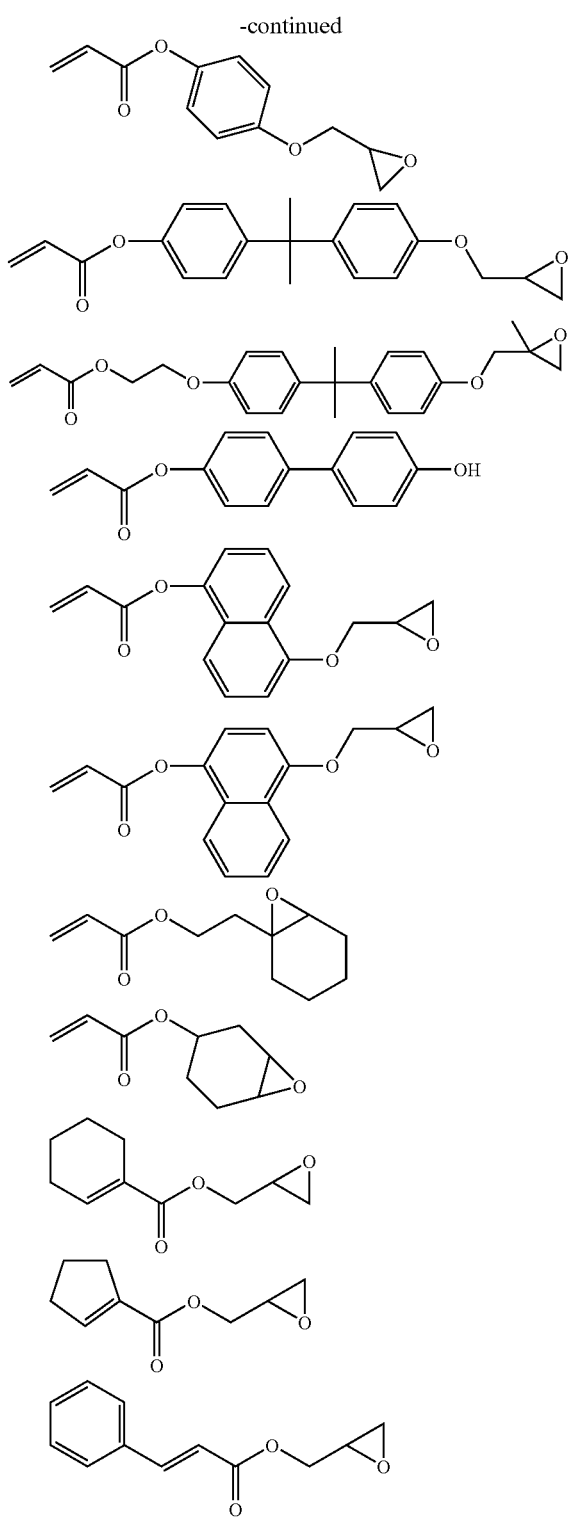

In Formula (VII), each of $R_{281}$, $R_{291}$ and $R_{301}$ independently represents a hydrogen atom or a hydrocarbon group having 1 to 10 carbon atoms such as methyl, ethyl, n-propyl, isopropyl, n-butyl, sec-butyl, isobutyl, t-butyl, phenyl, naphthyl, and benzyl, and $R_{281}$ and $R_{301}$ may bond to one another to form a ring. $R_{311}$ represents a hydrogen atom or a functional group represented by Formula (VIII). In Formula (VIII), $R_{411}$ represents a C1-C6 alkylene group such as methylene, ethylene, 1-methylethylene, and propylene; a C6-C10 bivalent aromatic hydrocarbon group such as phenylene and naphthylene; or a C3-C10 bivalent alicyclic hydrocarbon group such as cyclopropylene, cyclobutylene, cyclohexylene, and adamantandiyl. $R_{411}$ represents a bivalent organic group of a complex formed by combining two or more selected from the group consisting of the alkylene group, the bivalent aromatic hydrocarbon group and the bivalent alicyclic hydrocarbon group described above. $R_{281}$, $R_{291}$, $R_{301}$, $R_{311}$ and $R_{411}$ may include substituent groups at suitable carbon atoms. Typical examples of such substituent groups include halogen atoms such as fluorine, chlorine, and bromine; hydrocarbon groups such as methyl, ethyl, n-propyl, phenyl, naphthyl, and benzyl; acyl groups such as acetyl and benzoyl; hydrocarbonoxy groups such as nitryl, nitro, methoxy and phenoxy; metylthio, methylsulfinyl, methylsulfonyl, amino, dimethylamino, anilino group, and so forth.

Examples of the repeating units represented by Formula (VII) may include those derived from compounds of the following formulae. Also, these repeating units may be used alone or in a mixture of two or more.

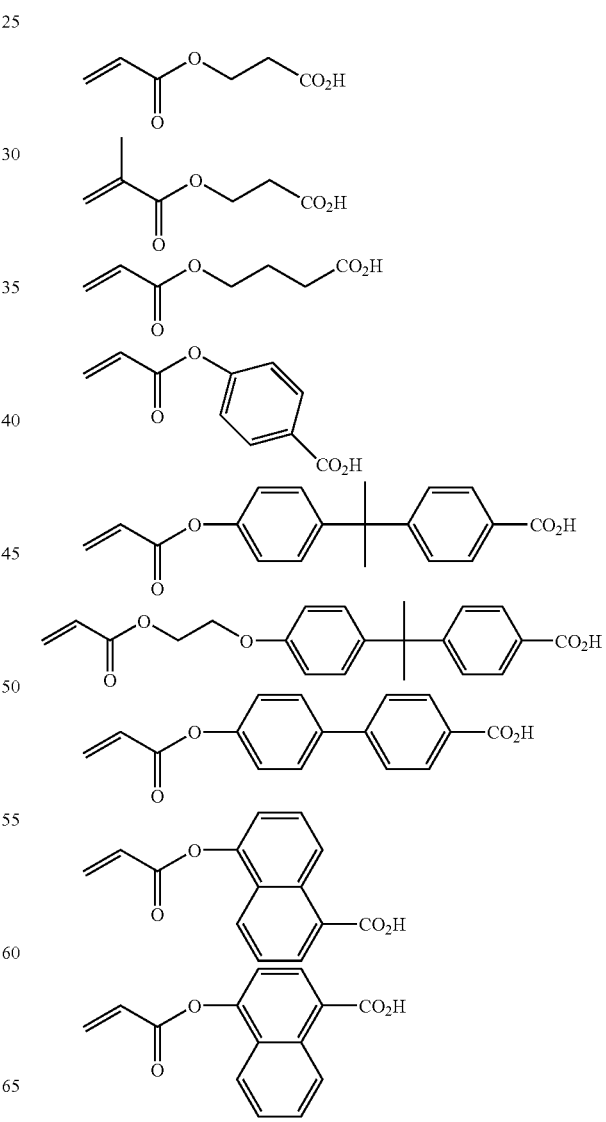

-continued

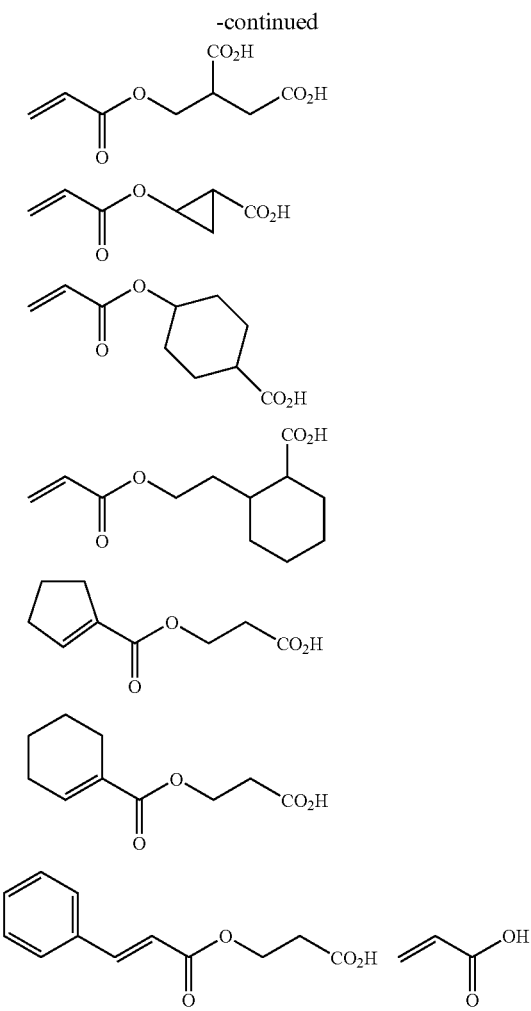

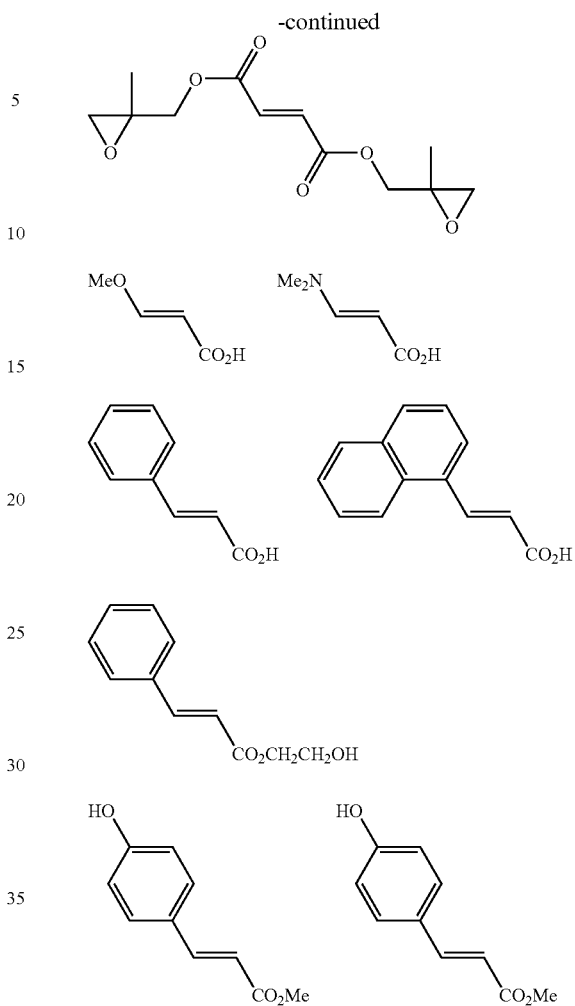

Examples of repeating units represented by Formula (II) other than those represented by Formula (IV) to (VII) may include those derived from compounds of the following formulae. Also, these repeating units may be used alone or in a mixture of two or more.

It is preferable that the number of moles of the repeating units represented by Formula (II) be 5 moles or more, although it is not expressly limited if in the range where a membrane having sufficient thermal and physical properties can be formed by a cross-linking reaction.

In the copolymer including the repeating units represented by Formula (I) and (II), it is preferable that the number of moles of the repeating units represented by Formula (I) with respect to the total number of moles of the copolymer be in the range of 5 to 99%. If it is less than 5%, sufficient electric conductivity may not be obtained. If it is more than 99%, sufficient thermal and physical properties may not be obtained.

Although the bonded state of the repeating units represented by Formula (I) and (II) is not particularly limited, it is preferable that these repeating units are block-bonded. If block-bonded, a microphase-separated structure will appear when produced or formed into a membrane, and superior ionic conductivity can be obtained even in a solid state. The term "block-bonded" means that polymer chains having repeating units represented by Formulae (I) and (II) bond directly to one another or indirectly via other polymer chains or linking groups. In this case, the other polymer chain may be of a homopolymer or a binary or multinary copolymer, and if it is a copolymer, the bonding state thereof is not particularly limited and may be random or block. Also, "a polymer chain including repeating units represented by Formula (I) and (II)" means a polymer chain including only the repeating units represented by Formula (I) or (II), or a copolymer chain including the repeating units represented by Formula (I) or (II) and other components.

In addition, other than the repeating units represented by Formula (I) and (II), it is possible to include repeating units derived from polymerizable unsaturated monomers different from those represented by Formula (I) and (II) if necessary.

Although the above-mentioned repeating units derived from polymerizable unsaturated monomers are not particularly limited as long as it is a repeating unit obtained by polymerizing a monomer using radical polymerization or ion polymerization, repeating units represented by Formula (III) or (IV) are preferable examples thereof.

In Formula (III), each of $R_{10}$ to $R_{12}$ independently represents a hydrogen atom or a hydrocarbon group having 1 to 10 carbon atoms such as methyl, ethyl, n-propyl, isopropyl, n-butyl, sec-butyl, isobutyl, t-butyl, phenyl, naphthyl, and benzyl, and $R_{13}$ represents an aryl group such as phenyl, naphthyl and anthracenyl group, or a heteroaryl group such as 2-pyridyl and 4-pyridyl group. $R_{10}$ to $R_{13}$ may include substituent groups at suitable carbon atoms. Typical examples of such substituent groups are halogen atoms such as fluorine, chlorine, and bromine; hydrocarbon groups such as methyl, ethyl, n-propyl, phenyl, naphthyl, and benzyl; acyl groups such as acetyl and benzoyl; hydrocarbonoxy groups such as nitryl, nitro, methoxy, phenoxy, etc.; metylthio, methylsulfinyl, methylsulfonyl, amino, dimethylamino, anilino group, and so forth.

Examples of repeating units represented by Formula (III) may include those derived from compounds of the following compounds. Also, these may be used alone or in a mixture of two or more.

Styrene, o-methylstyrene, p-methylstyrene, p-t-butylstyrene, α-methylstyrene, p-t-butoxystyrene, m-t-butoxystyrene, 2,4-dimethylstyrene, m-chlorostyrene, p-chlorostyrene, 1-vinylnaphthalene, 9-vinylanthracene, 2-vinylpyridin, 4-vinylpyridin, methyl cinnamate, etc.

In Formula (IV), each of $R_{14}$ to $R_{16}$ independently represents a hydrogen atom or a hydrocarbon group having 1 to 10 carbon atoms such as methyl, ethyl, n-propyl, isopropyl, n-butyl, sec-butyl, isobutyl, t-butyl, phenyl, naphthyl, and benzyl; $R_{14}$ and $R_{16}$ may bond to one another to form a ring; $R_{17}$ represents a C1-C12 hydrocarbon group such as methyl, ethyl, n-propyl, isopropyl, n-butyl, sec-butyl, isobutyl, t-butyl, phenyl, naphthyl, benzyl, cyclopropyl, cyclohexyl, norbornyl, and adamantly group, a heterocyclic group such as 2-pyridyl and 4-pyridyl; and a C1-C12 alkyl group, an aryl group, an alicyclic hydrocarbon group and a heterocyclic group are preferable examples thereof.

$R_{14}$ to $R_{17}$ may include substituent groups at suitable carbon atoms. Typical examples of such substituent groups are halogen atoms such as fluorine, chlorine, and bromine; hydrocarbon groups such as methyl, ethyl, n-propyl, phenyl, naphthyl, and benzyl; acyl groups such as acetyl and benzoyl; hydrocarbonoxy groups such as nitryl, nitro, methoxy, and phenoxy; metylthio, methylsulfinyl, methylsulfonyl, amino, dimethylamino, anilino group, and so forth.

Examples of repeating units represented by Formula (IV) may include those derived from the following compounds. Also, these may be used alone or in a mixture of two or more.

Methyl (meth)acrylate, ethyl (meth)acrylate, n-butyl (meth)acrylate, t-butyl (meth)acrylate, cyclohexyl (meth)acrylate, benzyl (meth)acrylate, isobornyl (meth)acrylate, dicyclopentenyl (meth)acrylate, 1-adamantyl (meth)acrylate, 2-methyl-2-adamantyl (meth)acrylate, 1-methyleneadamanthyl (meth)acrylate, 1-ethyleneadamanthyl (meth)acrylate, 3,7-dimethyl-1-adamanthyl (meth)acrylate, tricyclodecanyl (meth)acrylate, norbornane (meth)acrylate, mentyl (meth)acrylate, n-propyl (meth)acrylate, isopropyl (meth)acrylate, 2-ethylhexyl (meth)acrylate, isodecyl (meth)acrylate, isooctyl (meth)acrylate, lauryl (meth)acrylate, cyclohexyl (meth)acrylate, tetrahydrofuranyl (meth)acrylate, tetrahydropyranyl (meth)acrylate, 3-oxocyclohexyl (meth)acrylate, butyrolactone (meth)acrylate, and mevalonic lactone (meth)acrylate.

Examples of repeating units different from those represented by Formulae (I) and (II), other than those represented by Formulae (III) and (IV), may include repeating units derived from the following compounds. These compounds may be used alone or in a mixture of two or more.

Conjugated diens such as 1,3-butadiene, isoprene, 2,3-dimethyl-1,3-butadiene, 1,3-pentadiene, 2-methyl-1,3-pentadiene, 1,3-hexadiene, 1,6-hexadiene, 4,5-diethyl-1,3-octadiene, 3-butyl-1,3-octadiene, chloroprene; α,β-unsaturated carboximide such as N-methylmaleimide and N-phenylmaleimide; and α,β-unsaturated nitriles such as (meta)acrylonitrile.

Although the number of moles of the repeating units derived from polymerizable unsaturated monomer other than those represented by Formulae (I) and (II) are not particularly limited, it is preferably 5 moles or more in a total with the repeating unit represented by the formula (I), and more preferably 10 moles or more.

Also, the sum of the number of moles of the repeating units represented by Formula (I) and the repeating units derived from polymerizable unsaturated monomers other than those represented by Formulae (I) and (II) is preferably in the range of 1 to 95% with respect to the total number of moles of the repeating units in the copolymer. If it is 1% or less, ionic conductivity may be lowered. If it is 95% or more, thermal properties and physical properties thereof may decline.

According to the present invention, the bonding state of polymer chain (A) including repeating units represented by Formula (I), polymer chain (B) including repeating units represented by Formula (II), and polymer chain (C) including repeating units derived from unsaturated bonding monomers other than the repeating units represented by Formulae (I) and (II) is not particularly limited, and it is preferable that the repeating units are block-bonded. The term "block-bonded" means that the polymer chains (A), (B) and (C) bond directly to each other or indirectly via other polymer chains or linking groups. A tapered-block in which the ratio of components of the repeating units which form each of the polymer chains, is also included in the block bonding. The other polymer chain may be of a homopolymer or a binary or multinary copolymer, and if it is a copolymer, the bonding state thereof is not particularly limited and may be random, tapered-block or block. Also, "a polymer chain (A) including repeating units represented by Formula (I), etc." means a polymer chain including only the repeating units represented by Formula (I), etc., or a copolymer chain including the repeating units represented by Formula (I), etc. and other components.

Examples of the bonding state of each polymer chain (A), (B) and (C) include [(A)-(B)]j, [(A)-(B)-(C)]j, [(A)-(B)-(A)]j, [(C)-(B)-(A)-(B)-(C)]j (wherein j represents an integer of one or more).

Also, it is possible to make each of the above-mentioned block copolymer a block copolymer in which segments thereof are extended or branched via residues of a coupling agent as expressed by the following Formulae (11) to (14) wherein w represents an integer of one or more and X represents a residue of a coupling agent:

[(A)-(B)]w-X (11)

[(A)-(B)-(C)]w-X (12)

[(A)-(B)-(A)]w-X (13)

[(C)-(B)-(A)-(B)-(C)]w-X (14)

In particular, if the polymer chain (C) which is a non-polar polymer chain is included, a microphase-separated structure will appear and ionic conductivity may be improved.

If a polymer chain having repeating units represented by Formula (III) is used as the polymer chain (C), a copolymer in which block chains are disposed in an order of B1, C1, A, C2 and B2 may be preferably used, where the block chain A has repeating units represented by Formula (I), the block chains B1 and B2 have repeating units represented by Formula (II) and the block chains C1 and C2 have repeating units represented by Formula (III). The term that "block chains are arranged in an order of B1, C1, A, C2 and B2" means that each of block chain may bond directly to another or indirectly via other components such as linking groups and other polymer chain. Examples of the other components include repeating units included in each of the block chain other than those represented by Formulae (I) to (III). The polymerization of these repeating units to the repeating units represented by Formulae (I) to (III) is not particularly limited, and may be any one of random polymerization, block polymerization and syndiotactic polymerization. Also, if other polymer chains are included as repeating units, these may be homopolymers or binary or multinary copolymers, and in the case of the copolymers, the bonding state of the copolymers is not particularly limited and may be in the state of random, block, or in a gradient in which the ratio of components gradually changes. Among these, an arrangement in which block chains are bonded in a sequence of B1-C1-A-C2-B2 is preferable. In this case, the term "bonding" means that each of the block chains bonds directly, or indirectly through a low molecular linking group such as an oxygen atom, an alkylene group, and so forth. Also, in the sequence, each of the chains B1 and B2, and each of the chains C1 and C2 may be the same or different.

In the above case, it is preferable that, in the copolymer having the repeating units represented by Formulae (I), (II) and (III), the number of moles of those represented by Formula (I) be in the range of 9.9 to 80%, the number of moles of those represented by Formula (II) be in the range of 0.1 to 50% and the number of moles of those represented by Formula (III) be in the range of 19.9 to 90%. If 9.9% or more of the repeating units represented by Formula (I) are present, more sufficient electric conductivity is obtained. If 80% or less of the repeating units represented by Formula (I) are present, more sufficient thermal properties and physical properties are obtained. If 0.1% or more of the repeating units represented by Formula (II) are present, cross-linked density will not be lowered and more sufficient thermal and physical properties can be obtained. If 50% or less of the repeating units represented by Formula (II) are present, more sufficient electric conductivity are obtained. If 19.9% or more of the repeating units represented by Formula (III) are present, more sufficient thermal and physical properties can be obtained, and if 90% or less, more sufficient electric conductivity can be obtained.

Although the number average molecular weight of the copolymer of the present invention including the repeating units represented by Formula (I) and (II) and other repeating units such as those represented by Formula (III), (IV) which may be added according to necessity, is not particularly limited, it is preferably in the range of 5,000 to 1,000,000. If the number average molecular weight is more than 5,000, thermal and physical properties will be improved. If the number average molecular weight is less than 1,000,000, its formability or feasibility for forming a membrane will increase. Also, although the ratio (Mw/Mn) of the weight average molecular weight (Mw) to the number average molecular weight (Mn) is not particularly limited, it is preferably in the range of 1.01 to 2.50, and more preferably in the range of 1.01 to 1.50 for the purpose of forming a microphase-separated structure as described hereinafter.

The copolymer used in the present invention can be produced with compounds represented by Formulae (XI) and (XII) by using known methods such as radical polymerization, living radical polymerization, and living anion polymerization.

Also, repeating units derived from unsaturated monomers other than the repeating units represented by Formula (I) and (II), which may be produced in the same way, for example, by further using monomers represented by the following Formula (XIII) and Formula (XIV):

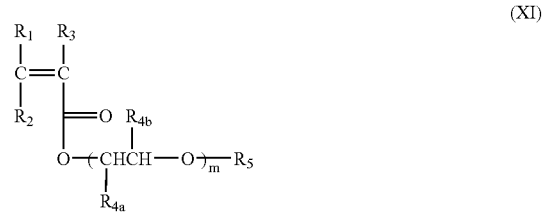

In Formulae (XI) to (XIV), $R_1$ to $R_{17}$ are the same as defined above.

Also, as for an example of a block copolymer, which is a preferable form of polymerization, explanation in detail is given in the following, in which:

(a) A method in which after one of the repeating units represented by Formula (I) and (II) are synthesized, the other repeating units are synthesized subsequently to produce a block copolymer;

(b) A method in which after the repeating units represented by Formula (I) and (II) are synthesized separately, each of the repeating units is bonded by a coupling reaction to produce a block copolymer;

(c) A method in which the repeating units represented by Formula (II) are synthesized by using a polymerization initiator including the repeating units represented by Formula (I) in the molecule thereof to produce a block copolymer; and A method in which the repeating units represented by Formula (I) are synthesized by using a polymerization initiator including the repeating units represented by Formula (II) in the molecule thereof to produce a block copolymer.

Particularly, for producing a copolymer having a sequence in an order of B1, C1, A, C2 and B2, as described above, it is preferably produced with compounds represented by Formulae (XI), (XII) and (XIII) by using a known method such as a living radical polymerization method in which a transition metal complex is used as a catalyst and an organic halogen compound having one or more of halogen atoms is used as a polymerization initiator, a living radical polymerization method using stable radicals, and a living anion polymerization method. Of these methods, a living radical polymerization method in which a transition metal complex is used as a catalyst and an organic halogen compound having one or more of halogen atoms is used as a polymerization initiator is preferable.

Examples of the method further include, in more detail, (a) a method in which block chains are sequentially extended by reacting a macro-initiator, which contains block chains such as a bifunctional block chain obtained by reacting the compound represented by the Formula (XI) using a bifunctional initiator in a living radical polymerization method, with monomers forming other block chains; (b) a method in which block chains are extended subsequently from an end in the same manner as in the method (a) except that a compound of Formula (XII) is used instead of one of Formula (XI) and that a monofunctional initiator is used; and (c) a method in which a block copolymer is produced using a coupling reaction after each block chain or a part of each block chain is polymerized in a given sequence, and so forth. The living radical polymerization described above can be carried out by using a transition metal complex as a catalyst and an organic halogen compound having one or more halogen atoms in the molecule as an initiator.

Examples of methods for producing a copolymer using a living radical polymerization method include the following:
i. A method in which after a degree of conversion of a first monomer reaches 100%, a second monomer is added to complete the polymerization, and a block copolymer is sequentially obtained by further repeating this process;
ii. A method in which, even if the degree of conversion of the first monomer does not reach 100%, polymerization is continued by adding the second monomer at the point it reaches a targeted degree of polymerization or molecular weight to obtain gradient copolymer having random parts between block chains.
iii. A method in which, even if the degree of conversion of the first monomer does not reach 100%, the reaction is stopped at the point it reaches a targeted degree of polymerization or molecular weight. The polymer is taken out of the system and copolymerization is intermittently continued by using the obtained polymer as a macro-initiator and adding other monomers to obtain a block copolymer.

Reaction conditions used for each of the polymerization methods are not particularly limited, and reaction conditions known in general can be adopted.

If a reaction is carried out with compounds having activated hydrogen such as a hydroxyl and carboxyl group by using a method of living radical polymerization or living anion polymerization, the activated hydrogen may be protected using a reaction known for protection such as silylation, acetalation, BOC protection, etc., in necessary, and then, a polymerization reaction is carried out. After the polymerization reaction, a reaction for deblocking the protected groups can be carried out with acids, alkalis, etc.

Tracing for polymerization or confirmation of the completion of the reaction can be easily carried out by using gas chromatography, liquid chromatography, gel permeation chromatography, membrane osmometry, NMR, etc. After the polymerization reaction, a copolymer can be obtained by using a normal separation-purification method such as column purification, or filtering and drying polymer components which are precipitated after being put into water or poor solvents.

Examples of a polymer of the present invention include a polymer having an arrangement in an order of P3, P2, P1, P2 and P3, wherein P1 is an ion-conductive polymer segment, P2 is an ion-nonconductive segment, and P3 is a polymer segment having cross-linking points. Examples of an ion-conductive polymer segment (P1) include the above described block chain A, examples of an ion-nonconductive segment (P2) include the above described block chains B1 and B2, and examples of a polymer segment having cross-linking points (P3) include the above described polymer chains C1 and C2.

The composition for a polymer solid electrolyte of the present invention is characterized by including the above described copolymers and electrolytic salts, and preferably contains a cross-linking agent. Although the above described copolymers may include two or more kinds of structural units, it is preferable that a copolymer having a microphase-separated structure be used.

The above-mentioned cross-linking agents are not particularly limited as long as they react with a reaction point such as a hydroxyl group contained in repeating units represented by Formula (II). Examples of such cross-linking agents include a polyisocyanate such as tolylene diisocyanate (TDI), diphenylmethane diisocyanate (MDI), hydrated diphenylmethane diisocyanate (H-MDI), triphenylmethane triisocyanate, polyphenylmethane polyisocyanate (crude MDI), denatured diphenylmethane diisocyanate (denatured MDI), hydrated xylene diisocyanate (H-XDI), xylene diisocyanate (XDI), hexamethylene diisocyanate (HMDI), trimethylhexamethylene diisocyante (TMHMDI), tetramethylxylene diisocyante (m-TMXDI), isophorone diisocyanate (IPDI), norbornene diisocyanate (NBDI), 1,3-bis(isocyanatomethyl) cyclohexane (H6XDI), 1,5-naphthalene diisocyanate, or a trimer compound thereof, and a reaction product of these polyisocyanates with polyols, and so forth. Block isocyanates in which a part of or all of isocyante groups is blocked by using known blocking agents such as phenolic compounds and oximes. may be used. Also, according to necessity, a chain extender such as ethylene glycol, propylene glycol, hexamethylene-1, 6-diol, and polyethylene glycol may be used as well.

If a polyisocyante compound is used, according to necessity, amines such as triethylamine, triethylenediamine, hexamethylenetetramine, etc., or heavy metal compounds such as cobalt naphtenate, tetra-n-butyltin, dibutyltin dilaurate, etc. may be used as hardening agents.

Also, as examples of other cross-linking agents, compounds having two or more epoxy groups such as bisphenol-A epoxy resin, bisphenol-F epoxy resin, hydrated bisphenol-A epoxy resin, phenol novolac epoxy resin, cresol novolac epoxy resin, glycidyl ester epoxy resin, polyglycol epoxy resin, alicyclic epoxy resin, glycidyl amine epoxy resin, isocyanurate epoxy resin, halogenated phenol-A epoxy resin, etc. may be mentioned. According to necessity, tertiary amines such as benzyldimethyl amine, etc., imidazoles such as 2-ethyl imidazole, etc. may be used as hardening agents.

Moreover, examples of other cross-linking agents include one which is generally used as a hardener for epoxy resin, such as aliphatic polyamines such as triethylene diamine, triethylen tetramine, etc., aromatic polyamines such as diaminodiphenyl methane, etc., alicyclic polyamines such as N-aminoethyl piperazine, etc., acid anhydrides such as 4-methylhexahydrophthalic anhydride, trimellitate anhydride, pyromellit anhydride, etc., polyphenols such as phenol novolac resin, cresol novolac resin, poly-p-hydroxystyrene, etc., dicyandiamide, polyamide resin, and so forth. Examples of other hardening agents include boron trifluoride-amine complexes, various onium salts, etc. When acid anhydrides or polyphenols are used as a cross-linking agent, known hardening enhancers, for example, the above described tertiary amines and imidazoles may be used according to necessity.

As examples of cross-linking agents, particularly, polyisocyanate compounds or polyepoxy compounds may be preferably mentioned. These cross-linking agents may be used alone or two or more kinds may be used together. Also these hardening agents or hardening enhancers may be used alone or in a mixture of two or more. In addition, if an epoxy group is present in the repeating units represented by Formula (II), it is considered that an epoxy hardener function as a cross-linking agent.

The combination of reactive groups contained in the repeating units represented by Formula (II) with the cross-linking agent is not particularly limited as long as they react with each other. However, polyisocyanate compounds are preferable as a cross-linking agent if a reactive group contained in the repeating units represented by Formula (II) is a hydroxyl group. Epoxy compounds are preferable as cross-linking agents if the reactive group is a carboxyl, an amino or a phenolic hydroxyl group.

The amount of cross-linking agent used is not particularly limited, but it is preferably in the range of 0.01 to 2 moles, and more preferably in the range of 0.1 to 1 mole with respect to 1 mole of the repeating units having a cross-linking point represented by Formula (II). If it is 0.01 mole or more, more sufficient thermal properties and physical properties may be obtained. If it is 2 moles or less, more sufficient electric conductivity may be obtained.

The electrolytic salts used in the present invention are not particularly limited. Electrolytes containing ions having a suitable electric charge as a carrier may be used. It is preferable that the dissociation constant in a polymer solid electrolyte obtained by hardening be large, and alkali metal salts, quaternary ammonium salts such as $(CH_3)_4NBF_6$, etc., quaternary phosphonium salts such as $(CH_3)_4PBF_6$, etc., transition metal salts such as $AGClO_4$, etc., protonic acids such as hydrochloric acid, perchloric acid, hydrofluoroboric acid, etc. may be used. It is preferable to use alkali metals, quaternary ammonium salts, quaternary phosphonium salts or transition metal salts.

Examples of alkali metal salts used in the present invention include $LiCF_3SO_3$, $LiN\,(CF_3SO_2)_2$, $LiC\,(CF_3SO_2)_3$, $LiC(CH_3)\,(CF_3SO_2)_2$, $LiCH\,(CF_3SO_2)_2$, $LiCH_2\,(CF_3SO_2)$, $LiC_2F_5SO_3$, $LiN\,(C_2F_5SO_2)_2$, $LiB\,(CF_3SO_2)_2$, $LiPF_6$, $LiClO_4$, $LiI$, $LiBF_4$, $LiSCN$, $LiAsF_6$, $NaCF_3SO_3$, $NaPF_6$, $NaClO_4$, $NaI$, $NaBF_4$, $NaAsF_6$, $KCF_3SO_3$, $KPF_6$, $KI$, $LiCF_3CO_3$, $NaClO_3$, $NaSCN$, $KBF_4$, $Mg\,(ClO_4)_2$, $Mg(BF_4)_2$, and so forth. These electrolytic salts may be used in a mixture, and lithium salts are preferable.

The amount of the electrolytic salts added is in the range of 0.005 to 80 mol %, and preferably in the range of 0.01 to 50 mol % with respect to alkylene oxide units in the copolymer which is a matrix polymer for a polymer electrolyte. Although the composition for a polymer solid electrolyte of the present invention may be produced by adding and mixing (compounding) the electrolytic salts into the above described copolymers and cross-linking agents, the methods for adding and compounding are not particularly limited and, for example, the following may be mentioned: a method wherein copolymers, cross-linking agents and electrolytic salts are dissolved into an appropriate solvent such as tetrahydrofuran, methylethylketone, acetonitrile, ethanol, dimethylformamide, etc.; a method wherein copolymers, cross-linking agents and electrolytic salts are mechanically mixed at room temperature or under heated conditions; and so forth.

The composition for a polymer solid electrolyte of the present invention is not particularly limited as long as the composition include a polymer having an arrangement in an order of P3, P2, P1, P2 and P3; in which P1 is an ion-conductive polymer segment, P2 is an ion-nonconductive segment, and P3 is a polymer segment having cross-linking points, a cross-linking agent; and an electrolytic salt. Examples of the ion-conductive polymer segment (P1) include the above described block chain A, examples of the ion-nonconductive segment (P2) include the above described block chains B1 and B2, and examples of the polymer segment (P3) having cross-linking points include block chains C1 and C2. In addition, examples of a cross-linking agent and electrolytic salt include those described above.

The polymer solid electrolyte of the present invention is not particularly limited as long as the electrolyte includes the above-mentioned copolymer and electrolytic salt, preferably cross-linked polymer obtained by reacting the copolymer with a cross-linking agent, however, it is preferable that it has a network type microphase-separated structure. Also, it is preferable that the cross-linked polymer be hardened by using a cross-linking agent in the range of 0.01 to 2 mole, and more preferably, in the range of 0.1 to 1 mole, with respect to one mole of the repeating units represented by Formula (II), or hardened by using a polyisocyante compound having two or more isocyanate groups in the molecule or an epoxy compound having two or more epoxy groups in the molecule as a cross-linking agent, or that the cross-linked polymer have urethane bondings derived from a cross-linking agent. Also, one having a microphase-separated structure is preferable. Such cross-linked polymer may be produced by cross-linking copolymers with cross-linking agents by means of various kinds of energy such as heat, ultraviolet rays, infrared rays, far infrared rays, micro-waves, etc.

Examples of methods for producing the polymer solid electrolyte of the present invention include the following: (i) a method wherein copolymers and cross-linking agents are controlled before those become completely cross-linked by using energy such as heat, then, cross-linked and hardened by adding an electrolytic salt; (ii) a method wherein two or more kinds of copolymers having different cross-linking conditions are cross-linked using one or more of cross-linking agents under conditions in which only one kind of copolymer is cross-linked, and after that, an electrolytic salt is added to further cross-link and harden it; (iii) a method wherein two or more kinds of copolymers having different cross-linking conditions are cross-linked using one or more of cross-linking agents and an electrolytic salt under conditions in which only one kind of copolymer is cross-linked, and after that it is subjected to a further cross-linking and hardening process; and so forth.

It is preferable that, after shaping the above described resin compositions for a polymer solid electrolyte into the form of sheets, membranes, films, etc., it is cross-linked using the above-mentioned energy to be in the forms of sheets, membranes or films, which function as ion-conductive sheets, membranes or films. In such case, applicability for shaping or processing will increase so as to provide significant advantages in application.

As a method for producing a sheet, etc., of the polymer solid electrolyte, for example, the above described resin compositions for a polymer solid electrolyte may be shaped into a film on a support by using various coating methods such as a roll coating method, curtain coating method, spin coating method, dipping method, casting method, etc. and then, a cross-linking reaction using energy described above carried out, and, after that, a sheet, etc. of a polymer solid electrolyte obtained by removing the support.

The polymer solid electrolyte in the present invention is not particularly limited as long as the electrolyte includes a cross-linked polymer obtained by reacting a polymer having an arrangement in an order of P3, P2, P1, P2 and P3, wherein P1 is an ion-conductive polymer segment, P2 is an ion-nonconductive segment, and P3 is a polymer segment having cross-linking points, with a cross-linking agent, and an electrolytic salt. Examples of the ion-conductive polymer segment (P1) include the above described block chain A, examples of the ion-nonconductive segment (P2) include the above described block chains B1 and B2 and examples of the polymer segment having cross-linking points include block chains C1 and C2. Also, examples of the cross-linking agents and the electrolytic salts may include those described above. In addition, it is preferable that a microphase-separated structure be present in the above polymer having an arrangement in an order of P3, P2, P1, P2 and P3.

The ion-conductive membrane of the present invention is not particularly limited as long as it corresponds to the following: a membrane including the ion-conductive polymer segment (P1), the ion-nonconductive polymer segment (P2), and the cross-linked polymer segment (P4) and having a network type microphase-separated structure; and a membrane including a cross-linked polymer obtained by reacting a polymer having the ion-conductive polymer segment (P1), the ion-nonconductive polymer segment (P2) and the polymer segment having cross-linking points (P3) with a cross-linking agent, and having a network type microphase-separated structure. It is preferable that the polymers having the above P1, P2 and P3 segments form a microphase-separated structure. Examples of the ion-conductive polymer segment (P1) include the above described block chain A, examples of the ion-nonconductive segment (P2) include the above described block chains B1 and B2, examples of the polymer segment having cross-linking points include block chains C1 and C2, and examples of the cross-linked polymer segment (P4) may include the cross-linking agents described above. The ionic conductivity (conductivity) may be maintained and physical properties, thermal properties, and, in particular, the strength of the ion conductive membrane of the present invention may be improved by having a network microphase-separated structure in the membrane.

A polymer solid electrolyte battery of the present invention is characterized in including the above described polymer solid electrolyte or a solid electrolyte shaped into a membrane made by using the polymer composition described above; and an electrode.

A polymer solid electrolyte battery of the present invention is characterized by having the above-mentioned polymer solid electrolyte or a solid electrolyte which is formed into a membrane using a polymer solid composition, and electrodes.

The polymer solid electrolyte battery may be produced, for example, by using a method wherein a polymer solid electrolyte is used as a formed body such as film in advance, and the formed body is incorporated between electrodes; or a method wherein a composition including a polymer such as the above described copolymer, and electrolytic salts is shaped into a membrane on an electrode by using various coating methods such as a roll coating method, curtain coating method, spin coating method, dipping method, casting method, etc. and the other electrode is further disposed; and so forth.

It is preferable that an electrode used in the battery includes an electrode activator and the above-mentioned copolymer having an arrangement in an order of B11, A11 and C11, wherein the block chain A11 has repeating units represented by Formula (XX), and the block chain B11 has repeating units represented by Formula (XXI). Moreover, according to necessity, electrolytic salts may be added. In addition, it is preferable that the electrode further includes electro-conductive materials if it is an anode.

The block chain C11 represents a block chain having arbitrary components. The block chains B and C11 may be identical or different. In particular, a block chain having repeating units represented by Formula (XXII) is a preferable example.

The term "each of the block chains A11 and B11 has repeating units represented by Formula (XX) or (XXI)" means both cases in which the block chain includes repeating units other than the repeating units corresponding to each of the block chains as a structural component and the block chain does not include such repeating units. Moreover, when other repeating units are included as a structural component, the way of polymerization to the repeating units represented by each formula is not particularly limited, and may be random polymerization, block polymerization, syndiotactic polymerization, and so forth.

Also, "each of the polymer chains has an arrangement in an order of block chains B11, A11 and C11" means that each of the polymer chains may bond directly to one another or indirectly to one another via other components such as a linking group, a polymer chain, etc. When the other polymer chains are included as a structural component, the polymer chain may be of a homopolymer or a binary or multinary copolymer, and in the case of the copolymer, the bonding state thereof is not particularly limited and may be in the state of being random, in a block, or in a gradient in which the ratio of components gradually changes. It is preferable that each of the block chains have a bonding sequence of B11-A11-C11. In this case, the term "bonding" means that each of the block chains bonds directly or indirectly via a low molecular linking group such as an oxygen atom, an alkylene group, etc. and so forth.

The repeating units represented by Formula (XX) correspond to those represented by Formula (I), and each of the symbols found in Formula (XX) represents the same as those in Formula (I) except for a part of the meaning expressed by m1, and examples thereof include the same as those for Formula (I). In addition, m1 is an integer of 5 to 100, and preferably an integer of 10 to 100.

The repeating units represented by Formula (XXI) correspond to those represented by Formula (III), and each of the symbols found in Formula (XXI) represents the same those in Formula (III) except for a part of the meaning expressed by $R_{9a}$, and examples thereof include the same as those for Formula (III).

The repeating units represented by Formula (XXII) correspond to those represented by Formula (III), and each of the symbols found in Formula (XXII) represents the same as those found in Formula (III), and examples thereof include the same as those in Formula (III). In particular, it is preferable that $R_{13}a$ be an aryl group and that 5 moles or more of it be included.

Although the amount of each repeating unit contained in the copolymer described above is not particularly limited, it is preferable that 10 mole or more of the repeating units represented by Formula (XX) be included and that 5 moles or more of the repeating units represented by each of Formulae (XXI) and (XXII) be included.

The copolymer described above may include, as a structural component, repeating units different from those represented by Formulae (XX) to (XXII), and examples of such repeating units include those derived from the following compounds. Also, these repeating units may be used in the block chain C11 when it does not have repeating units represented by Formula (XXII). These repeating units may be used alone or in a mixture of two or more.

(meth)acrylates such as methyl (meth)acrylate, ethyl (meth)acrylate, n-butyl (meth)acrylate, t-butyl (meth)acrylate, cyclohexyl (meth)acrylate, benzyl (meth)acrylate, isobornyl (meth)acrylate, dicyclopentenyl (meth)acrylate, 1-adamanthyl (meth)acrylate, 2-methyl-2-adamanthyl (meth)acrylate, 1-methyleneadamanthyl (meth)acrylate, 1-ethyleneadamanthyl (meth)acrylate, 3,7-dimethyl-1-adamanthyl (meth)acrylate, tricyclodecanyl (meth)acrylate, norbornane (meth)acrylate, mentyl (meth)acrylate, n-propyl (meth)acrylate, isopropyl (meth)acrylate, 2-ethylhexyl (meth)acrylate, isodecyl (meth)acrylate, isooctyl (meth)acrylate, lauryl (meth)acrylate, cyclohexyl (meth)acrylate, tetrahydrofuranyl (meth)acrylate, tetrahydropyranyl (meth)acrylate, 3-oxocyclohexyl (meth)acrylate, butyrolactone (meth)acrylate, mevaloniclactone (meth)acrylate; conjugated diens such as 1,3-butadiene, isoprene, 2,3-dimethyl-1,3-butadiene, 1,3-pentadiene, 2-methyl-1,3-pentadiene, 1,3-hexadiene, 1,6-hexadiene, 4,5-diethyl-1,3-octadiene, 3-butyl-1,3-octadiene, chloroprene; α,β-unsaturated carboximides such as N-methylmaleimide and N-phenylmaleimide; α,β-unsaturated nitriles such as (meta)acrylonitrile; and so forth.

Moreover, it is possible to include repeating units which contains a double bond in the molecule enabling a copolymerization with monomers generating repeating units represented by Formulae (XX) to (XXII), and to further include repeating units having at least one functional group in the molecule selected from the group consisting of hydroxyl, carboxyl, epoxy, acid anhydride and amino group. Examples of such repeating units include those derived from the following compounds. These repeating units may be used alone or in a mixture of two or more.

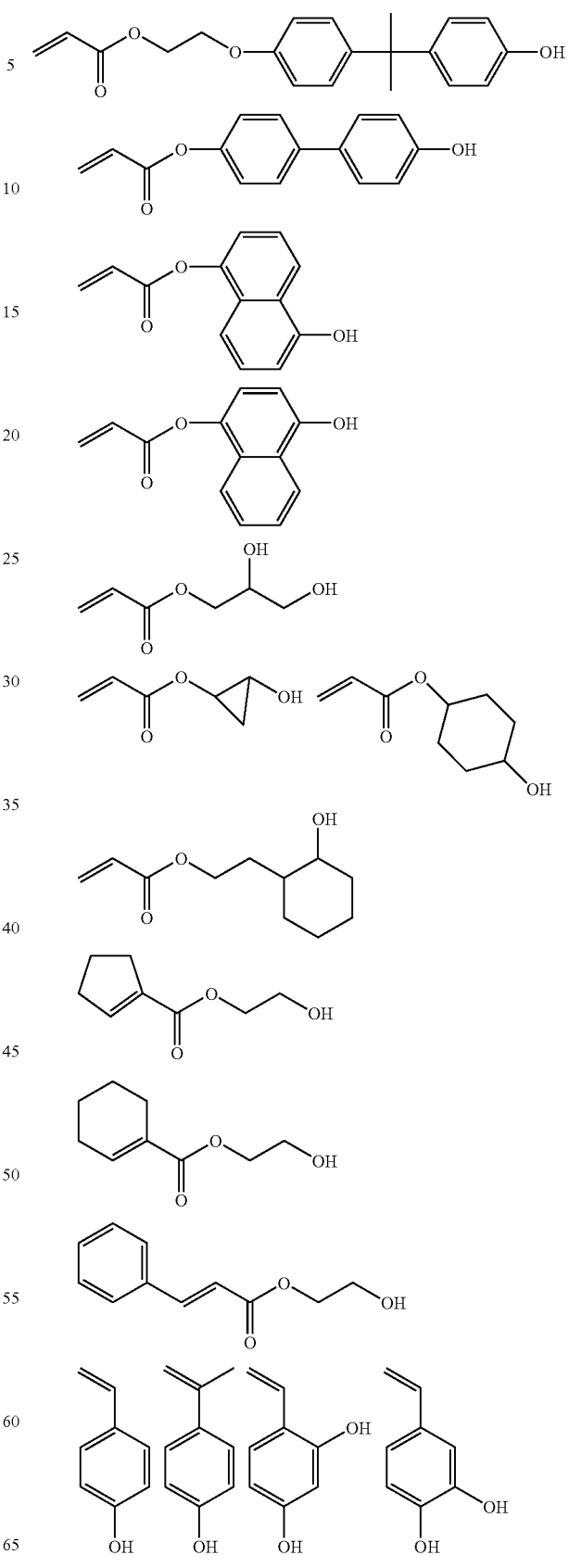

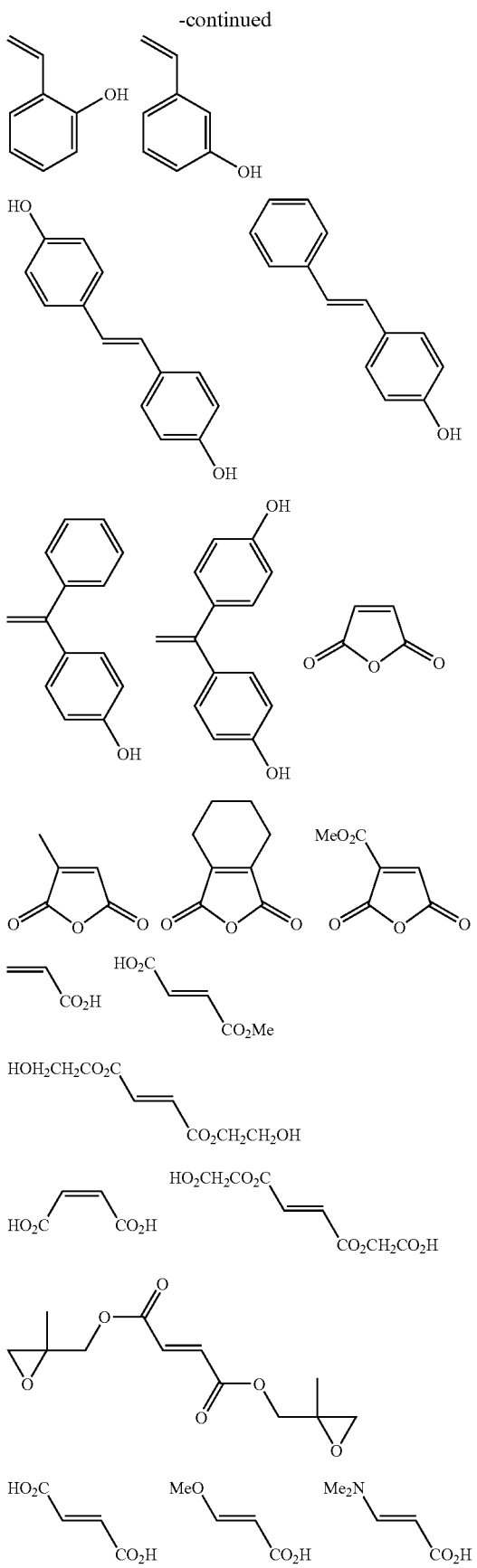

The molar ratio of the repeating units represented by Formula (XX) to the sum of the repeating units represented by Formula (XXI) and the repeating units present in block chain C11, i.e., (XX)/((XXI)+(C11)), is preferably in the range of 1/30 to 30/1. Also, when the block chain C11 includes the repeating units represented by Formula (XXII), it is possible to apply the repeating units represented by Formula (XXII) in the above mixing ratio instead of the repeating units present in block chain C11.

Although the number average molecular weight of the copolymers of the present invention is not particularly limited, it is preferably in the range of 5,000 to 1,000,000. If the number average molecular weight is lower than 5,000, thermal and physical properties will be lowered. If it is higher than 1,000,000, formability or feasibility of forming a membrane will decrease. Also, although the ratio (Mw/Mn) of the weight average molecular weight (Mw) to the number average molecular weight (Mn) is not particularly limited, it is preferably in the range of 1.01 to 2.50, more preferably in the range of 1.01 to 1.50 for the purpose of forming the microphase-separated structure described below.

Although the structure of the above described copolymer is not particularly limited as long as the copolymer has the block chains A11, B11 and C11 in a specific arrangement, it is preferable that the copolymer has a membrane structure by which a microphase-separated structure, particularly a network microphase-separated structure, is generated to maintain high ionic conductivity.

The above described copolymer may be produced with compounds having polymerizable double bonds capable of deriving each repeating unit by using known methods and conditions, such as a living radical polymerization method in which a transition metal complex is used as a catalyst and an organic halogen compound having one or more of halogen atoms is used as a polymerization initiator, a living radical polymerization method using stable radicals, and a living anion polymerization method. Of these methods, a living radical polymerization method in which a transition metal complex is used as a catalyst and an organic halogen compound having one or more of halogen atoms is used as a polymerization initiator is preferable.

Electrode activators used in the present invention are not particularly limited and various kinds of compounds known as electrode activators may be used. For example, metals such as lithium metal, silver metal, zinc metal, etc.; alloys such as Li-AL; black lead, carbon black, graphite fluoride, polyacetylene, various carbon materials obtained by baking, thermal decomposition, CVD, etc.; metal oxides such as $MnO_2$, $CoO_2$, $V_2O_5$, $V_2O_6$, $TiO_2$, $WO_2$, $Cr_2O_5$, $Cr_3O_8$, CuO, $Cu_2V_2O_7$, $Bi_2O_3$, $Bi_2Pb_2O_5$, $Mo_8O_2$, $LiCoO_2$, etc.; carcogen compounds such as $TiS_2$, $TiS_3$, $MoS_2$, $CuCo_2S_4$, $VSe_2$, $NbSe_2CrS_2$, $NbSe_3$, etc.; silver oxyacids such as $Ag_2CrO_4$, $Ag_2MoO_4$, $AgIO_3$, $Ag_2P_2O_7$, etc.; and π-conjugated polymers such as polyaniline, polypyrrol, polythiophen, and poly-p-phenylene, etc., may be mentioned.

Electrolytic salts used in the present invention may include the same as those of the electrolytic salts used in the polymer electrolyte salts, and in particular, various halogenated alkali, such as $LiClO_4$, $LiCF_3SO_3$, $LiBF_4$, $LiPF_4$, $LiAsF_6$, $LiAlCl_4$, LiBr, LiSCN, LiI, $LiC(CF_3SO_2)_3$, $LiN(CF_3SO_2)_2$, $NaClO_4$, NaI, $NaBF_4$, NaSCN, $KPF_6$, KSCN, etc., and alkali metal salts having an organic anion are preferable examples thereof. Among them, lithium salts are more preferable.

Although the electro-conductive materials used in the present invention are not particularly limited, examples thereof include Ketjen black, carbon black, acetylene black, graphite, cokes powder, black lead, etc. In particular, Ketjen black and acetylene black are more preferable.

Although the amount of polymers such as copolymers and electrolytic salts contained in the electrode is not particularly limited, it is preferably in the range of 0.5 to 15% by weight with respect to the total of the electrode composition (excluding a support). If it is less than 0.5% by weight, the contact resistance with electrolytes becomes large, and, if it is more than 15% by weight, electro-conductivity declines.

Although the method for producing the electrodes is not particularly limited, examples thereof include the following: a method wherein a solution containing polymers and electrolytic salts is casted or applied onto a layer containing electrode activators, which is formed on a support; a method wherein a solution containing electrode activators, polymers, and electrolytic salt is casted or coated onto a support, and so forth.

It is preferable that the polymers used show electro-conductivity by forming a complex with electrolytic salts. It is more preferable that polymers are used as an electrolyte.

It is preferable that the electrolytic salts used are salts used an electrolyte. Although the salts used as an electrolyte and the salts used in the electrodes may be the same or different in the same device, it is preferable that these are the same. Examples thereof include the same as those described in the electrolytic salts.

The concentration of solid components present in a solution containing polymers and electrolytic salts is not particularly limited, and for example, it is preferably in the range of 0.5 to 10% by weight.

It is preferable that the layer containing electrode activators includes, other than the electrode activators, at least one kind of polymer selected from polymers used for binders and electrolytes. Compounds used for the binders are not particularly limited as long as it is capable of fixing electrode activators on a support and has no affects on electro-conductivity. Examples thereof include fluorine resins such as polyvinylidene fluoride (PVDF), polytetrafluoroethylene, etc.; and rubbers such as styrenebutadien rubber; and so forth. Among these, fluorine resins (particularly, PVDF) are preferable examples.

The polymer used as electrolytes are not particularly limited as long as it shows electro-conductivity by forming a complex with electrolytic salts. Although the polymer used as an electrolyte in a battery and the polymer used as an electrode may be the same or different in the same device, it is preferable that these are the same.

The layer including the electrode activators may be produced, for example, by coating a support with a solution containing an electrode activator and at least one kind of polymers selected from those used for binder and electrolyte, and by drying it. The coating method is not particularly limited, and a roll coating method, a curtain coating method, a spin coating method, a dipping method, a casting method, etc. may be used.

Although the number of times of casting or coating depends on the concentration of solid components present in the solution used, it is preferable that the casting or coating be carried out two or more times. Although methods for coating are not particularly limited, a method wherein a solvent remains after coating so that polymers and electrolytic salts may permeate into a layer containing electrode activators is preferable. It is preferable that the solvent be gradually evaporated under normal pressure or reduced pressure after casting or coating the solution.

BRIEF DESCRIPTIONS OF THE DRAWINGS

BEST MODE FOR CARRYING OUT THE INVENTION

Figure 1:
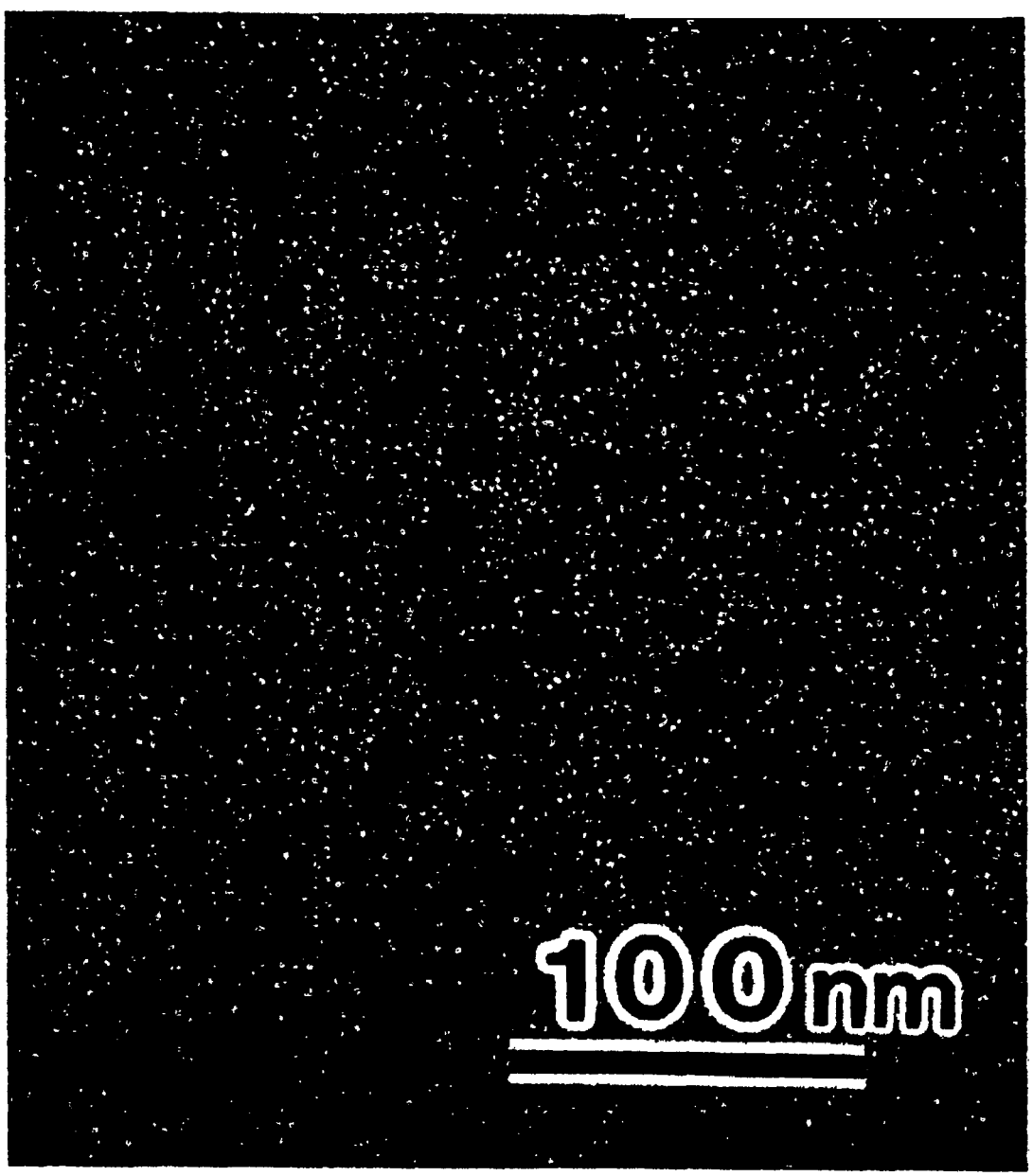
FIG. 1 is a photograph of a copolymer of Example 7 by TEM.

Hereinafter, the present invention is explained in detail by using examples, but the present invention is not limited to the examples.

EXAMPLE 1

(1) Synthesis of Poly(St-b-HEMA-b-PME-400)Copolymer 1 mmol of n-butyl lithium was added into 300 g of tetrahydrofuran (hereinafter abbreviated as "THF") in an argon atmosphere. Then, 48 mmol of styrene was added dropwise thereto while stirring at −78° C., and the reaction was further maintained for 30 min at the same temperature. The completion of the reaction was confirmed by gas chromatography (hereinafter abbreviated as "GC"). At this step, a small amount of the reaction solution was sampled from the reaction system, and the reaction in the sample was terminated by adding methanol. Then, the sample was analyzed by gel permeation chromatography (hereinafter abbreviated as "GPC"). The analysis showed that the obtained styrene was a single dispersion polymer (number average molecular weight (Mn)=5,000 and the ratio of the weight average molecular weight (Mw) to Mn (Mw/Mn)=1.05). Subsequently, 1 mmol of diphenylethylene was added into the reaction system. Then, 38 mmol of 2-trimethylsilyloxyethyl (meth)acrylate (hereinafter abbreviated as "HEMASi") which was purified and prepared by silylation of 2-hydroxyethyl (meth)acrylate (hereinafter abbreviated as "HEMA") with trimethylsilyl chloride was added dropwise, and the copolymerization reaction was further maintained for 30 min. Then, the completion of the reaction was confirmed by GPC. The GPC analysis of a small amount of the reaction solution sampled from the reaction system showed that the obtained poly(St-b-HEMASi) was a single dispersion polymer (Mn=12,800 and Mw/Mn=1.08). Subsequently, 81 mmol of methoxypolyethylene glycol (meth)acrylate ("Blenmer PME-400" produced by NOF corporation; in Formula (XI), $R_1$=$R_2$=$R_4$=a hydrogen atom; $R_3$=$R_5$=a methyl group; m=9; hereinafter abbreviated as "PME-400") which was purified by distillation was added into the reaction system dropwise, and the copolymerization reaction was maintained for one hour. After the completion of the reaction was confirmed by GC, the reaction was terminated by adding methanol. The GPC analysis of this reaction solution showed that the obtained poly(St-b-HEMASi-b-PME-400) was a single dispersion polymer (Mn=53,000 and Mw/Mn=1.11).

Next, a desilylation reaction of repeating units derived from HEMASi was carried out in a weakly acidic environment by using N/2 hydrochloric acid while the temperature of the reaction solution was kept at room temperature. After desilylation, an acid absorbent ("Carplex#1120" produced by Showa Chemical Industry Co., Ltd) was added into the reaction solution. Then, the reaction solution was stirred and filtered. The filtered solution was volatilized under reduced pressure, and a copolymer was obtained. The GPC analysis of the obtained copolymer showed that the copolymer was a single dispersion polymer (Mn=50,500 and Mw/Mn=1.11). Also, the $^{13}$CNMR analysis showed that the copolymer had a structure of poly(St-b-HEMA-b-PME-400) in which the ratio of the number of moles of repeating units derived from PME-400 to the number of moles of the total repeating units in the copolymer was 54%, and the ratio of the number of moles of repeating units derived from HEMA was 20%.

(2) Preparation of Composition for Polymer Solid Electrolyte 2 g of the above obtained copolymer and 0.13 g of tolylene-2,4-diisocyanate which is a cross-linking agent were dissolved in 20 ml of acetone in an Argon atmosphere. Then, 0.15 g of $LiClO_4$ was added into the solution and dissolved uniformly such that a composition for a polymer solid electrolyte was prepared.

(3) Production of Membrane for Solid Electrolyte and Evaluation of Properties

The above composition was poured and spread onto a board of Teflon (a registered trademark) in an argon atmosphere, left at room temperature for 24 hours, and then dried under reduced pressure at 60° C. for 24 hours followed by at 100° C. for 5 hours, and a uniform membrane of solid electrolyte was obtained (thickness: 100 μm). This membrane of solid electrolyte was placed between boards of platinum in an argon atmosphere, and ionic conductivity was measured based on complex impedance analysis by using an impedance analyzer (Solartron-1260) whose frequency was 5 to 10 MHz. As a result, the ionic conductivity was $6\times10^{-5}$ S/cm at 23° C.

Also, another composition was prepared by the same procedures described above for a polymer solid electrolyte except that $LiClO_4$ was not added, and a membrane was formed with the obtained composition by way of the described above procedures. The dynamic viscoelasticity of the obtained cross-linked film was measured. As a result, it was shown that the cross-linked film had a modulus of elasticity of 3 MPa at 23° C. The observation of the internal structure of the cross-linked film under electron microscope showed that it had a network microphase-separated structure.

EXAMPLE 2

(1) Synthesis of Poly(HEMA-b-PME-400-b-HEMA)Copolymer

Into 300 g of THF was added 1.6 mmol of α-methylstyrene tetramer disodium in an argon atmosphere. Then, 38 mmol of HEMASi was added dropwise thereto while stirring at −78° C., and the reaction was maintained for 30 min. The completion of the reaction was confirmed by GC. At this step, a small amount of the reaction solution was sampled from the reaction system, and the sample was analyzed by GPC. The analysis showed that the obtained polyHEMASi was a single dispersion polymer (Mn=5,100 and Mw/Mn=1.10). Subsequently, 114 mmol of PME-400 which was purified by distillation was added dropwise into the reaction system, and the copolymerization reaction was further maintained for 30 min. After the completion of the reaction was confirmed by GPC, the reaction was terminated by adding methanol. The GPC analysis of this reaction solution showed that the obtained poly (PME-400-b-HEMASi-b-PME-400) was a single dispersion polymer (Mn=40,100 and Mw/Mn=1.12). Next, the temperature of the reaction solution was made equal to room temperature, and a copolymer was finally obtained by treating the reaction solution based on the procedures from the step of deblocking the protected groups to the step of purification under reduced pressure as described in Example 1.

The GPC analysis of the obtained copolymer showed that the copolymer was a single dispersion polymer (Mn=38,400 and Mw/Mn=1.12). Also, $^{13}$CNMR measurement showed that the copolymer had a structure of poly(PME-400-b-HEMA-b-PME-400) in which the ratio of the number of moles of repeating units derived from PME-400 to the number of moles of the total repeating units in the copolymer was 75%, and the ratio of the number of moles of repeating units derived from HEMA was 25%.

(2) Preparation of Composition for Polymer Solid Electrolyte 2 g of the above obtained copolymer and 0.10 g of tolylene-2,4-diisocyanate, which is a cross-linking agent, were dissolved in 20 g of acetone in an argon atmosphere. Then, 0.17 g of $LiClO_4$ was added into the obtained solution and dissolved uniformly such that a composition for a polymer solid electrolyte was prepared.

(3) Production of Membrane of Solid Electrolyte and Evaluation of Properties

A membrane of solid electrolyte was produced by the same procedures as in Example 1, and its ionic conductivity was measured. As a result, the ionic conductivity was $8\times10^{-5}$ S/cm.

Also, a cross-linked film containing no electrolytic salt was formed. The dynamic viscoelasticity of the film was measured. As a result, it was shown that the cross-linked film had a modulus of elasticity of 1 MPa at 23° C. The observation of the internal structure of this cross-linked film under electron microscope showed that a uniform structure was present.

EXAMPLE 3

(1) Synthesis of Poly(PME-1000-b-St-b-HEA)Copolymer 0.3 mmol of copper I chloride was added into 70 g of water previously deaerated with argon in an argon atmosphere. Then, 0.6 mmol of bipyridine and 27 mmol of methoxypolyethylene glycol mono (meth)acrylate ("Blenmer PME-1000" produced by NOF corporation; in Formula (XI), $R_1=R_2=R_4=$a hydrogen atom; $R_3=R_5=$a methyl group; m=23; hereinafter abbreviated as "PME-1000") were added thereto, and then it was mixed uniformly. Then, 0.3 mmol of ethyl 2-bromoisobutyrate was added thereto, and a polymerization reaction was initiated at room temperature while stirring. After a lapse of 5 hours from when the reaction was initiated, the reaction system was cooled to 0° C. to terminate the polymerization reaction. The degree of polymerization conversion was 90%. Then, into the reaction solution, were added 500 mmol of THF and excessive amounts of magnesium sulfate, and the reaction solution was filtered. By subjecting the filtrate to column purification, metal complexes and unreacted monomers were removed. Subsequently, the filtered solution was volatilized under reduced pressure, and poly(PME-1000) was obtained. The GPC analysis of the obtained poly(PME-1000) showed that it was a single dispersion polymer (Mn=91,000 and Mw/Mn=1.15).

Next, into 23.6 g of toluene previously deaerated with argon were added 0.1 mmol of copper I chloride, 0.2 mmol of bipyridine, 0.1 mmol of poly(PME-1000), 9.8 mmol of styrene, and 1 mmol of n-octane in an argon atmosphere, and then it was mixed uniformly, and a copolymerization reaction was initiated by heating to 100° C. while stirring. After a lapse of 20 hours from when the reaction was initiated, the reaction system was cooled to 0° C. to terminate the copolymerization reaction. The GC analysis showed that the degree of polymerization of the St was 70%. This reaction solution was subjected to column purification and purification under reduced pressure in the same way as described above, and the obtained poly(PME-1000-b-St) was further subjected to GPC analysis. The analysis showed that it was a single dispersion polymer (Mn=96,000 and Mw/Mn=1.21).

Next, into 23.9 g of toluene previously deaerated with argon were added 0.1 mmol of copper I chloride, 0.2 mmol of bipyridine, 0.1 mmol of poly(PME-1000-b-St), 5.4 mmol of 2-hydroxyethyl acrylate (hereinafter abbreviated as "HEA") and 1 mmol of n-octane in an argon atmosphere, and then it was mixed uniformly, and a copolymerization reaction was initiated by heating to 80° C. while stirring. After a lapse of 20 hours from when the reaction was initiated, the reaction system was cooled to 0° C. to terminate the copolymerization reaction. The GC analysis showed that the degree of polymerization of the HEA was 80%. This reaction solution was subjected to column purification and purification under reduced pressure in the same way as described above, and the obtained copolymer was further subjected to GPC analysis. The analysis showed that the copolymer was a single dispersion polymer (Mn=101,000 and Mw/Mn=1.25). Also, the $^{13}$CNMR analysis showed that the copolymer had a structure of poly(PME-1000-b-St-b-HEA) wherein the ratio of the number of moles of repeating units derived from PME-1000 to the total repeating units in the copolymer was 47%, and the ratio of the number of moles of repeating units derived from HEA was 25%.

(2) Preparation of Composition for Polymer Solid Electrolyte 2 g of the above obtained copolymer and 0.07 g of tolylene-2,4-diisocyanate, which is a cross-linking agent, were dissolved in 20 g of tetrahydrofuran in an argon atmosphere. Then, 0.20 g of $LiClO_4$ was further added into the obtained solution, and it was then dissolved uniformly such that a composition for a polymer solid electrolyte was prepared.

(3) Production of Membrane of Solid Electrolyte and Evaluation of Properties.

A membrane of solid electrolyte was produced by the same procedures as in Example 1, and its ionic conductivity was measured. As a result, the ionic conductivity was $1 \times 10^{-4}$ S/cm at 23° C.

Also, a cross-linked film containing no electrolytic salt was formed. The dynamic viscoelasticity of the film was measured. As a result it was shown that the cross-linked film had a modulus of elasticity of 0.7 MPa at 23° C. The observation of the internal structure of this cross-linked film under electron microscope showed that a microphase-separated structure was present.

EXAMPLE 4

(1) Synthesis of Poly(PME-400-b-MA)Copolymer

Into 126 g of water previously deaerated with argon were added 0.3 mmol of copper I chloride, 0.6 mmol of bipyridine, and 54 mmol of PME-400 in an argon atmosphere, and mixed uniformly. Then, 0.3 mmol of ethyl 2-bromoisobutyrate was added thereto, and a polymerization reaction was initiated at room temperature while stirring. After a lapse of 5 hours from when the reaction was initiated, the reaction system was cooled to 0° C. to terminate the polymerization reaction. The degree of polymer conversion was 90%. Then, into the reaction solution were added 500 mmol of THF and excessive amounts of magnesium sulfate, and the reaction solution was filtered. By subjecting the filtrate to column purification, metal complexes and unreacted monomers were removed. Subsequently, the filtered solution was volatilized under reduced pressure, and poly(PME-400) was obtained. The GPC analysis of the obtained poly(PME-400) showed that it was a single dispersion polymer (Mn=80,300 and Mw/Mn=1.15).

Next, into 23 g of toluene previously deaerated with argon were added 0.1 mmol of copper I chloride, 0.2 mmol of bipyridine, 0.1 mmol of poly(PME-400), 28 mmol of trimethylsilyl (meth)acrylate (hereinafter abbreviated as "MA-TMS") which was purified and prepared by silylation of (meth)acrylic acid (herein after abbreviated as "MA") with trimethylsilyl chloride, and 1 mmol of n-octane, and then it was mixed uniformly, and a copolymerization reaction was initiated by heating to 80° C. while stirring. After a lapse of 20 hours from then the reaction was initiated, the reaction system was cooled to 0° C. to terminate the copolymerization reaction. The GC analysis showed that the degree of conversion of MA-TMS was 80%. Also, the GPC analysis showed that the produced poly(PME-400-b-MA-TMS) had properties of Mn=115,500 and Mw/Mn=1.22. Subsequently, the reaction solution was subjected to column purification, and metal complexes and unreacted monomers were removed. A copolymer was finally obtained by further treating the purified solution based on the procedures of the step of deblocking the protected groups to the step of purification under reduced pressure as described in Example 3. GPC analysis of the obtained copolymer showed that the copolymer has properties of Mn=99,300 and Mw/Mn=1.22. Also, the $^{13}$CNMR measurement showed that the obtained copolymer had a structure of poly(PME-400-b-MA) wherein the ratio of the number of moles of repeating units derived from PME-400 to the number of moles of the total repeating units in the copolymer was 42%, and the ratio of the number of moles of repeating units derived from MA was 58%.

(2) Preparation of Composition for Polymer Solid Electrolyte 2 g of the above obtained poly(PME-400-b-MA) and 0.5 g of glycidyl amine epoxy resin ("Epotohto YH-434" produced by Tohto Kasei Co., Ltd.; epoxy equivalent: 120), which is a cross-linking agent, were dissolved in 20 g of THF in an argon atmosphere. Then, 0.16 g of LiClO$_4$ was further added thereto and dissolved uniformly, and a composition for a polymer solid electrolyte was prepared.

(3) Production of Membrane of Solid Electrolyte and Evaluation for Properties

The above composition for a polymer solid electrolyte was poured and spread onto a board of Teflon (a registered mark) in an argon atmosphere, left at room temperature for 24 hours, and then dried under reduced pressure at 60° C. for 5 hours followed by at 130° C. for 5 hours, and a uniform membrane of solid electrolyte was obtained (thickness: 100 μm). The ionic conductivity of this membrane of solid electrolyte was measured by the same procedures as in Example 1. The ionic conductivity was $5 \times 10^{-5}$ S/cm.

Also, a cross-linked film containing no electrolytic salt was formed. The dynamic viscoelasticity of the cross-linked film was measured. As a result, it was shown that the cross-linked film had the modulus of elasticity of 1.5 MPa at 23° C. The observation of this cross-linked film under electron microscope showed that a uniform structure was present.

EXAMPLE 5

(1) Synthesis of (PME-1000-b-St-b-PHS)Copolymer

Into 150 g of THF was added 0.3 mmol of s-butyl lithium (hereinafter abbreviated as SBL) in an argon atmosphere. Then, 30 mmol of St was added dropwise thereto while stirring at −60° C., and the reaction was further maintained for 30 min at the same temperature. The completion of the reaction was confirmed by GC. At this step, a small amount of the reaction solution was sampled from the reaction system, and the reaction of the sample was terminated by adding methanol. Then, the sample was analyzed by GPC. The analysis showed that the obtained polystyrene was a single dispersion polymer (Mn=10,000 and Mw/Mn=1.08). Subsequently, 3 mmol of p-(1-ethoxyethoxy)styrene (hereinafter abbreviated as PEES) was added dropwise into the reaction system, and the reaction was further maintained for 30 min. The completion of the reaction was confirmed by GC. At this step, a small amount of the reaction solution was sampled from the reaction system as a sample, and the reaction of the sample was terminated by adding methanol. Then, the sample was analyzed by GPC. The analysis showed that the obtained poly (St-b-PEES) was a single dispersion polymer (Mn=11,800 and Mw/Mn=1.08). Subsequently, 3 mmol of lithium chloride was added into the reaction system, and the reaction solution was stirred for 15 min. Then, 15 mmol of PME-1000 was added dropwise thereto, and the reaction was further maintained for 30 min. The reaction was terminated by adding methanol after the completion of the reaction was confirmed by GC. The GPC analysis showed that the obtained poly(St-b-PEES-b-PME-1000) was a single dispersion polymer of Mn=63,000 and Mw/Mn=1.10.

Next, the temperature of reaction solution was made equal to room temperature, 0.5 g of N/2 hydrochloric acid was added thereto, and the reaction solution was stirred for 30 min. Desilylation reaction of repeating units derived from PEES was carried out. After the desilylation, 1 g of an acid absorbent ("Carplex#1120" produced by Showa Chemical Industry Co., Ltd) was added into the reaction solution. The reaction solution was stirred for 10 min, and then filtered. A component of solvent was removed by purifying the filtrate under reduced pressure, and a copolymer in a semi-solid state was obtained. It was confirmed based on the $^{13}$CNMR analysis of the obtained polymer that a copolymer having a structure of poly(St-b-PHS-b-PME-1000) was produced, wherein, because no signal around 100 ppm derived from tertiary carbons of 1-ethoxyethoxy groups was recognized, the p-hydroxystrene (hereinafter abbreviated as PHS) backbone was formed by the completion of a reaction of deblocking the protected groups, and methoxypolyethylene glycol was included as a side chain. Also, it was confirmed that the obtained copolymer was a unimodal polymer having the ratio of a unit of PHS (Zmol) to the sum of units of PME1000 (X mol) and St (Y mol): Z/(X+Y)=0.067 and Mn=62,200.

(2) Preparation of Composition for Polymer Solid Electrolyte 2 g of the above obtained copolymer and 0.03 g and 0.5 g of glycidyl amine epoxy resin having three epoxy groups in the molecule ("Epotohto YH-434" produced by Tohto Kasei Co., Ltd.; epoxy equivalent: 120), which is a cross-linking agent, were dissolved in 20 ml of acetone in an argon atmosphere. Then, 0.17 g of LiClO$_4$ was added thereto and dissolved uniformly.

(3) Production of Membrane of Solid Electrolyte and Evaluation for Properties.

The above composition solution was poured and spread onto a board of Teflon (a registered mark) in an argon atmosphere, left at room temperature for 24 hours, and then dried under reduced pressure at 130° C. for 5 hours, and a uniform membrane of solid electrolyte was obtained (thickness: 100 μm). This membrane of solid electrolyte was placed between boards of platinum in an argon atmosphere, and ionic conductivity was measured based on complex impedance analysis by using an impedance analyzer (Solartron-1260) whose frequency was 5 to 10 MHz. As a result, the ionic conductivity was $8 \times 10^{-5}$ S/cm at 23° C.

Also, the dynamic viscoelasticity of the membrane of solid electrolyte was measured. As a result, it was shown that the membrane of solid electrolyte had the modulus of elasticity of 2 MPa at 23° C. Also, the observation of this cross-linked film under electron microscope showed that a network microphase-separated structure was present.

EXAMPLE 6

(1) Synthesis of Poly(PME-400-r-St-r-Glycidyl Methacrylate)Copolymer

In 60 g of toluene were dissolved 81 mmol of PME-400, 38 mmol of St, and 28 mmol of glycidyl (meth)acrylate (hereinafter abbreviated as "GMA" in an argon atmosphere. Then, 2 mmol of 2,2'-azobis-(2,4-dimethylvaleronitril) was added thereto, and it was heated and stirred at 65° C. for 5 hours followed by at 90° C. for 1 hour. After cooling the reaction solution to room temperature, it was poured into excessive amounts of hexane while stirring. After leaving it at rest, the supernatant liquid was removed. The residue was dried in vacuum at 60° C. for 24 hours. The obtained polymer was in a semi-solid state at room temperature. The GPC analysis showed that it had Mn=55,000. Also, the $^{13}$CNMR analysis showed that it was a random copolymer having the composition of PME-400/St/GMA=56/24/20 (mole ratio).

(2) Preparation of Composition for Polymer Solid Electrolyte 2 g of the above obtained copolymer, 0.18 g of 4-methylhexahydrophthalic anhydride which is a cross-linking agent, and 0.002 g of benzyldimethylamine which is a reaction activator were dissolved in 20 ml of acetone in an argon atmosphere. Then, 0.15 g of LiClO$_4$ was uniformly added into the obtained solution and dissolved uniformly.

(3) Production of Membrane of Solid Electrolyte and Evaluation of Properties.

The above composition was poured and spread onto a board of Teflon (a registered mark) in an argon atmosphere, left at room temperature for 24 hours, and then dried under reduced pressure at 60° C. for 5 hours followed by at 130° C. for 5 hours, and a uniform membrane of solid electrolyte was obtained (thickness: 100 μm). This membrane of solid electrolyte was placed between boards of platinum in an argon atmosphere, and ionic conductivity was measured based on complex impedance analysis by using an impedance analyzer (Solartron-1260) whose frequency was 5 to 10 MHz. As a result, the ionic conductivity was 8×10$^{-6}$ S/cm at 23° C. Also, the dynamic viscoelasticity of the film was measured. As a result, it was shown that the film had a modulus of elasticity of 0.5 MPa at 23° C.

COMPARATIVE EXAMPLE 1

2 g of each of the copolymers obtained in Examples 1 to 6 was dissolved in 20 g of THF. Each of the obtained solutions was poured and spread onto a board of Teflon (a registered mark), left at room temperature for 24 hours, and then, dried under reduced pressure at 60° C. for 24 hours followed by at 100° C. for 5 hours, and membranes were formed. However, all of the obtained membranes were sticky. Measurements were impossible because it was impossible to pull off the membranes.

EXAMPLE 7

(1) Synthesis of C-B-A-B-C Type Block Graft Copolymer

Into 78 g of toluene previously deaerated with argon was added 0.1 mmol of dichlorotris(triphenylphosphin) ruthenium and 30 mmol of methoxypolyethylene glycol mono (meth)acrylate ("Blenmer PME-1000" produced by NOF corporation; in Formula (XI), R$_1$=R$_2$=R$_4$=a hydrogen atom; R3=R5=a methyl group; m=23; hereinafter abbreviated as "PME-1000"), and these were mixed uniformly in an argon atmosphere. Then, 0.4 mmol of di-n-butylamine and 0.2 mmol of 2,2-dichloroacetophenone was added thereto, and a polymerization reaction was initiated by heating to 80° C. while stirring. After a lapse of 22 hours from when the reaction was initiated, the reaction system was cooled to 0° C. to terminate the polymerization reaction. The GPC analysis of the reaction solution showed that the degree of polymer conversion of PME-1000 was 50%. Subsequently, metal complexes and unreacted monomers were removed from the reaction solution by column purification. Then, polyPME-1000 (hereinafter abbreviated as "p-PME-1") was obtained by volatilizing the solution under reduced pressure. The GPC analysis showed that the obtained p-PME-1 was a single dispersion polymer of Mn=83,000.

Next, into 43 g of toluene previously deaerated with argon were added 0.04 mmol of chloropentamethylcyclopentadienyl bis(triphenylphosphin) rhutenium (hereinafter abbreviated as "CPS"), 0.2 mmol of p-PME-1, 17 mmol of styrene (hereinafter abbreviated as "St"), and 5 mmol of n-octane, and these were mixed uniformly in an argon atmosphere. Then, 0.4 mmol of di-n-butylamine was further added thereto, and a copolymerization reaction was initiated by heating to 100° C. while stirring. After a lapse of 45 hours from when the reaction was initiated, the reaction system was cooled to 0° C. to terminate the copolymerization reaction. The GC analysis showed that the degree of conversion of St was 60%. This reaction solution was subjected to column purification and purification under reduced pressure described above, and poly(St-b-PME-1000-b-St) (hereinafter abbreviated as "p-SbP-1") was finally obtained. The GPC analysis showed that the produced p-SbP-1 was a single dispersion polymer of Mn=88,000.

Next, into 45 g of toluene previously deaerated with argon were added 0.04 mmol of CPS, 0.2 mmol of p-SbP-1, 9 mmol of 2-hydroxyethyl acrylate (hereinafter abbreviated as "HEA"), and 5 mmol of n-octane, and these were mixed uniformly. Then, 0.4 mmol of di-n-butylamine was further added thereto, and a copolymerization reaction was initiated by heating to 80° C. After a lapse of 22 hours from when the reaction was initiated, the reaction system was cooled to 0° C. to terminate the copolymerization reaction. The GC analysis showed that the degree of conversion of HEA was 40%. This reaction solution was subjected to column purification and purification under reduced pressure described above, and a copolymer was obtained. The GPC analysis showed that the obtained copolymer was a single dispersion polymer of Mn=91,000. Moreover, the $^{13}$CNMR measurement showed that the obtained copolymer was a block/graft copolymer (hereinafter abbreviated as "BL-1") having a structure of poly(HEA-b-St-b-PME-1000-b-St-b-HEA) wherein the ratio of the number of moles of repeating units derived from PME-1000 to the number of moles of the total repeating units in the copolymer was 50%, the ratio of the number of moles of repeating units derived from St was 33%, and the ratio of the number of moles of repeating units derived from HEA was 17%.

The above obtained BL-1 was dissolved in THF, and the solution was poured and spread onto a board of Teflon (a registered mark), left at room temperature for 24 hours, and then dried under reduced pressure at 60° C. for 5 hours followed by at 100° C. for 10 hours, and a film was obtained (thickness: 100 μm). The observation of the internal structure of the obtained film by transmission electron microscopy showed that a network structure was present inside (see FIG. 1).

(2) Preparation of Composition for Polymer Solid Electrolyte 2 g of BL-1 and 0.04 g of tolylene-2,4-diisocyanate (hereinafter abbreviated as "TDI") which is a cross-linking agent were dissolved in 20 g of THF in an argon atmosphere. Then, into the obtained solution was added 0.21 g of LiClO$_4$ (hereinafter abbreviated as "LiPC"), and dissolved uniformly such that a composition for a polymer solid electrolyte was prepared.

(3) Production of Membrane of Solid Electrolyte and Evaluation of Properties.

The above composition was poured and spread onto a board of Teflon (a registered mark) in an argon atmosphere, left at room temperature for 24 hours, and then dried under reduced pressure at 60° C. for 5 hours followed by at 100° C. for 10 hours, and a uniform membrane of solid electrolyte was obtained (thickness: 100 μm). This membrane of solid electrolyte was placed between boards of platinum in an argon atmosphere, and ionic conductivity was measured based on complex impedance analysis by using an impedance analyzer (Solartron-1260) whose frequency was 5 to 10 MHz. As a result, the analysis showed that the ionic conductivity was 7×10$^{-4}$ S/cm at 23° C.

Figure 2:
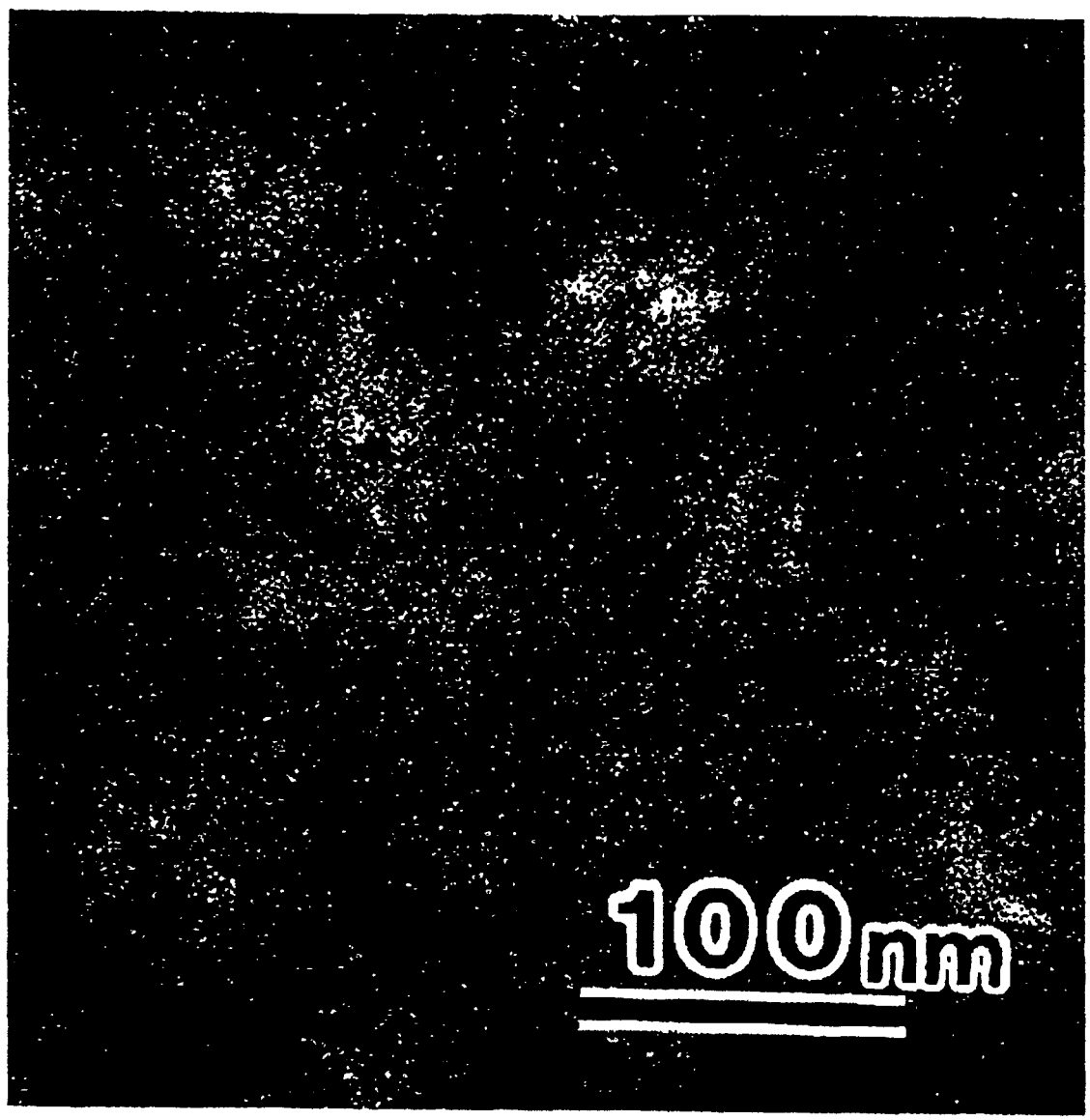
FIG. 2 is a photograph of a polymer solid electrolyte of Example 7 by TEM.

Also, another composition was prepared by way of the same procedures described above except that LiPC was not added, and a membrane was formed with the obtained composition by way of the above described procedures. The dynamic viscoelasticity of the obtained cross-linked film was measured, and the internal structure also was observed by transmission electron microscopy (TEM). As a result, it was shown that the cross-linked film had a modulus of elasticity of 8 MPa at 23° C. The observation by TEM showed that a network microphase-separated structure was present (see FIG. 2).

EXAMPLE 8

A composition for a polymer solid electrolyte was prepared with the block/graft copolymer BL-1 obtained in Example 7 based on the same procedures as in Example 7 except that no cross-linking agent was added. Then, a membrane of solid electrolyte was produced by way of the same procedures as in Example 7, and the ionic conductivity and the modulus of elasticity of the film were measured, and the internal structure also was observed by TEM. As a result, it was shown that the film had an ionic conductivity of $2\times10^{-4}$ S/cm at 23° C. Also, observation of the internal structure by TEM showed that a network microphase-separated structure was present.

EXAMPLE 9

(1) Synthesis of C-B-A-B-C Type Block Graft Copolymer

Into 54 g of toluene previously deaerated with argon was added 0.05 mmol of dichlorotris(triphenylphosphin) ruthenium, and 50 mmol of methoxypolyethylene glycol mono (meth)acrylate ("Blenmer PME-400" produced by NOF corporation; in Formula (XI), $R_1=R_2=R_4=$a hydrogen atom; $R3=R5=$a methyl group; m=9; hereinafter abbreviated as "PME-400"), and these were mixed uniformly in an argon atmosphere. Then, 0.2 mmol of di-n-butylamine and 0.1 mmol of 2,2-dichloroacetophenone were added thereto, and a polymerization reaction was initiated by heating to 80° C. while stirring. After a lapse of 30 hours from when the reaction was initiated, the reaction system was cooled to 0° C. to terminate the polymerization reaction. The GPC analysis of the reaction solution showed that the degree of polymer conversion of PME-400 was 60%. Subsequently, metal complexes and unreacted monomers were removed from the reaction solution by column purification. Then, polyPME-400 (hereinafter abbreviated as "p-PME-2") was obtained by removing the toluene under reduced pressure. The GPC analysis showed that the obtained p-PME-2 was a single dispersion polymer of Mn=140,000.

Next, into 40 g of toluene previously deaerated with argon were added 0.02 mmol of CPS, 0.1 mmol of p-PME-2, and 29 mmol of St, and 5 mmol of n-octane, and these were mixed uniformly in an argon atmosphere. Then 0.2 mmol of di-n-butylamine was further added thereto, and a copolymerization reaction was initiated by heating to 100° C. while stirring. After a lapse of 30 hours from when the reaction was initiated, the reaction system was cooled to 0° C. to terminate the copolymerization reaction. The GC analysis showed that the degree of conversion of St was 50%. This solution was subjected to column purification and the purification under reduced pressure described above, and poly(St-b-PME-400-b-St) (hereinafter abbreviated as "p-SbP-2") was finally obtained. The GPC analysis showed that the produced p-SbP-2 was a single dispersion polymer of Mn=155,000.

Next, into 40 g of toluene previously deaerated with argon were added 0.02 mmol of CPS, 0.1 mmol of p-SbP-2, 13 mmol of HEA, and 5 mmol of n-octane, and these were mixed uniformly. Then, 0.2 mmol of di-n-butylamine was further added thereto, and a copolymerization reaction was initiated by heating to 80° C. while stirring. After a lapse of 20 hours from when the reaction was initiated, the reaction system was cooled to 0° C. to terminate the copolymerization reaction. The GC analysis of the reaction solution showed that the degree of conversion of HEA was 33%. This solution was subjected to column purification and purification under reduced pressure described above, and a copolymer was obtained. The GPC analysis showed that the obtained copolymer had a property of Mn=160,000. Also, the $^{13}$CNMR measurement showed that the obtained copolymer was a block/graft copolymer (hereinafter abbreviated as "BL-2") having a structure of poly(HEA-b-St-b-PME-400-b-St-b-HEA) wherein the ratio of the number of moles of repeating units derived from PME-400 to the total repeating units in the copolymer was 60%, the ratio of the number of moles of repeating units derived from St was 32%, and the ratio of the number of moles of repeating units derived from HEA was 8%.

(2) Preparation of Composition for Polymer Solid Electrolyte 2 g of BL-2 and 0.04 g of TDI which is a cross-linking agent were dissolved in 20 g of THF in an argon atmosphere. Then, into the obtained solution was added 0.18 g of LiPC, and dissolved uniformly such that a composition for a polymer solid electrolyte was prepared.

(3) Production of Membrane of Solid Electrolyte and Evaluation of Properties.

A membrane of solid electrolyte (thickness: 100 μm) was produced with the above composition by way of the same procedures as in Example 7. The ionic conductivity and the modulus of elasticity of the film were measured, and the internal structure also was observed by TEM.

As a result, it was shown that the film had an ionic conductivity of $3.5\times10^{-4}$ S/cm at 23° C. and a modulus of elasticity of 10 MPa at 23° C. Also, the observation of the internal structure by TEM showed that the same network microphase-separated structure as that found in Example 7 was present.

EXAMPLE 10

(1) Synthesis of C-B-A-B-C Type Block Graft Copolymer

Into 47 g of toluene previously deaerated with argon were added 0.04 mmol of CPS, 0.2 mmol of p-SbP-1 obtained in Example 7, 15 mmol of trimethylsilyl (meth)acrylate (hereinafter abbreviated "MA-TMS") which was previously purified and prepared by silylation of (meth)acrylic acid (hereinafter abbreviated "MA") with trimethylsilyl chloride, and 5 mmol of n-octane, and these were mixed uniformly in an argon atmosphere. Then, 0.4 mmol of di-n-butylamine was further added thereto, and a copolymerization reaction was initiated by heating to 80° C. while stirring. After a lapse of 30 hours from when the reaction was initiated, the reaction system was cooled to 0° C. to terminate the copolymerization reaction. The GC analysis showed that the degree of conversion of MA-TMS was 45%. This solution was subjected to column purification and purification under reduced pressure described above, and poly(MA-TMS-b-St-b-PME-1000-b-St-b-MA-TMS) (hereinafter abbreviated as p-SbP-3) was finally obtained. The GPC analysis showed that the produced polymer was a single dispersion polymer of Mn=93,000. This p-SbP-3 was dissolved in THF, and a 10% solution was prepared. A desilylation reaction of repeating units of MA-TMS was carried out in a weakly acidic environment by adding N/2 hydrochloric acid at room temperature. The reaction solution in which the reaction of desilylation was over was extracted by adding ethyl acetate and water. Solvent extraction was further repeated by adding only water until the acidity of the lower layer (aqueous layer) became neutral. After the acidity of the layer became neutral, a polymer was obtained from the upper layer (organic layer) by volatilizing under reduced pressure. The GPC analysis showed that the obtained polymer was a single dispersion polymer of Mn=90,000. Also, the $^{13}$CNMR measurement showed that the obtained polymer was a block/graft copolymer (hereinafter abbreviated as "BL-3") having a structure of poly(MA-TMS-b-St-b-PME-1000-b-St-b-MA) wherein the ratio of the number of moles of repeating units derived from PME-1000 to the total repeating units in the copolymer was 51%, the ratio of the number of moles of repeating units derived from St was 33%, and the ratio of the number of moles of repeating units derived from HEA was 16%.

(2) Preparation of Composition for Polymer Solid Electrolyte 2 g of BL-3 and 0.05 g of glycidylamine epoxy resin ("Epotohto YH-434" produced by Tohto Kasei Co., Ltd.; epoxy equivalent: 120) having three epoxy groups in the molecule, which is a cross-linking agent, were dissolved in 20 ml of THF in an argon atmosphere. Then, into the obtained solution was further added 0.21 g of LiPC, and dissolved uniformly such that a composition for a polymer solid electrolyte was prepared.

(3) Production of Membrane of Solid Electrolyte and Evaluation of Properties.

A membrane of solid electrolyte (thickness: 100 μm) was produced with the above composition by way of the same procedures as in Example 7 except that the poured and spread composition was left at room temperature for 24 hours and then dried under reduced pressure at 80° C. for 5 hours followed by at 130° C. for 5 hours. The ionic conductivity and the modulus of elasticity of the film were measured. Also, the TEM observation of the internal structure was carried out.

As a result, it was shown that the film had an ionic conductivity of $4 \times 10^{-4}$ S/cm at 23° C. and a modulus of elasticity of 5 MPa at 23° C. Also, the TEM observation showed that the same microphase-separated structure as found in Example 7 was present.

EXAMPLE 11

(1) Synthesis of C-B-A-B-C Type Block Graft Copolymer

Into 70 g of toluene previously deaerated with argon were added 0.02 mmol of CPS, 0.1 mmol of p-SbP-1 obtained in Example 1, 13 mmol of m-t-butoxystyrene (hereinafter abbreviated as MTBST), and 5 mmol of n-octane, and these were mixed uniformly in an argon atmosphere. Then, 0.2 mmol of di-n-butylamine was further added thereto, and the copolymerization reaction was initiated by heating to 100° C. while stirring. After a lapse of 30 hours from when the reaction was initiated, the reaction system was cooled to 0° C. to terminate the copolymerization reaction. The GC analysis showed that the degree of conversion of MTBST was 50%. This reaction solution was subjected to column purification and purification under reduced pressure described above, and poly(MTBST-b-St-b-PME-1000-b-St-b-MTBST) (hereinafter abbreviated as "p-SbP-4") was finally obtained. The GPC analysis showed that the produced polymer was a single dispersion polymer of Mn=167,000. This p-Sbp-4 was dissolved in a mixed solvent of toluene/ethanol (weight ratio of 1:1), and a 10% solution was prepared. A reaction of deblocking protected groups was carried out for 3 hours at 65° C. by adding 1.2 mmol of concentrated sulfuric acid. Next, the temperature of the reaction solution was made equal to room temperature, and 1 g of an acid absorbent ("Carplex#1120" produced by Showa Chemical Industry Co., Ltd.) was added into the reaction solution. The reaction solution was stirred for 10 min, and then filtered. A component of solvent was removed by volatilizing the filtrate under reduced pressure, and a copolymer in a semi-solid state was obtained. It was confirmed based on the $^{13}$CNMR analysis of this polymer that the m-hydroxystrene (hereinafter abbreviated as "MHS") backbone was formed through the completion of the reaction of deblocking the protected groups because no signal around 76 ppm derived from tertiary carbons of m-t-butoxy groups was recognized. The GPC analysis showed that this polymer was a single dispersion polymer of Mn=162,800. Moreover, the $^{13}$CNMR analysis showed that the obtained polymer was a block/graft copolymer (hereinafter abbreviated as "BL-4") having a structure of poly(MHS-b-St-b-PME-1000-b-St-b-MHS) wherein the ratio of the number of moles of repeating units derived from PME-1000 to the total repeating units in the copolymer was 58%, the ratio of the number of moles of repeating units derived from St was 29%, and the ratio of the number of moles of repeating units derived from MHS was 13%.

(2) Preparation of Composition for Polymer Solid Electrolyte 2 g of BL-4 and 0.1 g of glycidylamine epoxy resin YH-434 (described above) which is a cross-linking agent were dissolved in 20 g of THF in an argon atmosphere. Then, into the obtained solution was further added 0.17 g of LiPC, and this was dissolved uniformly such that a composition for a polymer solid electrolyte was prepared.

(3) Production of Membrane of Solid Electrolyte and Evaluation of Properties.

A membrane of solid electrolyte was produced with the above composition by way of the same procedures as in Example 9 (thickness: 100 μm). The ionic conductivity and the modulus of elasticity of the film were measured. Also, TEM observation of the internal structure was carried out.

As a result, it was shown that the film had an ionic conductivity of $1 \times 10^{-4}$ S/cm at 23° C. and a modulus of elasticity of 6 MPa at 23° C. Also, the TEM observation showed that the same microphase-separated structure as found in Example 7 was present.

EXAMPLE 12

(1) Synthesis of C-B-A-B-C Type Block Graft Copolymer

Into 300 g of toluene deaerated previously with argon were added 0.48 g (0.5 mmol) of dichlorotris(triphenylphosphin) ruthenium and 125 g (186 mmol) of methoxypolyethylene glycol mono (meth)acrylate ("Blenmer PME-550" produced by NOF corporation; in Formula (XI), $R_1=R_2=R_4$=a hydrogen atom; R3=R5=a methyl group; m=13; hereinafter abbreviated as "PME-550"), and these were mixed uniformly in an argon atmosphere. Then, 0.26 g (2 mmol) of di-n-butylamine and 0.19 g (1 mmol) of 2,2-dichloroacetophenone were added thereto, and a polymerization reaction was initiated by heating to 80° C. while stirring. After a lapse of 29 hours from when the reaction was initiated, the reaction system was cooled to 0° C. to terminate the polymerization reaction. The degree of polymerization of PME-550 was 73%. Subsequently, metal complexes and unreacted monomers were removed from the reaction solution by column purification. Then, the solution was volatilized and further dried at 60° C. under reduced pressure for 5 hours, and polyPME-550 was obtained. The GPC analysis showed that the obtained polyPME-550 was a single dispersion polymer of Mn=220,000.

Next, into 200 g of toluene previously deaerated with argon were added 0.16 g (0.2 mmol) of chloropentamethylcyclopentadienylbis(triphenylphosphin) rhutenium, 40 g (0.4 mmol) of polyPME-550, 10 g (96 mmol) of styrene, and 0.1 g (0.8 mmol) of di-n-butylamine, and these were mixed uniformly in an argon atmosphere. Then, a copolymerization reaction was initiated by heating to 100° C. while stirring. After a lapse of 36 hours from when the reaction was initiated, the reaction system was cooled to 0° C. to terminate the copolymerization reaction. The degree of polymerization of St was 18%. This reaction solution was subjected to column purification and purification under reduced pressure described above. The poly(St-b-PME-550-b-St) obtained by drying at 60° C. under reduced pressure was analyzed by GPC. The GPC analysis showed that the produced poly(St-b-PME-550-b-St) was a single dispersion polymer of Mn=230,000.

Next, into 64 g of toluene previously deaerated with argon was added 0.06 g (0.07 mmol) of chloropentamethylcyclopentadienylbis(triphenylphosphin) rhutenium, 14.5 g (0.14 mmol) of poly(St-b-PME-550-b-St), 1.5 g (3.2 mmol) of HEA, and 0.04 g (0.3 mmol) of di-n-butylamine, and these were mixed uniformly in an argon atmosphere. Then, a copolymerization reaction was initiated by heating to 80° C. After a lapse of 50 hours from when the reaction was initiated, the reaction system was cooled to 0° C. to terminate the copolymerization reaction. The GC analysis showed that the degree of polymerization conversion of HEA was 42%. This reaction solution was subjected to column purification and purification under reduced pressure described above. The copolymer obtained by drying at 60° C. under reduced pressure was analyzed by GPC. The GPC analysis showed that the produced copolymer was a single dispersion polymer of Mn=240,000. The $^{13}$CNMR measurement showed that the obtained copolymer had a structure of poly(HEA-b-St-b-PME-550-b-St-b-HEA) wherein the ratio of the number of moles of repeating units derived from PME-550 to the number of moles of the total repeating units in the copolymer was 92%, the ratio of the number of moles of repeating units derived from St was 4%, and the ratio of the number of moles of repeating units derived from HEA was 4%.

(2) Preparation of Compositions for Polymer Solid Electrolyte

A tetrahydrofuran solution containing tolylene-2,4-diisocyanate in a concentration of 10% by weight was used as a cross-linking agent. 0.4 g of the copolymer obtained by way of the above described procedures, 1.6 g of the tetrahydrofuran solution, and the tolylene-2,4-diisocyanate solution in the concentration shown in Table 1 were dissolved in 2 g of acetone in an argon atmosphere. Then, into the obtained solution was added 0.022 g of LiClO$_4$, and this was dissolved uniformly such that a composition for a polymer solid electrolyte was prepared.

(3) Production of Membrane of Solid Electrolyte and Evaluation of properties.

A membrane of solid electrolyte was produced with the above composition, to which the electrolytic salt was added in the concentration shown in Table 1, by way of the same procedures as in Example 7 (thickness: 100 μm). The ionic conductivity (S/cm) thereof at 30° C. was measured. Also, the temperature characteristics of the ionic conductivity were measured, and an activation energy ΔE (kJ/degree·mol) given by Formula σd∝e−Δ$^{E/kT}$ was calculated from log σd−1/T plotting using the Arrhenius method. The results were shown together with the properties of the membranes in Table 1.

Moreover, a cross-linking membrane containing no electrolytic salt was also produced, and the dynamic viscoelasticity thereof at 23° C. (MPa) was measured. These results were also shown in Table 1.

Also, the TEM observation of this cross-linked film showed that a network microphase-separated structure was present.

EXAMPLE 13

(1) Synthesis of C-B-A-B-C Type Block Graft Copolymer

Into 1400 g of toluene previously deaerated with argon were added 2.87 g (3 mmol) of dichlorotris(triphenylphosphin) ruthenium and 601 g (540 mmol) of PME-1000, and these were mixed uniformly in an argon atmosphere. Then, 1.55 g (12 mmol) of di-n-butylamine and 0.57 g (3 mmol) of 2,2-dichloroacetophenone were added thereto, and a polymerization reaction was initiated by heating to 80° C. while stirring. After a lapse of 41 hours from when the reaction was initiated, the reaction system was cooled to 0° C. to terminate the polymerization reaction. The degree of polymerization of PME-1000 was 52%. Subsequently, metal complexes and unreacted monomers were removed from the reaction solution by column purification. Then, the solution was volatilized and further dried at 60° C. under reduced pressure for 5 hours, and polyPME-1000 was obtained. The GPC analysis showed that the obtained polyPME-1000 was a single dispersion polymer of Mn=200,000.

Next, into 500 g of toluene previously deaerated with argon were added 0.37 g (0.47 mmol) of chloropentamethylcyclopentadienylbis(triphenylphosphin) rhutenium, 150 g (1.9 mmol) of polyPME-1000, 16.7 g (160 mmol) of styrene, and 0.48 g (3.8 mmol) of di-n-butylamine, and these were mixed uniformly in an argon atmosphere. Then, a copolymerization reaction was initiated by heating to 100° C. while stirring. After a lapse of 112 hours from when the reaction was initiated, the reaction system was cooled to 0° C. to terminate the copolymerization reaction. The degree of polymerization of St was 52%. This reaction solution was subjected to column purification and purification under reduced pressure described above. The poly(St-b-PME-1000-b-St) obtained by drying at 60° C. under reduced pressure for 5 hours was analyzed by GPC. The GPC analysis showed that the obtained poly(St-b-PME-1000-b-St) was a single dispersion polymer of Mn=210,000.

Next, into 187 g of toluene previously deaerated with argon were added 0.21 g (0.27 mmol) of chloropentamethylcyclopentadienylbis(triphenylphosphin) rhutenium, 56 g (0.67 mmol) of poly(St-b-PME-1000-b-St), 6.2 g (53 mmol) of HEA, and 0.17 g (1.3 mmol) of di-n-butylamine, and these were mixed uniformly in an argon atmosphere. Then, a copolymerization reaction was initiated by heating to 80° C. After a lapse of 23 hours from when the reaction was initiated, the reaction system was cooled to 0° C. to terminate the copolymerization reaction. The GC analysis showed that the degree of polymerization conversion of HEA was 55%. This reaction solution was subjected to column purification and purification under reduced pressure described above. The copolymer obtained by drying at 60° C. under reduced pressure for 5 hours was analyzed by GPC. The GPC analysis showed that the produced copolymer was a single dispersion polymer of Mn=220,000. The $^{13}$CNMR measurement showed that the obtained copolymer had a structure of poly(HEA-b-St-b-PME-1000-b-St-b-HEA) wherein the ratio of the number of moles of repeating units derived from PME-1000 to the number of moles of the total repeating units in the copolymer was 89%, the ratio of the number of moles of repeating units derived from St was 5%, and the ratio of the number of moles of repeating units derived from HEA was 6%.

(2) Preparation of Composition for Polymer Solid Electrolyte

A tetrahydrofuran solution containing tolylene-2,4-diisocyanate in a concentration of 10% by weight was used as a cross-linking agent. 0.4 g of the copolymer obtained by way of the above described procedures, 1.6 g of the tetrahydrofuran solution, and the tolylene-2,4-diisocyanate solution in the concentration shown in Table 1 were dissolved in 2 g of acetone in an argon atmosphere. Then, into the obtained solution was added 0.023 g of $LiClO_4$, and this was dissolved uniformly such that a composition for a polymer solid electrolyte was prepared.

(3) Production of Membrane of Solid Electrolyte and Evaluation of Properties.

A membrane of solid electrolyte was produced with the above composition, to which the electrolytic salt was added in the concentration shown in Table 1, by way of the same procedures as in Example 7 by adding an electrolytic salt in the amount shown in Table 1 (thickness: 100 μm). The ionic conductivity thereof at 30° C. was measured. Also, an activation energy ΔE was calculated by way of the procedures in Example 12. The results were shown together with the properties of the membranes in Table 1.

Moreover, a cross-linking membrane containing no electrolytic salt was also produced, and the dynamic viscoelasticity thereof at 23° C. (MPa) was measured. These results are also shown in Table 1. Also, the TEM observation of this cross-linked film showed that a network microphase-separated structure was present.

TABLE 1

| | Cross-linking agent (g)[a] | Membrane Properties[b] | Dynamic viscoelasticity | Ionic conductivity | ΔE |
|---|---|---|---|---|---|
| Ex. 12-1 | 0.03 (25%) | ○ | 3 | $1.2 \times 10^{-4}$ | 52.4 |
| Ex. 12-2 | 0.06 (50%) | ○ | 5 | $2.0 \times 10^{-4}$ | 68.4 |
| Ex. 12-3 | 0.00 (0%) | Δ | 2 | $1.0 \times 10^{-4}$ | 56.4 |
| Ex. 13-1 | 0.045 (25%) | ○ | 5 | $1.5 \times 10^{-4}$ | 50.4 |
| Ex. 13-2 | 0.090 (50%) | ○ | 7 | $1.7 \times 10^{-4}$ | 54.1 |
| Ex. 13-3 | 0.00 (0%) | Δ | 3 | $1.3 \times 10^{-4}$ | 48.4 |

[a]The value inside parenthesis represents the ratio of the number of moles to repeating units of HEA.
[b]○ means hard, and Δ means slightly soft.

EXAMPLE 14

(1) Production of Solid Electrolyte Battery 340 mg of a powder of $LiCoO_2$ ("CellseedC-10" produced by Nippon Chemical Industrial Co., Ltd.; particle size: 10-15 μm) and 40 mg of ketjen black (KB produced by Ketjen Black International Co., Ltd.) were put in a mortar and mixed thoroughly. 170 mg of a 12% by weight N-methyl pyrrolidone (NMP) solution of polyvinylidene fluoride (PVdF produced by Aldrich, molecular weight: 534,000) was added thereto, and mixed in thoroughly with a spartula. Then, the specimen was applied onto a capacitor of aluminum foil (80 mm×200 mm and thickness: 50 μm) with a doctor blade (width: 40 mm and air gap: 50 μm), and vacuum-dried at 100° C. for 24 hours, and an anode layer was produced by pressing that at a pressure of 20 $MPa/cm^2$ (thickness: 32 μm, content: $LiCoO_2$ 5 $mg/cm^2$).

Next, 1 ml of the composition for a polymer solid electrolyte prepared in Example 12-2 described above was pour and spread onto the anode, and annealed by treating at 80° C. for 2 hours in a nitrogen atmosphere, and further at 80° C. for 1 hour in a vacuum to form a microphase-separated structure. Then, vacuum-dried at 120° C. for 5 hours, and a membrane of solid electrolyte with about 40 μm thickness was formed on the anode. The produced anode having the membrane of solid electrolyte was covered with a metal sheet of Li (produced by Furuuchi Chemical Corporation, 2000 μm thickness), and a 2016 Type coin-shaped cell was assembled by disposing a board of copper thereon.

(2) Electric Charge-Discharge Test

Figure 3:
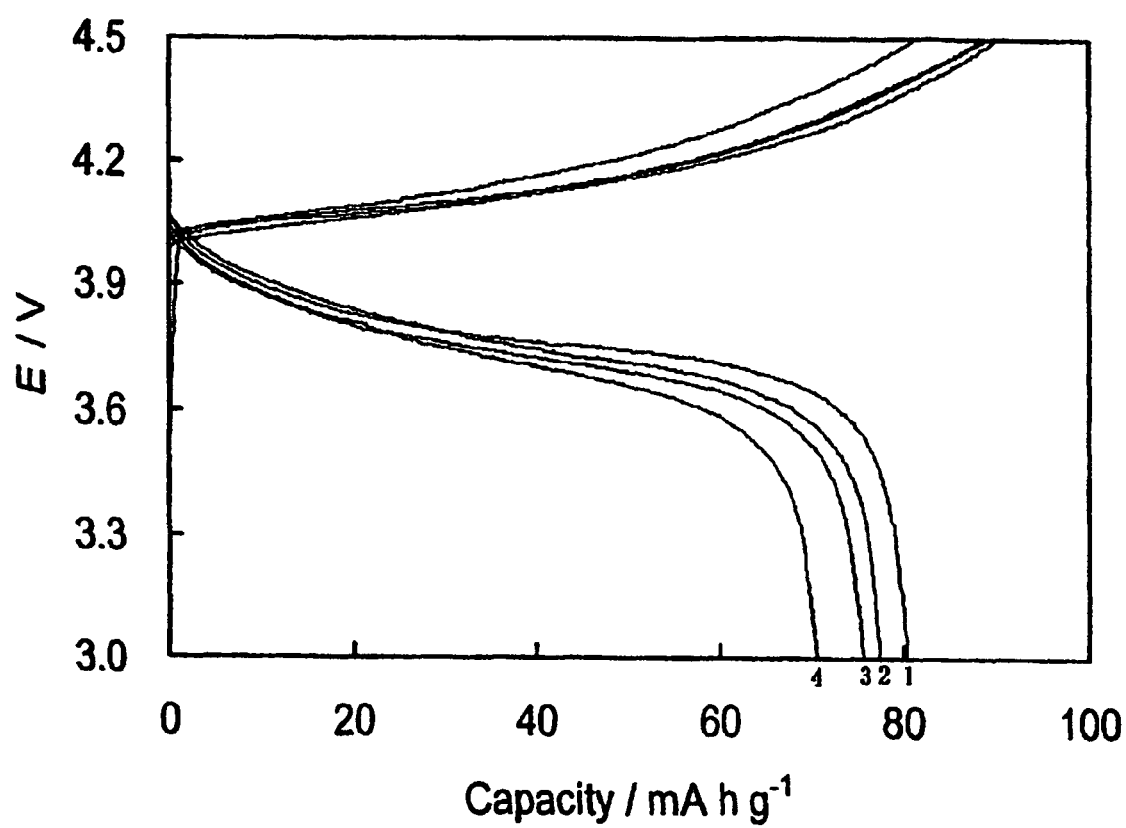
FIG. 3 is a graph showing a relationship between discharge capacity and voltage at a cycle of 1, 5, 10 and 20 in Example 15.

A test of electric charge and discharge was carried out under the following conditions by using a 2016 Type coin-shaped cell, and the initial discharge capacity, discharge voltage, charge-discharge efficiency, discharge capacity after each cycle, and voltage efficiency were measured. Also, the relationship between the discharge capacity and the voltage at each charge-discharge cycle of 1, 5, 10 and 20 was shown in FIG. 3.

<Conditions for Charge-Discharge Test>

Range of voltage: 3.0-4.5V, value of electric current: 0.1 C, room temperature, 20 cycles From the results of the above charge-discharge test, it was found that a solid electrolyte battery having the following properties was obtained: initial discharge capacity: 81 mAh/g, charge voltage: 4.5 V, discharge voltage: 3.78 V and charge-discharge efficiency: 90%; discharge capacity after 20 cycles: 71 mAh/g, discharge voltage: 3.70 V and charge-discharge efficiency: 87%.

EXAMPLE 15

(1) Synthesis of C-B-A-B-C Type Block Graft Copolymer

Into 300 g of toluene previously deaerated with argon were added 0.96 g (1 mmol) of dichlorotris(triphenylphosphin) ruthenium and 100 g (90 mmol) of PME-1000, and these were mixed uniformly in an argon atmosphere. Then, 0.52 g (4 mmol) of di-n-butylamine and 0.19 g (1 mmol) of 2,2-dichloroacetophenone were added thereto, and a polymerization reaction was initiated by heating to 80° C. while stirring. After a lapse of 64 hours from when the reaction was initiated, the reaction system was cooled to 0° C. to terminate the polymerization reaction. The degree of polymerization of PME-1000 was 66%. Subsequently, metal complexes and unreacted monomers were removed from the reaction solution by column purification. Then, the solution was volatilized and further dried at 60° C. under reduced pressure for 5 hours, and polyPME-1000 was obtained. The GPC analysis showed that the obtained polyPME-1000 was a single dispersion polymer of Mn=190,000.

Next, into 108 g of toluene previously deaerated with argon were added 0.1 g (0.12 mmol) of chloropentamethylcyclopentadienylbis(triphenylphosphin) rhutenium, 30 g (0.16 mmol) of polyPME-1000, 16.2 g (155 mmol) of styrene, and 0.16 g (1.2 mmol) of di-n-butylamine, and these were mixed uniformly in an argon atmosphere. Then, a copolymerization reaction was initiated by heating to 100° C. while stirring. After a lapse of 45 hours from when the reaction was initiated, the reaction system was cooled to 0° C. to terminate the copolymerization reaction. The degree of polymerization of styrene was 35%. This reaction solution was subjected to column purification and purification under reduced pressure described above. The poly(St-b-PME-1000-b-St) obtained by drying at 60° C. for 5 hours under reduced pressure was analyzed by GPC. The GPC analysis showed that the obtained poly(St-b-PME-1000-b-St) was a single dispersion polymer of Mn=230,000.

Next, into 70 g of toluene previously deaerated with argon were added 0.08 g (0.1 mmol) of chloropentamethylcyclopentadienylbis(triphenylphosphin) rhutenium, 20 g (0.1 mmol) of poly(St-b-PME-1000-b-St), 3.5 g (30 mmol) of HEA, and 0.1 g (0.8 mmol) of di-n-butylamine, and these were mixed uniformly in an argon atmosphere. Then, a copolymerization reaction was initiated by heating to 80° C. After a lapse of 19 hours from when the reaction was initiated, the reaction system was cooled to 0° C. to terminate the copolymerization reaction. The GC analysis showed that the degree of polymerization conversion of HEA was 55%. This reaction solution was subjected to column purification and purification under reduced pressure described above. The copolymer obtained by drying at 60° C. for 5 hours under reduced pressure was analyzed by GPC. The GPC analysis showed that the produced copolymer was a single dispersion polymer of Mn=250,000. The $^{13}$CNMR measurement showed that the obtained copolymer had a structure of poly (HEA-b-St-b-PME-1000-b-St-b-HEA) wherein the ratio of the number of moles of repeating units derived from PME-1000 to the number of moles of the total repeating units in the copolymer was 76%, the ratio of the number of moles of repeating units derived from St was 15%, and the ratio of the number of moles of repeating units derived from HEA was 9%.

(2) Preparation of Compositions for Polymer Solid Electrolyte

A tetrahydrofuran solution containing tolylene-2,4-diisocyanate in a concentration of 10% by weight was used as a cross-linking agent. 0.4 g of the copolymer obtained by way of the above described procedures, 1.6 g of the tetrahydrofuran solution. and the tolylene-2,4-diisocyanate solution in the amount shown in Table 2 were dissolved in 2 g of acetone in an argon atmosphere. Then, into the obtained solution was added 0.033 g of LiClO$_4$, and this was dissolved uniformly such that a composition for a polymer solid electrolyte was prepared.

(3) Production of Membrane of Solid Electrolyte and Evaluation of Properties.

A membrane of solid electrolyte was produced with the above composition by way of the same procedures as in Example 7 (thickness: 100 μm). The ionic conductivity thereof (S/cm) at 30° C. was measured. Also, an activation energy ΔE was calculated by way of the procedures as in Example 12. The results were shown together with the properties of the membranes in Table 2.

EXAMPLE 16

(1) Synthesis of C-B-A-B-C Type Block Graft Copolymer

Into 300 g of toluene previously deaerated with argon were added 0.96 g (1 mmol) of dichlorotris(triphenylphosphin) ruthenium and 100 g (90 mmol) of PME-1000, and these were mixed uniformly in an argon atmosphere. Then, 0.52 g (4 mmol) of di-n-butylamine and 0.19 g (1 mmol) of 2,2-dichloroacetophenone were added thereto, and a polymerization reaction was initiated by heating to 80° C. while stirring. After a lapse of 64 hours from when the reaction was initiated, the reaction system was cooled to 0° C. to terminate the polymerization reaction. The degree of polymerization of PME-1000 was 66%. Subsequently, metal complexes and unreacted monomers were removed from the reaction solution by column purification. Then, the solution was volatized and further dried at 60° C. under reduced pressure for 5 hours, and polyPME-1000 was obtained. The GPC analysis showed that the obtained polyPME-1000 was a single dispersion polymer of Mn=190,000.

Next, into 89 g of toluene previously deaerated with argon were added 0.1 g (0.12 mmol) of chloropentamethylcyclopentadienylbis(triphenylphosphin) rhutenium, 30 g (0.16 mmol) of polyPME-1000, 8.0 g (77 mmol) of styrene, and 0.15 g (1.2 mmol) of di-n-butylamine, and these were mixed uniformly in an argon atmosphere. Then, a copolymerization reaction was initiated by heating to 100° C. while stirring. After lapse of 29 hours from when the reaction was initiated, the reaction system was cooled to 0° C. to terminate the copolymerization reaction. The degree of polymerization of styrene was 32%. This reaction solution was subjected to column purification and purification under reduced pressure described above. The poly(St-b-PME-1000-b-St) obtained by drying at 60° C. for 5 hours under reduced pressure was analyzed by GPC. The GPC analysis showed that the obtained poly(St-b-PME-1000-b-St) was a single dispersion polymer of Mn=210,000.

Next, into 82 g of toluene previously deaerated with argon were added 0.08 g (0.1 mmol) of chloropentamethylcyclopentadienylbis(triphenylphosphin) rhutenium, 20 g (0.1 mmol) of poly(St-b-PME-1000-b-St), 7.4 g (64 mmol) of HEA, and 0.1 g (0.8 mmol) of di-n-butylamine, and these were mixed uniformly in an argon atmosphere. Then, a copolymerization reaction was initiated by heating to 80° C. After a lapse of 19 hours from when the reaction was initiated, the reaction system was cooled to 0° C. to terminate the copolymerization reaction. The GC analysis showed that the degree of polymerization conversion of HEA was 42%. This reaction solution was subjected to column purification and purification under reduced pressure described above. The copolymer obtained by drying at 60° C. for 5 hours under reduced pressure was analyzed by GPC. The GPC analysis showed that the produced copolymer was a single dispersion polymer of Mn=240,000. The $^{13}$CNMR measurement showed that the obtained copolymer had a structure of poly(HEA-b-St-b-PME-1000-b-St-b-HEA) wherein the ratio of the number of moles of repeating units derived from PME-1000 to the number of moles of the total repeating units in the copolymer was 80%, the ratio of the number of moles of repeating units derived from St was 7%, and the ratio of the number of moles of repeating units derived from HEA was 13%.

(2) Preparation of Compositions for Polymer Solid Electrolyte

A tetrahydrofuran solution containing tolylene-2,4-diisocyanate in a concentration of 10% by weight was used as a cross-linking agent. 0.4 g of the copolymer obtained by way of the above described procedures, 1.6 g of the tetrahydrofuran solution, and the tolylene-2,4-diisocyanate solution in the amount shown in Table 2 were dissolved in 2 g of acetone in an argon atmosphere. Then, into the obtained solution was added 0.035 g of LiClO$_4$, and this was dissolved uniformly such that a composition for a polymer solid electrolyte was prepared.

(3) Production of Membrane of Solid Electrolyte and Evaluation of Properties.

A membrane of solid electrolyte was produced with the above composition by way of the same procedures as in Example 7 (thickness: 100 μm). The ionic conductivity thereof (S/cm) at 30° C. was measured. Also, an activation energy ΔE was calculated by way of the procedures in Example 12. The results were shown together with the properties of the membranes in Table 2.

EXAMPLE 17

(1) Synthesis of C-B-A-B-C Type Block Graft Copolymer

Into 146 g of toluene previously deaerated with argon was added 0.24 g (0.25 mmol) of dichlorotris(triphenylphosphin) ruthenium and 63 g (93 mmol) of PME-550, and these were mixed uniformly in an argon atmosphere. Then, 0.13 g (1 mmol) of di-n-butylamine and 0.1 g (0.5 mmol) of 2,2-dichloroacetophenone were added thereto, and a polymerization reaction was initiated by heating to 80° C. while stirring. After a lapse of 28 hours from when the reaction was initiated, the reaction system was cooled to 0° C. to terminate the polymerization reaction. The degree of polymerization of PME-550 was 72%. Subsequently, metal complexes and unreacted monomers were removed from the reaction solution by column purification. Then, the solution was volatilized and further dried at 60° C. under reduced pressure for 5 hours, and polyPME-550 was obtained. The GPC analysis showed that the obtained polyPME-550 was a single dispersion polymer of Mn=160,000.

Next, into 58 g of toluene previously deaerated with argon were added 0.04 g (0.05 mmol) of chloropentamethylcyclopentadienylbis(triphenylphosphin) rhutenium, 10 g (0.06 mmol) of polyPME-550, 4.4 g (42 mmol) of styrene, and 0.03 g (0.2 mmol) of di-n-butylamine, and these were mixed uniformly in an argon atmosphere. Then, a copolymerization reaction was initiated by heating to 100° C. while stirring. After a lapse of 36 hours from when the reaction was initiated, the reaction system was cooled to 0° C. to terminate the copolymerization reaction. The degree of polymerization of styrene was 28%. This reaction solution was subjected to column purification and purification under reduced pressure described above. The poly(St-b-PME-550-b-St) obtained by drying at 60° C. for 5 hours under reduced pressure was analyzed by GPC. The GPC analysis showed that the obtained poly(St-b-PME-550-b-St) was a single dispersion polymer of Mn=180,000.

Next, into 46 g of toluene previously deaerated with argon were added 0.035 g (0.04 mmol) of chloropentamethylcyclopentadienylbis(triphenylphosphin) rhutenium, 9.8 g (0.054 mmol) of poly(St-b-PME-550-b-St), 1.7 g (14.6 mmol) of HEA, and 0.02 g (0.17 mmol) of di-n-butylamine, and these were mixed uniformly in an argon atmosphere. Then, a copolymerization reaction was initiated by heating to 80° C. After a lapse of 18 hours from when the reaction was initiated, the reaction system was cooled to 0° C. to terminate the copolymerization reaction. The GC analysis showed that the degree of polymerization conversion of HEA was 40%. This reaction solution was subjected to column purification and purification under reduced pressure described above. The copolymer obtained by drying at 60° C. for 5 hours under reduced pressure was analyzed by GPC. The GPC analysis showed that the produced copolymer was a single dispersion polymer of Mn=190,000. The $^{13}CNMR$ measurement showed that the obtained copolymer had a structure of poly(HEA-b-St-b-PME-550-b-St-b-HEA) wherein the ratio of the number of moles of repeating units derived from PME-550 to the number of moles of the total repeating units in the copolymer was 83%, the ratio of the number of moles of repeating units derived from St was 10%, and the ratio of the number of moles of repeating units derived from HEA was 7%.

(2) Preparation of Compositions for Polymer Solid Electrolyte

A tetrahydrofuran solution containing tolylene-2,4-diisocyanate in a concentration of 10% by weight was used as a cross-linking agent. 0.4 g of the copolymer obtained by way of the above described procedures, 1.6 g of the tetrahydrofuran solution, and a tolylene-2,4-diisocyanate solution in the amount shown in Table 2 were dissolved in 2 g of acetone in an argon atmosphere. Then, into the obtained solution was added 0.034 g of $LiClO_4$, and this was dissolved uniformly such that a composition for a polymer solid electrolyte was prepared.

(3) Production of Membrane of Solid Electrolyte and Evaluation of Properties.

A membrane of solid electrolyte was produced with the above composition by way of the same procedures as in Example 7 (thickness: 100 μm). The ionic conductivity thereof (S/cm) at 30° C. was measured. Also, an activation energy ΔE was calculated by way of the procedures as in Example 12. The results were shown together with the properties of the membranes in Table 2.

EXAMPLE 18

(1) Synthesis of C-B-A-B-C Type Block Graft Copolymer

Into 130 g of toluene previously deaerated with argon was added 0.24 g (0.25 mmol) of dichlorotris(triphenylphosphin) ruthenium and 55.1 g (111 mmol) of PME-400, and these were mixed uniformly in an argon atmosphere. Then, 0.13 g (1 mmol) of di-n-butylamine and 0.1 g (0.5 mmol) of 2,2-dichloroacetophenone were added thereto, and a polymerization reaction was initiated by heating to 80° C. while stirring. After a lapse of 28 hours from when the reaction was initiated, the temperature of the reaction system was cooled to 0° C. to terminate the polymerization reaction. The degree of polymerization of PME-400 was 66%. Subsequently, metal complexes and unreacted monomers were removed from the reaction solution by column purification. Then, the solution was volatilized and further dried at 60° C. under reduced pressure for 5 hours, and polyPME-400 was obtained. The GPC analysis showed that the obtained polyPME-400 was a single dispersion polymer of Mn=180,000.

Next, into 25.5 g of toluene previously deaerated with argon was added 0.04 g (0.05 mmol) of chloropentamethylcyclopentadienylbis(triphenylphosphin) rhutenium, 10 g (0.056 mmol) of polyPME-400, 0.91 g (8.7 mmol) of styrene, and 0.026 g (0.2 mmol) of di-n-butylamine, and these were mixed uniformly in an argon atmosphere. Then, a copolymerization reaction was initiated by heating to 100° C. while stirring. After a lapse of 72 hours from when the reaction was initiated, the reaction system was cooled to 0° C. to terminate the copolymerization reaction. The degree of polymerization of styrene was 47%. This reaction solution was subjected to column purification and purification under reduced pressure described above. The poly(St-b-PME-400-b-St) obtained by drying at 60° C. for 5 hours under reduced pressure was analyzed by GPC. The GPC analysis showed that the obtained poly(St-b-PME-400-b-St) was a single dispersion polymer of Mn=190,000.

Next, into 44 g of toluene previously deaerated with argon was added 0.04 g (0.05 mmol) of chloropentamethylcyclopentadienylbis(triphenylphosphin) rhutenium, 9.45 g (0.05 mmol) of poly(St-b-PME-400-b-St), 1.6 g (14 mmol) of HEA, and 0.023 g (0.18 mmol) of di-n-butylamine, and these were mixed uniformly in an argon atmosphere. Then, the copolymerization reaction was initiated by heating to 80° C.

After a lapse of 15 hours from when the reaction was initiated, the reaction system was cooled to 0° C. to terminate the copolymerization reaction. The GC analysis showed that the degree of polymerization conversion of HEA was 44. This reaction solution was subjected to column purification and purification under reduced pressure described above. The copolymer obtained by drying at 60° C. for 5 hours under reduced pressure was analyzed by GPC. The GPC analysis showed that the produced copolymer was a single dispersion polymer of Mn=200,000. The $^{13}$CNMR measurement showed that the obtained copolymer had a structure of poly (HEA-b-St-b-PME-400-b-St-b-HEA) wherein the ratio of the number of moles of repeating units derived from PME-400 to the number of moles of the total repeating units in the copolymer was 89%, the ratio of the number of moles of repeating units derived from St was 4%, and the ratio of the number of moles of repeating units derived from HEA was 7%.

(2) Preparation of Compositions for Polymer Solid Electrolyte

A tetrahydrofuran solution containing tolylene-2,4-diisocyanate in a concentration of 10% by weight was used as a cross-linking agent. 0.4 g of the copolymer obtained by way of the above described procedures, 1.6 g of the tetrahydrofuran solution, and a tolylene-2,4-diisocyanate solution in the amount shown in Table 2 were dissolved in 2 g of acetone in an argon atmosphere. Then, into the obtained solution was added 0.034 g of LiClO$_4$, and this was dissolved uniformly such that a composition for a polymer solid electrolyte was prepared.

(3) Production of Membrane of Solid electrolyte and Evaluation of Properties.

A membrane of solid electrolyte was produced with the above composition by way of the same procedures as in Example 7 (thickness: 100 μm). The ionic conductivity thereof (S/cm) at 30° C. was measured. Also, an activation energy ΔE was calculated by way of the procedures found in Example 12. The results were shown together with the properties of the membranes in Table 2.

TABLE 2

| | Cross-linking agent (g)[a] | Membrane properties[b] | Ionic conductivity | ΔE |
|---|---|---|---|---|
| Example 15-1 | 0.0135 (50%) | ○ | $1.2 \times 10^{-4}$ | 58.6 |
| Example 15-2 | 0.00 (0%) | Δ | $1.2 \times 10^{-4}$ | 59.7 |
| Example 16-1 | 0.0098 (25%) | ○ | $1.4 \times 10^{-4}$ | 53.8 |
| Example 16-2 | 0.00 (0%) | Δ | $1.0 \times 10^{-4}$ | 54.9 |
| Example 17-1 | 0.005 (25%) | Δ | $1.1 \times 10^{-4}$ | 54.8 |
| Example 17-2 | 0.00 (0%) | Δ | $1.3 \times 10^{-4}$ | 51.3 |
| Example 18-1 | 0.0105 (50%) | Δ | $1.1 \times 10^{-4}$ | 55.3 |
| Example 18-2 | 0.00 (0%) | Δ | $1.6 \times 10^{-4}$ | 53.8 |

[a]The value inside parenthesis represents the ratio of the number of moles to repeating units of HEA.
[b]○ means hard, and Δ means slightly soft.

EXAMPLE 19

(1) Synthesis of B-A-B Block Graft Copolymer

Into 1400 g of toluene previously deaerated with argon were added 2.9 g (3 mmol) of dichlorotris(triphenylphosphin) ruthenium and 600 g (540 mmol) of methoxypolyethylene glycol mono (meth)acrylate ("Blenmer PME-1000" produced by NOF Corporation), and these were mixed uniformly in an argon atmosphere. Then, 1.6 g (12 mmol) of di-n-butylamine and 1.1 g (6 mmol) of 2,2-dichloroacetophenone were added thereto, and a polymerization reaction was initiated by heating to 80° C. while stirring. After a lapse of 41 hours from when the reaction was initiated, the reaction system was cooled to 0° C. to terminate the polymerization reaction. The degree of polymerization was 52.0%. Subsequently, metal complexes and unreacted monomers were removed from the reaction solution by column purification. Then, the toluene was distilled out under reduced pressure and poly-methoxypolyethylene glycol mono (meth)acrylate (hereinafter abbreviated as P-PME1000-19) was obtained. The obtained P-PME1000-19 was a polymer of number average molecular weight (Mn)=23,800.

Next, into 375 g of toluene previously deaerated with argon were added 0.5 g (0.63 mmol) of chloropentamethylcyclopentadienylbis(triphenylphosphin) rhutenium, and 100 g (0.42 mmol) of P-PME1000-19, 25 g (240 mmol) of styrene, and these were mixed uniformly in an argon atmosphere. Then, 0.32 g (2.5 mmol) of di-n-butylamine was added thereto, and a polymerization reaction was initiated by heating to 100° C. while stirring. After a lapse of 94 hours after the reaction was initiated, the temperature of the reaction system was cooled to 0° C. to terminate the polymerization reaction. The degree of polymerization of styrene was 43.0%. Subsequently, metal complexes and unreacted monomers were removed from the reaction solution by column purification. Then, the toluene was distilled out under reduced pressure, and a copolymer was obtained. The GPC analysis showed that the produced copolymer was a single dispersion polymer of Mn=264,000. The $^{13}$CNMR measurement showed that the obtained copolymer had a structure of poly (St-b-PME-1000-b-St) wherein the ratio of the number of moles derived from repeating units of PME-1000 to the number of moles of the total repeating units in the copolymer was 90%, and the ratio of the number of moles of repeating units derived from St was 10%.

(2) Production of Electrode 340 mg of a powder of LiCoO$_2$ ("CellseedC-10" produced by Nippon Chemical Industrial Co., Ltd.; particle size: 10-15 μm) and 40 mg of ketjen black (KB produced by Ketjen Black International Co., Ltd.) were put in a mortar and mixed thoroughly. 170 mg of a 12% by weight N-methyl pyrrolidone (NMP) solution of polyvinylidene fluoride (PVdF produced by Aldrich, molecular weight: 534,000) was added thereto, and mixed in thoroughly with a spatula. Then, the specimen was applied onto a capacitor of aluminum foil (80 mm×200 mm and thickness: 50 μm) with a doctor blade (width: 40 mm and air gap: 50 μm), and vacuum-dried at 100° C. for 24 hours, and an anode layer was produced by pressing that at a pressure of 20 MPa/cm$^2$. The thickness of the anode was 32 μm, and the content of LiCoO$_2$ was 5 mg/cm$^2$.

200 mg of the above B-A-B block graft copolymer was dissolved in tetrahydrofuran (THF produced by Wako Pure Chemical Industries, Ltd.; special grade), and a 20% by weight solution was prepared. 0.02 g of LiClO$_4$ anhydride (produced by Wako Pure Chemical Industries, Ltd.; special grade) was dissolved in the solution, and acetonitrile (AN produced by Wako Pure Chemical Industries, Ltd.; special grade) was further added thereto such that a 5% by weight solution containing the polymer and the electrolytic salt was prepared. 2 g of this solution was poured and spread onto the above sheet of anode with a covered area of 50 mm×50 mm, and then, solvents were removed at room temperature under standard pressure and under nitrogen stream. Then, the anode was heated at 60° C. for one hour under standard pressure and under nitrogen stream, and further heated at 80° C. for one hour under standard pressure and under nitrogen stream.

Then, the anode was dried at 80° C. in a vacuum for 1 hour and further dried at 120° C. in a vacuum for 3 hours, and an anode having a polymer was prepared.

(3) Production of Membrane of Solid Electrolyte 0.02 g of LiClO$_4$ was dissolved into 1 g of the 20% by weight THF solution of C-B-A-B-C block/graft copolymer prepared in Example 16. Into the solution was added 0.12 g of a 10% by weight solution of tolylene-2,4-diisocyanate (TDI: produced by Wako Pure Chemical Industries, Ltd.; first grade), and acetonitrile (AN: produced by Wako Pure Chemical Industries, Ltd.; special grade) was further added thereto to prepare a 10% by weight solution. 1.5 g of the solution was pour and spread onto the above described anode having the polymer, and solvents were removed at room temperature under standard pressure under nitrogen stream. Then, treatment of cross-linking with TDI was carried out by heating at 80° C. for 1 hour under nitrogen stream and further at 80° C. for one hour in a vacuum under nitrogen stream. Then, a membrane of solid electrolyte with about 40 μm thickness was formed on the anode having the polymer by heating at 120° C. for 4 hours in a vacuum.

(4) Electric Charge-Discharge Test

The anode covered with a membrane of a solid electrolyte was cut at 18 mm φ, and it was covered with a metal Li sheet (produced by Furuuchi Chemical Corporation; thickness: 250 μm) which was cut at 13 mm φ. Then, a 2016-type coin-shaped cell was assembled, and a test of electric charge and discharge was carried out. The conditions for the test were the following.

<Conditions for Charge-Discharge Test>
Range of voltage: 3.0-4.2 V
Value of electric current: 0.1 C (172 μA)
Temperature: 60° C.
Times of charge-discharge: 20 cycles The results were shown in Table 3.

EXAMPLE 20

(1) Synthesis of B-A-B Type Block Graft Copolymer

Into 280 g of toluene previously deaerated with argon were added 0.58 g (0.6 mmol) of dichlorotris(triphenylphosphin) ruthenium and 120 g (178 mmol) of methoxypolyethylene glycol mono (meth)acrylate ("Blenmer PME-550" produced by NOF Corporation), and these were mixed uniformly in an argon atmosphere. Then, 0.31 g (2.4 mmol) of di-n-butylamine and 0.23 g (1.2 mmol) of 2,2-dichloroacetophenone were added thereto, and a polymerization reaction was initiated by heating to 80° C. while stirring. After a lapse of 29 hours from when the reaction was initiated, the reaction system was cooled to 0° C. to terminate the polymerization reaction. The degree of polymerization was 82%. Subsequently, metal complexes and unreacted monomers were removed from the reaction solution by column purification. Then, the toluene was distilled out under reduced pressure, and poly-methoxypolyethylene glycol mono (meth)acrylate (hereinafter abbreviated as P-PME550-20) was obtained. The obtained P-PME550-20 was a polymer of number average molecular weight (Mn)=135,800.

Next, into 468 g of toluene were added 0.24 g (0.3 mmol) of chloropentamethylcyclopentadienylbis(triphenylphosphin) rhutenium, 99.5 g (1.0 mmol) of P-PME550-20, and 17.6 g (169 mmol) of styrene, and these were mixed uniformly in an argon atmosphere. Then, 0.26 g (2.0 mmol) of di-n-butylamine was added thereto, and a polymerization reaction was initiated by heating to 100° C. while stirring. After a lapse of 44 hours from when the reaction was initiated, the temperature of the reaction system was cooled to 0° C. to terminate the polymerization reaction. The degree of polymerization of styrene was 34.0%. Subsequently, metal complexes and unreacted monomers were removed from the reaction solution by column purification. Then, the toluene was distilled out under reduced pressure, and a copolymer was obtained. The GPC analysis showed that the produced copolymer was a single dispersion polymer of Mn=144,000. The $^{13}$CNMR measurement showed that the obtained copolymer had a structure of poly(St-b-PME-550-b-St) wherein the ratio of the number of moles of repeating units derived from PME-550 to the number of moles of the total repeating units in the copolymer was 94%, and the ratio of the number of moles of repeating units derived from St was 6%.

(2) A battery of a polymer solid electrolyte was produced by way of the same procedures as in Example 19 except that the above obtained copolymer was used, and a test of electric charge and discharge was carried out. The results were shown in Table 3.

EXAMPLE 21

(1) Synthesis of B-A-B Type Block Graft Copolymer

Into 225 g of toluene were added 0.24 g (0.25 mmol) of dichlorotris(triphenylphosphin) ruthenium, 37.5 g (33.7 mmol) of methoxypolyethylene glycol mono (meth)acrylate ("Blenmer PME-1000" produced by NOF corporation), and 37.5 g (75.5 mmol) of methoxypolyethylene glycol mono (meth)acrylate ("Blenmer PME-400" produced by NOF corporation), and these were mixed uniformly in an argon atmosphere. Then, 0.13 g (1 mmol) of di-n-butylamine and 0.095 g (0.5 mmol) of 2,2-dichloroacetophenone were added thereto, and a polymerization reaction was initiated by heating to 80° C. while stirring. After a lapse of 69 hours from when the reaction was initiated, the reaction system was cooled to 0° C. to terminate the polymerization reaction. The degree of polymerization was 65%. Subsequently, metal complexes and unreacted monomers were removed from the reaction solution by column purification. Then, the toluene was distilled out under reduced pressure, and poly-methoxypolyethylene glycol mono (meth)acrylate (hereinafter abbreviated as "P-PME1000/400-21") was obtained. The obtained P-PME1000/400-21 was a polymer of number average molecular weight (Mn)=120,000, and molecular weight distribution (Mw/Mn)=1.45.

Next, into 123 g of toluene were added 0.1 g (0.12 mmol) of chloropentamethylcyclopentadienylbis(triphenylphosphin) rhutenium, 24.6 g (0.21 mmol) of P-PME1000/400-21, and 6.2 g (59 mmol) of styrene, and these were mixed uniformly in an argon atmosphere. Then, 0.06 g (2.0 mmol) of di-n-butylamine was added thereto, and a polymerization reaction was initiated by heating to 100° C. while stirring. After a lapse of 20 hours from when the reaction was initiated, the reaction system was cooled to 0° C. to terminate the polymerization reaction. The degree of polymerization of styrene was 28%. Subsequently, metal complexes and unreacted monomers were removed from the reaction solution by column purification. Then, the toluene was distilled out under reduced pressure, and a copolymer was obtained. The GPC analysis showed that the produced copolymer was a single dispersion polymer of Mn=129,000. The $^{13}$CNMR measurement showed that the obtained copolymer had a structure of poly (St-b-PME-1000/400-b-St) wherein the ratio of the number of moles of the sum of repeating units derived from PME-1000 and PME-400 to the number of moles of the total repeating units in the copolymer was 93%, and the ratio of the number of moles of repeating units derived from St was 7%.

(2) A battery of a polymer solid electrolyte was produced by the same procedures as in Example 19 except that the above obtained copolymer was used, and the test for electrical charge and discharge was carried out. The results were shown in Table 3.

TABLE 3

| | Initial stage | | | After 20 cycles | | |
|---|---|---|---|---|---|---|
| Example | Discharge Capacity (mAh/g) | Average Discharge Voltage (V) | Charge-discharge Efficiency (%) | Discharge Capacity (mAh/g) | Average Discharge Voltage (V) | Charge-discharge Efficiency (%) |
| Ex. 19 | 107 | 3.84 | 98 | 100 | 3.81 | 94 |
| Ex. 20 | 113 | 3.88 | 98 | 110 | 3.84 | 97 |
| Ex. 21 | 120 | 3.90 | 98 | 115 | 3.88 | 97 |

Based on the results of the above charge-discharge test, it was found that the contact between an activator and a polymer solid electrolyte can be improved by adding a homogeneous polymer which was not crosslinked to an anode and that a capacity which is applicable to practical use can be obtained in even a solid electrolyte battery. Also, preferable results was able to be obtained by adding a polymer having two or more kinds of polyalkylene glycol chains, which were different in chain length to each other, to an anode.

INDUSTRIAL APPLICABILITY

Compositions for a polymer solid electrolyte and polymer solid electrolytes derived from the same are excellent in terms of thermal properties, physical properties, and ionic conductivity. Consequently, these compositions or electrolytes are useful as materials for electrochemical devices such as batteries, etc. and tremendously valuable in industrial application.

The invention claimed is:

1. A composition for a polymer solid electrolyte comprising a copolymer having repeating units represented by Formula (I):

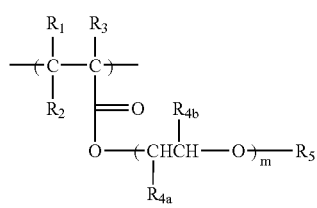

(I)

wherein each of $R_1$ to $R_3$ independently represents a hydrogen atom or a C1-C10 hydrocarbon group; $R_1$ and $R_3$ may bond to one another to form a ring; each of $R_{4a}$ and $R_{4b}$ independently represents a hydrogen atom or a methyl group; $R_5$ represents a hydrogen atom, a hydrocarbon group, an acyl group or a silyl group; m is an integer of 1 to 100, and each of $R_{4a}$ and each of $R_{4b}$ may be the same or different when m is 2 or more;

and repeating units represented by Formula (II):

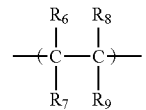

(II)

wherein each of $R_6$ and $R_8$ independently represents a hydrogen atom or a C1-C10 hydrocarbon group; $R_6$ and $R_8$ may bond to one another to form a ring; $R_7$ represents a hydrogen atom, a C1-C10 hydrocarbon group, a hydroxyl group, a hydrocarbonoxy group, a carboxyl group, an acid anhydride group, an amino group, an ester group, or an organic group having at least one functional group selected from the group consisting of hydroxyl group, carboxyl group, three-membered-ring epoxy group, acid anhydride group and amino group; and $R_9$ represents an organic group having at least one functional group selected from the group consisting of hydroxyl group, carboxyl group, three-membered-ring epoxy group, acid anhydride group and amino group;

and an electrolyte salt, wherein the copolymer forms a microphase-separated structure, wherein the copolymer having the repeating units represented by the Formula (I) and the Formula (II) is a copolymer having an arrangement of block chains in an order of B1, C1, A, C2, and B2, wherein the block chain A has the repeating unit represented by the Formula (I); the block chain B1 has the repeating unit represented by the Formula (II), the block chain B2 has the repeating unit represented by the Formula (II) which may be the same or different from B1; the block chain C1 has a repeating unit represented by the Formula (III)

$$\begin{array}{c} R_{10} \ R_{12} \\ | \ \ | \\ -(C-C)- \\ | \ \ | \\ R_{11} \ R_{13} \end{array}$$

(III)

wherein each of R10 to R12 independently represents a hydrogen atom or a C1-C10 hydrocarbon group, and R13 represents an aryl group or a heteroaryl group; and the block chain C2 has a repeating unit represented by the Formula (III) which may be the same or different from C1.

2. The composition for a polymer solid electrolyte according to claim 1, the copolymer further comprising a repeating unit derived from a polymerizable unsaturated monomer, which is different from the repeating units represented by Formula (I) and Formula (II).

3. The composition for a polymer solid electrolyte according to claim 2, wherein the repeating unit derived from polymerizable unsaturated monomers comprises at least one repeating unit selected from the group consisting of units represented by Formula (III)

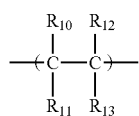

(III)

wherein each of $R_{10}$ to $R_{12}$ independently represents a hydrogen atom or a C1-C10 hydrocarbon group, and $R_{13}$ represents an aryl group or a heteroaryl group;

and units represented by Formula (IV)

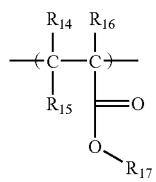

(IV)

wherein each of $R_{14}$ to $R_{16}$ independently represents a hydrogen atom or a C1-C10 hydrocarbon group; $R_{14}$ and $R_{16}$ may bond to one another to form a ring; and $R_{17}$ represents a C1-C12 alky group, an aryl group, an alicyclic hydrocarbon group, or a heterocyclic group.

4. A polymer solid electrolyte comprising:
a copolymer having repeating units represented by Formula (I):

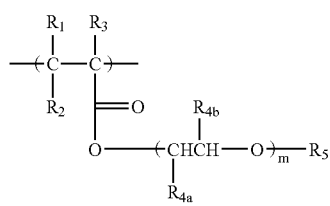

(I)

wherein each of $R_1$-$R_3$ independently represents a hydrogen atom or a C1-C10 hydrocarbon group; $R_1$ and $R_3$ may bond to one another to form a ring; each of $R_{4a}$ and $R_{4b}$ independently represents a hydrogen atom or a methyl group; $R_5$ represents a hydrogen atom, a hydrocarbon group, an acyl group or a silyl group; m is an integer of 1 to 100, and each of $R_{4a}$ and $R_{4b}$ may be the same or different when m is 2 or more;

and repeating units represented by Formula (II):

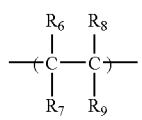

(II)

wherein each of $R_6$ and $R_8$ independently represents a hydrogen atom or a C1-C10 hydrocarbon group; $R_6$ and $R_8$ may bond to one another to form a ring; $R_7$ represents a hydrogen atom, a C1-C10 hydrocarbon group, a hydroxyl group, a hydrocarbonoxy group, a carboxyl group, an acid anhydride group, an amino group, an ester group, or an organic group having at least one functional group selected from the group consisting of hydroxyl group, carboxyl group, three-membered-ring epoxy group, acid anhydride group and amino group; and $R_9$ represents an organic group having at least one functional group selected from the group consisting of hydroxyl group, carboxyl group, three-membered-ring epoxy group, acid anhydride group and amino group;

and an electrolyte salt, wherein the copolymer forms a microphase-separated structure, wherein the copolymer having the repeating units represented by the Formula (I) and the Formula (II) is a copolymer having an arrangement of block chains in an order of B1, C1, A, C2, and B2, wherein the block chain A has the repeating unit represented by the Formula (I); the block chain B1 has the repeating unit represented by the Formula (II), the block chain B2 has the repeating unit represented by the Formula (II) which may be the same or different from B1; the block chain C1 has a repeating unit represented by the Formula (III):

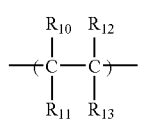

(III)

wherein each of R10 to R12 independently represents a hydrogen atom or a C1-C10 hydrocarbon group, and R13 represents an aryl group or a heteroaryl group; and the block chain C2 has a repeating unit represented by the Formula (III) which may be the same or different from C1.

5. A polymer solid electrolyte comprising:
a cross-linked polymer obtained by a reaction of a cross-linking agent with a copolymer having repeating units represented by Formula (I):

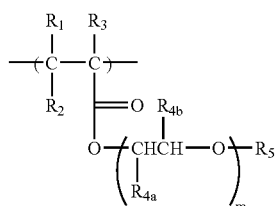

(I)

wherein each of $R_1$-$R_3$ independently represents a hydrogen atom or a C1-10 hydrocarbon group; $R_1$ and $R_3$ may bond to one another to form a ring; each of $R_{4a}$ and $R_{4b}$ independently represents a hydrogen atom or a methyl group; $R_5$ represents a hydrogen atom, a hydrocarbon group, an acyl group or a silyl group; m is an integer of 1 to 100, and each of $R_{4a}$ and each of $R_{4b}$ may be the same or different when m is 2 or more;

and repeating units represented by Formula (II):

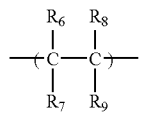

(II)

wherein each of $R_6$ and $R_8$ independently represents a hydrogen atom or a C1-C10 hydrocarbon group; $R_6$ and $R_8$ may bond to one another to form a ring; $R_7$ represents a hydrogen atom, a C1-C10 hydrocarbon group, a hydroxyl group, a hydrocarbonoxy group, a carboxyl group, an acid anhydride group, an amino group, an ester group, or an organic group having at least one functional group selected from the group consisting of hydroxyl group, carboxyl group, three-membered-ring epoxy group, acid anhydride group and amino group; and $R_9$ represents an organic group having at least one functional group selected from the group consisting of hydroxyl group, carboxyl group, three-membered-ring epoxy group, acid anhydride group and amino group;

and an electrolyte salt, wherein the copolymer forms a microphase-separated structure, wherein the copolymer having the repeating units represented by the Formula (I) and the Formula (II) is a copolymer having an arrangement of block chains in an order of B1, C1, A, C2, and B2, wherein the block chain A has the repeating unit represented by the Formula (I); the block chain B1 has the repeating unit represented by the Formula (II), the block chain B2 has the repeating unit represented by the Formula (II) which may be the same or different from B1; the block chain C1 has a repeating unit represented by the Formula (III):

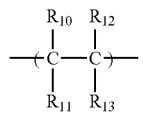

(III)

wherein each of R10 to R12 independently represents a hydrogen atom or a C1-C10 hydrocarbon group, and R13 represents an aryl group or a heteroaryl group; and the block chain C2 has a repeating unit represented by the Formula (III) which may be the same or different from C1.

6. The polymer solid electrolyte according to claim 4, wherein the copolymer further comprises a repeating unit derived from a polymerizable unsaturated monomer, which is different from the repeating units represented by Formula (I) and Formula (II).

7. The polymer solid electrolyte according to claim 6, wherein the repeating unit derived from polymerizable unsaturated monomers is at least one repeating unit selected from the group consisting of units represented by Formula (III)

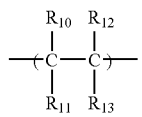

(III)

wherein each of $R_{10}$ to $R_{12}$ independently represents a hydrogen atom or a C1-C10 hydrocarbon group, and $R_{13}$ represents an aryl group or a heteroaryl group;

and units represented by Formula (IV)

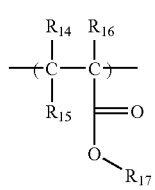

(IV)

wherein each of $R_{14}$ to $R_{16}$ independently represents a hydrogen atom or a C1-C10 hydrocarbon group; $R_{14}$ and $R_{16}$ may bond to one another to form a ring; and $R_{17}$ represents a C1-C12 alkyl group, an aryl group, an alicyclic hydrocarbon group, or a heterocyclic group.

8. A polymer solid electrolyte battery comprising: a solid electrolyte made into a film using the composition for a polymer solid electrolyte according to claim 1; and an electrode which comprises an electrode-activating compound and a copolymer including a disposition of block chains arranged in an order of B11, A11 and C11, wherein the block chain A11 includes a repeating unit represented by Formula (XX)

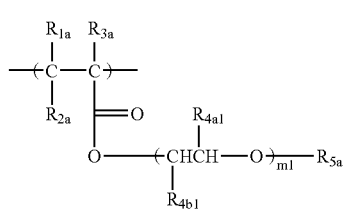

(XX)

wherein each of $R_{1a}$ to $R_{3a}$ independently represents a hydrogen atom or a C1-C10 hydrocarbon group; $R_{1a}$ and $R_{3a}$ may bond to one another to form a ring; each of $R_{4a1}$ and $R_{4b1}$ independently represents a hydrogen atom or a methyl group; $R_{5a}$ represents a hydrogen atom, a hydrocarbon group, an acyl group or a silyl group; m1 represents an integer of 2 to 100; and $R_{4a1}$ and $R_{4b1}$ may be the same or different from each other, and the block chain B11 includes a repeating unit represented by Formula (XXI):

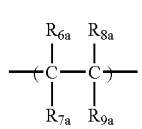

(XXI)

wherein each of $R_{6a}$ to $R_{8a}$ independently represents a hydrogen atom or a C1-C10 hydrocarbon group; and $R_{9a}$ represents an aryl group, and the block chain C11 includes arbitrary components.

9. A copolymer having an arrangement of block chains in an order B1, C1, A, C2, and B2, wherein the block chain A has a repeating unit represented by Formula (I):

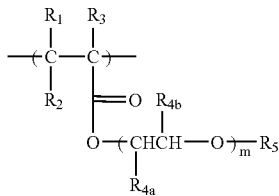
(I)

wherein each of $R_1$-$R_3$ independently represents a hydrogen atom or a C1-C10 hydrocarbon group; $R_1$ and $R_3$ may bond to one another to form a ring; each of $R_{4a}$ and $R_{4b}$ independently represents a hydrogen atom or a methyl group; $R_5$ represents a hydrogen atom, a hydrocarbon group, an acyl group or a silyl group; m is an integer of 1 to 100, and each of $R_{4a}$ and each of $R_{4b}$ may be the same or different when m is 2 or more;

the block chain B1 has a repeating unit represented by Formula (II):

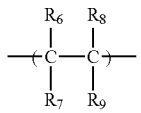
(II)

wherein each of $R_6$ and $R_8$ independently represents a hydrogen atom or a C1-C10 hydrocarbon group; $R_6$ and $R_8$ may bond to one another to form a ring; $R_7$ represents a hydrogen atom, a C1-C10 hydrocarbon group, a hydroxyl group, a hydrocarbonoxy group, a carboxyl group, an acid anhydride group, an amino group, an ester group, or an organic group having at least one functional group selected from the group consisting of hydroxyl group, carboxyl group, three-membered-ring epoxy group, acid anhydride group and amino group; and $R_9$ represents an organic group having at least one functional group selected from the group consisting of hydroxyl group, carboxyl group, three-membered-ring epoxy group, acid anhydride group and amino group;

the block chain B2 has a repeating unit represented by Formula (II) which may be the same as or different from B1;

the block chain C1 has a repeating unit represented by Formula (III):

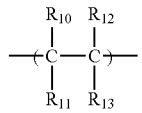
(III)

wherein each of $R_{10}$ to $R_{12}$ independently represents a hydrogen atom or a C1-C10 hydrocarbon group, and $R_{13}$ represents an aryl group or a heteroaryl group; and the block chain C2 has a repeating unit represented by Formula (III) which may be the same as or different from C1, wherein the copolymer forms a microphase-separated structure.

10. The polymer solid electrolyte according to claim 5, wherein the copolymer further comprises a repeating unit derived from a polymerizable unsaturated monomer, which is different from the repeating units represented by Formula (I) and Formula (II).

11. The polymer solid electrolyte according to claim 10, wherein the repeating unit derived from polymerizable unsaturated monomers is at least one repeating unit selected from the group consisting of units represented by Formula (III)

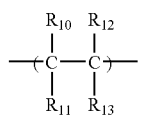
(III)

wherein each of $R_{10}$ to $R_{12}$ independently represents a hydrogen atom or a C1-C10 hydrocarbon group, and $R_{13}$ represents an aryl group or a heteroaryl group;

and units represented by Formula (IV)

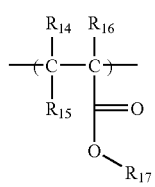
(IV)

wherein each of $R_{14}$ to $R_{16}$ independently represents a hydrogen atom or a C1-C10 hydrocarbon group; $R_{14}$ and $R_{16}$ may bond to one another to form a ring; and $R_{17}$ represents a C1-C12 alkyl group, an aryl group, an alicyclic hydrocarbon group, or a heterocyclic group.

* * * * *